(12) United States Patent
Hellman

(10) Patent No.: US 7,840,178 B2
(45) Date of Patent: Nov. 23, 2010

(54) FM BROADCAST SYSTEM COMPETITIVE WITH SATELLITE RADIO

(75) Inventor: Martin Edward Hellman, Stanford, CA (US)

(73) Assignee: Martin E. Hellman, Stanford, CA (US)

( * ) Notice: Subject to any disclaimer, the term of this patent is extended or adjusted under 35 U.S.C. 154(b) by 971 days.

(21) Appl. No.: 11/484,269

(22) Filed: Jul. 11, 2006

(65) Prior Publication Data

US 2007/0014536 A1    Jan. 18, 2007

Related U.S. Application Data

(60) Provisional application No. 60/698,786, filed on Jul. 12, 2005.

(51) Int. Cl.
*H04Q 7/32*    (2006.01)
(52) U.S. Cl. ............... 455/3.02; 455/3.01; 455/3.04; 455/3.06; 455/550.1; 455/556.1; 725/63; 725/68; 725/70; 386/46; 386/95; 386/126; 386/124; 386/125
(58) Field of Classification Search ....... 455/3.01–3.06, 455/550.1, 556.2, 427, 429, 12.1, 412.1, 455/412.2, 410, 411, 500, 517, 418–420; 725/63, 68, 70; 386/46, 95, 126, 124, 125
See application file for complete search history.

(56) References Cited

U.S. PATENT DOCUMENTS

| 4,083,003 | A | 4/1978 | Haemmig |
| 4,135,156 | A | 1/1979 | Sanders, Jr. et al. |
| 4,217,588 | A | 8/1980 | Freeny, Jr. |
| 4,344,171 | A | 8/1982 | Lin |
| 4,720,873 | A | 1/1988 | Goodman et al. |
| 5,438,423 | A | 8/1995 | Lynch et al. ............... 386/109 |
| 5,686,954 | A | 11/1997 | Yoshinobu et al. |
| 5,768,527 | A | 6/1998 | Zhu et al. |
| 5,815,671 | A | 9/1998 | Morrison |
| 6,061,760 | A | 5/2000 | Huang |
| 6,163,683 | A | 12/2000 | Dunn et al. |
| 6,177,960 | B1 | 1/2001 | Van Luyt |
| 6,192,340 | B1 | 2/2001 | Abecassis |
| 6,272,190 | B1 | 8/2001 | Campana, Jr. |
| 6,289,455 | B1 | 9/2001 | Kocher et al. |
| 6,307,487 | B1 | 10/2001 | Luby |
| 6,320,520 | B1 | 11/2001 | Luby |

(Continued)

OTHER PUBLICATIONS

Anthony J. Mcauley, "Reliable broadband Communication Using a Burst Erasure Correcting Code," ACM SIGCOMM Computer Communication Review, vol. 20, No. 4, Sep. 1990, pp. 297-306.

(Continued)

*Primary Examiner*—Keith T Ferguson
(74) *Attorney, Agent, or Firm*—Dov Rosenfeld; INVENTEK

(57) ABSTRACT

A media broadcast and distribution system is disclosed which substitutes storage for communications, allowing more efficient use of scarce bandwidth resources. One embodiment allows a terrestrial FM broadcaster to offer a larger number of higher quality audio channels than current satellite radio services such as Sirius and XM Satellite Radio. This embodiment also has features that offer a better user experience than with personal audio devices such as Apple's iPod™. Another embodiment allows satellite radio services to expand their video offerings.

47 Claims, 10 Drawing Sheets

U.S. PATENT DOCUMENTS

| | | | |
|---|---|---|---|
| 6,373,406 B2 | 4/2002 | Luby | |
| 6,411,223 B1 | 6/2002 | Haken et al. | |
| 6,434,622 B1 | 8/2002 | Monteiro et al. | |
| 6,463,585 B1 | 10/2002 | Hendricks | |
| 6,486,803 B1 | 11/2002 | Luby et al. | |
| 6,564,003 B2 | 5/2003 | Marko et al. | |
| 6,577,716 B1 | 6/2003 | Minter et al. | |
| 6,587,127 B1 | 7/2003 | Leeke et al. | |
| 6,594,794 B1 | 7/2003 | De Marzi et al. | |
| 6,600,908 B1 | 7/2003 | Chan | |
| 6,608,994 B1 | 8/2003 | Wegener et al. | |
| 6,609,097 B2 | 8/2003 | Costello et al. | |
| 6,614,366 B2 | 9/2003 | Luby | |
| 6,640,305 B2 | 10/2003 | Kocher et al. | |
| 6,654,884 B2 | 11/2003 | Jaffe et al. | |
| 6,697,608 B2 | 2/2004 | King-Smith | |
| 6,704,556 B1 | 3/2004 | Eaton et al. | |
| 6,725,022 B1 | 4/2004 | Clayton et al. | |
| 6,785,656 B2 | 8/2004 | Patsiokas et al. | |
| 6,834,156 B1 | 12/2004 | Marko et al. | |
| 6,845,230 B2 | 1/2005 | Syed | |
| 6,876,835 B1 | 4/2005 | Marko et al. | |
| 6,914,560 B2 | 7/2005 | Spilker et al. | |
| 7,026,957 B2 | 4/2006 | Rubenstein | |
| 7,117,075 B1 | 10/2006 | Larschan et al. | |
| 7,180,917 B1 | 2/2007 | Marko et al. | |
| 7,197,234 B1 | 3/2007 | Chatterton | |
| 7,216,358 B1 | 5/2007 | Vantalon et al. | |
| 7,490,053 B1 | 2/2009 | Emerson et al. | |
| 2001/0019310 A1 | 9/2001 | Luby | |
| 2001/0036224 A1 | 11/2001 | Demello et al. | |
| 2002/0025777 A1 | 2/2002 | Kawamata et al. | |
| 2002/0087685 A1 | 7/2002 | Lassen et al. | |
| 2002/0107968 A1 | 8/2002 | Horn et al. | |
| 2002/0116277 A1 | 8/2002 | Kraft | |
| 2002/0129159 A1 | 9/2002 | Luby et al. | |
| 2002/0129362 A1 | 9/2002 | Chang et al. | 725/32 |
| 2002/0132575 A1 | 9/2002 | Kesling et al. | |
| 2002/0184038 A1 | 12/2002 | Costello et al. | |
| 2002/0190878 A1 | 12/2002 | Luby | |
| 2003/0014767 A1 | 1/2003 | Stumphauzer, II | |
| 2003/0058958 A1 | 3/2003 | Shokrollahi et al. | |
| 2003/0070174 A1 | 4/2003 | Solomon | |
| 2003/0122959 A1 | 7/2003 | Ishida et al. | 348/426.1 |
| 2003/0129941 A1 | 7/2003 | Kawamata et al. | |
| 2003/0192060 A1 | 10/2003 | Levy | 725/133 |
| 2003/0226089 A1 | 12/2003 | Rasmussen et al. | |
| 2003/0236843 A1 | 12/2003 | Weber et al. | |
| 2004/0003399 A1 | 1/2004 | Cooper | |
| 2004/0021588 A1 | 2/2004 | Luby | |
| 2004/0075593 A1 | 4/2004 | Shokrollahi et al. | |
| 2004/0083487 A1 | 4/2004 | Collens et al. | |
| 2004/0101274 A1 | 5/2004 | Foisy | |
| 2004/0110468 A1 | 6/2004 | Perlman | |
| 2004/0116069 A1 | 6/2004 | Fadavi-Ardekani et al. | |
| 2004/0116070 A1 | 6/2004 | Fishman et al. | |
| 2004/0133914 A1 | 7/2004 | Smith et al. | |
| 2004/0133923 A1 | 7/2004 | Watson et al. | |
| 2004/0163135 A1 | 8/2004 | Giaccherini | |
| 2004/0199654 A1 | 10/2004 | Juszkiewicz | |
| 2004/0205028 A1* | 10/2004 | Verosub et al. | 705/59 |
| 2004/0225519 A1 | 11/2004 | Martin | |
| 2004/0266336 A1 | 12/2004 | Patsiokas et al. | |
| 2005/0222760 A1 | 10/2005 | Cabral et al. | |
| 2005/0222764 A1 | 10/2005 | Uyeki et al. | |
| 2006/0008256 A1* | 1/2006 | Khedouri et al. | 386/124 |
| 2006/0070095 A1 | 3/2006 | Newton et al. | |
| 2006/0136967 A1 | 6/2006 | Hellman | |
| 2006/0190970 A1 | 8/2006 | Hellman | |
| 2007/0065122 A1 | 3/2007 | Chatterton | |
| 2007/0237329 A1* | 10/2007 | Qawami et al. | 380/201 |

OTHER PUBLICATIONS

U.S. Appl. No. 09/695,226, Marko et al.
U.S. Appl. No. 09/695,228, Marko et al.
U.S. Appl. No. 60/698,786, Hellman.
U.S. Appl. No. 60/714,539, Hellman.
U.S. Appl. No. 11/305,379, Hellman.
NIST FIPS PUB-197 "Announcing the Advanced Encryption Standard (AES)," Nov. 26, 2001, pp. i-iii and 1-26. Available from NTIS, 5285 Port Royal Road, Springfield, VA 22161 and on-line at http://csrc.nist.gov/publications/fips/fips197/fips-197.pdf.
NIST Special Publication 800-38A "Recommendation for Block Cipher Modes of Operation,"Dec. 2001, pp. i-vii and 1-16. Available from Superintendant of Documents, US Govt Printing Office, Mail: Stop SSOP, Washington, DC 20402-0001.
NIST FIPS PUB 186-2 "Digital Signature Standard (DSS)," Jan. 27, 2000, pp. i-ii, 1-2 and 7-10. Available from NTIS at above address.
NIST FIPS PUB 180-2, "Announcing the Secure Hash Standard," Aug. 1, 2002, pp. i-iii and 3-16. Available from NTIS at above address.
R. Gallager, Information Theory and Reliable Communication, Wiley, New York, 1968, pp. 224-225 and pp. 238-239.
D. A. Huffman, "A Method for the Construction of Minimum Redundancy Codes," Proceedings of the IRE, vol. 40, pp. 1098-1101, 1952.
J Ziv & A Lempel, "A Universal Algorithm for Sequential Data Compression," IEEE Transactions on Information Theory, vol. IT-23, No. 3, May 1977, pp. 337-343.
Y Linde, A Buzo & R Gray, "An algorithm for vector quantizer design," IEEE Transactions on Communications, vol. COM-28, pp. 84-95, Jan. 1980.
I Ramani & S Savage, "SyncScan: Practical Fast Handoff for 802.11 Infrastructure Networks," IEEE INFOCOM 2005, Miami, Florida, Mar. 13-17, 2005.
Audiovox Electronics Corp. "Sirius Shuttle User Guide SIR-PNP2" 28 pages, no date available.
NIST Special Publication 800-38B "Recommendation for Block Cipher Modes of Operation: The CMAC Mode for Authentication," Available on-line at http://csrc.nist.gov/publications/nistpubs/800-38B/SP_800-38B.pdf, no date avail.
Office Action for U.S. Appl. No. 11/303,605 mailed Nov. 24, 2009.

* cited by examiner $P_1 = R_1 = s_{1,1}\ s_{1,2}\ s_{1,3}\ \ldots\ s_{1,4999}\ s_{1,5000}$
$P_2 = R_2 = s_{2,1}\ s_{2,2}\ s_{2,3}\ \ldots\ s_{2,4999}\ s_{2,5000}$
$P_3 = R_3 = s_{3,1}\ s_{3,2}\ s_{3,3}\ \ldots\ s_{3,4999}\ s_{3,5000}$ $\vdots$ $P_{288} = R_{288} = s_{288,1}\ s_{288,2}\ s_{288,3}\ \ldots\ s_{288,4999}\ s_{288,5000}$
$P_{289} = \phantom{R_{289} =}\ s_{289,1}\ s_{289,2}\ s_{289,3}\ \ldots\ s_{289,4999}\ s_{289,5000}$
$P_{290} = \phantom{R_{290} =}\ s_{290,1}\ s_{290,2}\ s_{290,3}\ \ldots\ s_{290,4999}\ s_{290,5000}$ $\vdots$ $P_{65534} = \phantom{R_{65534} =}\ s_{65534,1}\ s_{65534,2}\ s_{65534,3}\ \ldots\ s_{65534,4999}\ s_{65534,5000}$
$P_{65535} = \phantom{R_{65535} =}\ s_{65535,1}\ s_{65535,2}\ s_{65535,3}\ \ldots\ s_{65535,4999}\ s_{65535,5000}$

FM BROADCAST SYSTEM COMPETITIVE WITH SATELLITE RADIO

CROSS-REFERENCE TO RELATED APPLICATION AND DISCLOSURE DOCUMENT

This patent application claims the benefit of U.S. Provisional Patent Application Ser. No. 60/698,786, "STORAGE-BASED MEDIA BROADCASTING AND DISTRIBUTION SYSTEM," filed Jul. 12, 2005 by Martin E. Hellman, the entire contents of which are incorporated by reference herein.

This patent application is related to U.S. patent application Ser. No. 11/303,605 "DROPOUT-RESISTANT MEDIA BROADCASTING SYSTEM" filed Dec. 16, 2005 by Martin E. Hellman, the entire contents of which are incorporated by reference herein.

This patent application is related to U.S. patent application Ser. No. 11/305,097 "SECURITY ENHANCED TIERED SUBSCRIPTION BROADCAST SYSTEM" filed Dec. 16, 2005 by Martin E. Hellman, the entire contents of which are incorporated by reference herein.

This patent application is related to U.S. patent application Ser. No. 11/305,379 "TIERED SUBSCRIPTION BROADCAST SYSTEM" filed Dec. 16, 2005 by Martin E. Hellman, the entire contents of which are incorporated by reference herein.

This patent application is related to US Patent Disclosure Document Serial No. 572,293 "Preloaded Media Distribution System" filed Mar. 8, 2005 by Martin E. Hellman, the entire contents of which are incorporated by reference herein.

FIELD OF THE INVENTION

The present invention relates to media broadcast and distribution systems in which mass storage is used to reduce bandwidth requirements. A broadcaster can offer numerous channels of higher quality over the same spectrum that currently supports a single channel of lower quality. A distributor of media such as music can offer almost instantaneous downloads over a dial-up connection.

BACKGROUND OF THE INVENTION

Threats to Terrestrial Radio

AM and FM terrestrial radio broadcasters are beginning to experience intense, new competition that, at a minimum, will reduce their market values and may threaten their very survival. Satellite radio threatens to dominate the mobile market, especially if tiered subscription services are introduced to allow users the option of free, commercial-based listening as described in related patent application Ser. No. 11/305,379 "TIERED SUBSCRIPTION BROADCAST SYSTEM." Satellite radio is also a competitive threat to terrestrial radio's fixed playback devices (herein used synonymously with "receivers") such as those used at work and home, although that threat is blunted somewhat by satellite radio's need for a clear view of the sky. Terrestrial radio's fixed user base is also threatened by Internet radio. And both mobile and fixed users are spending more time listening to recorded music of their choosing on MP3 players, iPods™ and similar devices. Other threats are on the horizon. For example, Qualcomm has recently announced it will offer a television and audio broadcast service through cell phone providers. Considering all the threats to AM and FM, it is conceivable that, a decade hence, terrestrial radio will be left with only a small fraction of its current user base.

The main competitive threats to terrestrial radio have the advantages of offering a much wider range of music genres;

commercial free music; and national coverage without any user input (e.g., retuning a playback device).

For example, Apple's 60 GB iPod™ can hold over 1,000 hours of music, allowing a user to store almost any personal music collection of many different genres. The user can select a genre from the iPod's™ menu, hear only songs of that type, and switch genres whenever he desires. There are no commercials on an iPod™ and, clearly, it works in any part of the world. Similarly, Sirius and XM Satellite Radio are each offering nation-wide coverage with approximately 60 commercial free channels of different music types.

Whereas an "oldies" FM station will broadcast popular songs from several decades, Sirius currently has five distinct channels, one each devoted exclusively to music from the 1950s, 1960s, 1970s and 1980s, plus a Swing channel from the 1940s. XM has six "decade channels", one each for the 1940s, 1950s, 1960s, 1970s, 1980s and 1990s. Sirius has four jazz channels with different genres of jazz (contemporary, smooth, classic and swing), three Latin channels (Latin Pop, Mexicana and Caribbean Dance), and three classical channels (opera, symphonic and classical pops). In contrast, even some major markets now have no classical terrestrial radio stations.

In the mobile market, satellite radio has the additional advantage of seamless, coast-to-coast coverage. With terrestrial radio, as a user drives from one city to the next, she must retune her playback device to try and find a new station of the same genre to which she was listening. In contrast, satellite radio's signal is the same across the entire nation and requires no retuning from city to city.

Another advantage of iPods™ and satellite radio over analog terrestrial radio is the ability to display information on a song (e.g., title, artist, date of release) while the song is playing. Many users find this information of great value. (Digital terrestrial radio can offer this service, but is not yet in widespread use.)

Because of these competitive advantages, iPods and satellite radio have been adopted at unprecedented rates. Both products were introduced late in 2001. Approximately three years later, at the end of 2004, Apple had sold over 10 million iPods and satellite radio had over 4 million subscribers. Both technologies are still in rapid growth mode, with more than half of their total sales through 2004 being in the last year of that period. Hence there is a real possibility that, within a decade, terrestrial radio will lose most of its user base. One object of the present invention is to allow terrestrial radio broadcasters to compete effectively against these new technologies by, among other things:

offering numerous channels of different genres of CD quality sound within the same spectrum that currently supports only one channel of a single genre at lower audio quality;

offering national or wider coverage with no retuning required by the user;

displaying song title and other information while the song is being played;

allowing access to the numerous channels of entertainment on either a commercial-free, subscription-based basis or a free, commercial-supported basis;

allowing instant access to traffic, weather, stock prices, and similar information, specifically tailored to the user's interests;

offering music and other entertainment for sale to the user in a more user-friendly manner than with current systems; and providing sponsors with precise numbers of users reached and their demographics.

Drawbacks of Terrestrial Radio Threats Overcome by the Present Invention

Each of the competitive threats to terrestrial radio has its own drawbacks, and it is an object of the present invention to offer a service that retains the advantages of the threats, while minimizing their drawbacks.

Because it is at a much higher frequency than terrestrial radio, satellite radio does not penetrate buildings, dense trees, or other similar barriers, causing dropouts in mobile receivers and lack of service in many fixed locations. By allowing satellite radio type services to be offered over the existing terrestrial radio frequencies, which penetrate barriers much better, the invention removes much of that drawback of satellite radio.

Internet radio requires an Internet connection and therefore has limited applicability to mobile users. By allowing Internet radio type services to be offered over the existing terrestrial radio frequencies, the invention removes that drawback of Internet radio. Further, current legal proceedings under the Digital Millennium Copyright Act (DMCA) are imposing a royalty structure that some claim may make Internet radio uneconomic. In contrast, the DMCA exempts digital broadcasts from FCC-licensed terrestrial broadcast stations from that royalty structure.

iPods™ and similar music playback devices have three drawbacks that are removed by the present invention. First, the user must spend considerable time and money to amass a satisfactory music collection. While a 60 GB iPod can hold 1,000 hours of music, it takes at least 100 hours of the user's time to load that music from CDs, and ten times that if the music is to be properly organized (e.g., rating each album or track, creating playlists, etc.). Similarly, choosing, downloading, and organizing 1,000 hours of music from Apple's iTunes Music Store™ would take an enormous amount of time. In both cases, the cost to acquire 1,000 hours of music is very high (approximately $15,000 for 1,000 CDs, each an hour long and costing an average of $15, either in physical or iTunes™ form). It is a further object of the present invention to offer a more user-friendly experience, requiring little or no user interaction in order to have access to a large library of music, well organized for listening pleasure, allowing the user to skip songs not to her liking, to access a particular song on demand, and to have other desirable aspects of an iPod™ like device. It is a further object of the present invention to make a large, diverse library of music available to users at a reasonable cost that also is economically attractive to music publishers and broadcasters.

A second disadvantage of iPod™ like devices and previous attempts to create user specific listening experiences is their lack of a "surprise factor" in which users are exposed to music they have never heard before or had forgotten existed. This surprise factor is greatly desired by many users, at least some of the time, and is one reason proponents of satellite radio do not see iPods™ and similar devices as direct competitors. It is a further object of this invention to maintain the surprise factor, while still allowing the user to skip unwanted songs and have other desirable features of an iPod™ like device.

A third disadvantage of iPod™ like devices is the lack of professional presentation of music tracks to be played. While users sometimes prefer to hear music in the order they have specified and without any extra information or introduction (hereafter called "music only mode"), at other times they prefer music as it is now broadcast on the AM, FM and satellite radio bands, with introductions by DJs and in an order that has been professionally selected (hereafter called "DJ mode"). It is a further object of the present invention to allow users to choose which of these two modes they prefer, to switch back and forth from one mode to the other, and to control the amount of DJ talk when in DJ mode. This also provides an advantage over satellite and Internet radio, where the user has no control over the nature of the broadcast.

Internet radio and, to a lesser extent, satellite radio and iPods™ suffer from lower than CD quality audio. It is a further object of the invention to allow CD or higher quality audio broadcasts within a spectrum allocation that previously could not support such broadcasts.

The Opportunity and the Challenge

If current trends in disk drive costs continue, by 2015 a drive costing $200 will hold approximately 150 TB (each terabyte equaling 1E12 bytes) and be capable of storing over 20,000 DVD-quality, full-length movies or 50 million iPod™-quality, 3-minute songs, or any mixture thereof.

As of January 2005, Netlflix's huge library of mail-order rental DVDs boasted "over 30,000" movie titles in its library and Apple's iTunes Music Store™ claimed "more than one million" songs for sale. Therefore it is likely that, sometime in the near future, a $200 disk drive will be capable of storing a library consisting of all commercially viable movies and music ever produced in the world.

While the discussion which follows assumes such a 150 TB drive, the present invention provides significant benefits with even a 100 GB drive, whose cost today is well under $100. Such a 100 GB drive can store 1,700 hours of iPod-quality music. If divided into 30 channels of different music genres, each genre can have almost 60 hours of music and, as described below, this library is continually updated. Thus, the following discussion which is based on a 150 TB drive is for illustrative purposes only and does not limit the scope of the invention to a future time frame when a 150 TB drive is cost-effective in consumer electronics devices.

This abundance of storage creates both a major opportunity and a major problem for content providers. The opportunity is to store a library of music, movies and other media in an inexpensive playback device which gives users instantaneous access to virtually any music, movie or other media ever produced. While solving some problems, this approach creates others which are solved by the present invention:

The value of the content would be too great for a consumer to afford. At $25 per movie and $1 per song, the content on a 150 TB disk would be worth between $500,000 and $50,000,000, dwarfing the $200 cost of the disk drive itself.

The time to download enough media to even partly fill the disk drive would be prohibitive. As explained below, bandwidth is already much dearer than storage and is likely to stay that way.

If, to avoid long download times, the content is preloaded at the factory when the playback device is manufactured (or at the store where the playback device is sold), new content would not be available to the user. New hit songs and hit movies are in the greatest demand and the greatest moneymakers for content providers.

Consumers would be overwhelmed by the number of choices in such a huge library.

Piracy would be exacerbated. If a pirate gained access to the content of the hard drive, he could wreak economic havoc on the content providers, whose entire libraries would now be compromised.

It is an object of the present invention to overcome the deficiencies of current systems, while avoiding or minimizing the problems listed above. A number of techniques can be adapted for dealing with the fact that the value of the content library is more than users can afford, for example (but not by way of limitation):

Access to the entire library, or portions thereof, can be rented to the consumer for a period of time (e.g., monthly).

Access to portions of the library (e.g., a single song, the contents of a single CD, or a single movie) can be sold to the consumer, either on a permanent basis or for a specified number of plays (e.g., three plays of a song).

The user can be billed periodically based on usage of the library. (If such usage information is known, then royalties can be paid to copyright owners accordingly.

Otherwise, a system similar to that used for paying royalties on blank tape would be used.)

It is an object of the present invention to implement such techniques in a secure manner which allows faster, ideally almost instantaneous, access to desired content than is possible with the prior art. It does so through the use of secure protocols, detailed below, to limit access to authorized (paid) users, and to limit authorized users to those portions of the library to which they are entitled.

Moore's Law, Storage, and Communications

This section explains why communications bandwidth is likely to remain much more expensive than bandwidth, thereby increasing the need for the present invention.

In 1965, Gordon Moore of Intel postulated what is now known as Moore's Law, that the computing power of ICs doubles approximately every eighteen months to two years, at no increase in cost per IC. Moore was extremely prescient as this trend has continued for four decades, up to the present time, reducing computing costs by at least a factor of a million, and by some measures much more.

Because the technology for creating hard disk drives is closely coupled to that for creating ICs, the cost of mass storage has decreased by a comparable factor over the same period of time, and indications are that the process should continue for at least another decade, opening up new possibilities in media broadcasting and distribution as detailed herein.

An analog of Moore's Law also applies to communications, such as telephone calls or Internet access, at least at a technological level. That is, the cost of providing communications could fall approximately as fast as for computing if there were a totally free market. However, there has not been, and is unlikely to be a totally free market in communications, so communications costs are likely to remain high relative to storage costs.

For many years, regulation by the FCC and its foreign equivalents kept communications costs artificially high in an attempt to subsidize consumers and rural subscribers at the cost of business. While that barrier has been largely pulverized by the Internet and a political climate that is fiercely resistant to its regulation, the fundamental nature of communications seems to resist a truly free market in which prices are set by the available technology.

When, in the 1970's, Digital Equipment Corporation (DEC) developed minicomputers that were as fast as an IBM mainframe and sold for a fraction of the cost, DEC flourished and IBM withered. Only by reinventing itself as a service company did IBM resuscitate itself. While IBM would have liked to prevent its customers from migrating to DEC's more efficient minicomputers, there was nothing IBM could do to stop them from purchasing and using those machines.

Similarly when, a decade later, SUN Microsystems developed servers based on microprocessors that were faster than DEC's minicomputers and sold for a fraction of the cost, SUN took over much of DEC's business. Again, while DEC would have dearly liked to stop this migration, it could not do so.

The same situation that applies to computers also applies to disk drives and other storage methods. When Moore's Law gives rise to a faster, larger, cheaper storage device, there is nothing existing suppliers can do to stop customers from buying it although, in contrast to the computer industry, disk drive manufacturers grasped that they must keep up with technology to stay alive, and are their own worst competitors.

However, the situation is totally different with communications. When a faster cable modem is developed, it does a person no good to buy one unless his cable company installs equipment which will communicate with that faster modem. Similarly, a faster DSL modem is at the mercy of the local telephone company's agenda. And, neither the cable company nor the phone company wants to cannibalize its high cost business-oriented services by offering inexpensive consumer service at those higher speeds.

Unlike computation and storage, communications is not a solitary activity. Two users who wish to communicate must do so over a network that is controlled by an entity with no interest in seeing prices drop precipitously, even though such savings are technologically possible due to an analog of Moore's Law. So, by its very nature, communications prevents a free market and communications costs are likely to decrease much more slowly than computation and storage costs.

Thus far, this section's discussion applies to "wired networks" (including fiber optics in that definition). When wireless communications are considered the situation is worse because the radio spectrum is a fixed, finite resource. If demand is great enough, a company can lay more fiber to increase communications capacity. But no one can create more spectrum. Hence decreases in wireless communications costs are likely to be even slower than for wired.

Storage vs. Communications Imbalance and Media Distribution

Current approaches to media distribution already suffer from an imbalance between storage and communications costs and, for the reasons discussed in the previous section, this imbalance is likely to worsen with time. Today, a consumer-level broadband modem operates at approximately 1 Mbps, so it takes roughly 15 hours to transfer just one DVD-quality, full-length movie over the Internet. In consequence, most movie sales and rentals today use physical transfer of DVDs, not electronic delivery. For example, users purchase a DVD at a retail store (e.g., Best Buy), purchase a DVD over the Internet for delivery by mail or other delivery service (e.g., Amazon), rent a DVD at a video store (e.g., Blockbuster), select a DVD over the Internet for delivery by mail or other delivery service (e.g., Netflix). Electronic delivery of movies, known as "video on demand," is in its infancy and will likely use lower than DVD-quality video to cut transfer times to a reasonable level.

Music requires less bandwidth and is therefore more amenable to electronic delivery, as evidenced by the popularity of Apple's iTunes Music Store™. However, even here, the user is limited by communication speeds to download just a few songs at a time without enduring an overly long wait. Again using 1 Mbps as a typical consumer-level broadband connection, it takes 80 minutes to send a 60-minute-long music CD, and it would take five and a half days to completely load a 60 GB iPod™. And, since the stated data rate is a maximum, the actual download times would likely be twice as long.

It is a further object of the present invention to minimize the deleterious effects of the growing imbalance between storage and communications costs, leveraging spectrum allocations (equivalently bandwidth, or data communications rate). It does so by substituting plentiful storage for scarce spectrum in novel ways, thereby producing up to 100 times and greater improvement in the effective use of the spectrum.

Discussion of Prior Art

The use of memory at a broadcast receiver to increase user satisfaction is well known in the art. DirectTV, for example, offers a TiVo™ equipped satellite television receiver, which can store programs on a hard drive and play them back at a later time. Usually, both the content to be stored and the content to be played back at a later time are decided by the subscriber. TiVo™ also has the capability to note the user's viewing habits and, if there is space on the hard drive, record similar programs automatically. However, the playback is user controlled, as opposed to automatic and does not simulate the experience of a live broadcast.

In U.S. Pat. No. 6,785,656 "Method and apparatus for digital audio playback using local stored content" Patsiokas et al describe a similar system for use with digital satellite radio. Since Tivo™ and its competitors are called PVRs (Personal Video Recorders), Patsiokas' invention might be called a PAR (Personal Audio Recorder). Weber et al U.S. patent application 2003/0236843 also improves the user experience for broadcast radio by recording broadcast music onto a mass storage device and either allowing the user to specify a playlist for the recorded music, or generating a playlist based on observed user preferences. Juszkiewicz U.S. patent application 2004/0199654 describes a system for use with the Internet, including usage reporting to the copyright owners for billing purposes.

In U.S. Pat. No. 6,564,003 Marko et al describe another use of memory with digital satellite radio. Marko demodulates the bit stream from a broadcaster, such as XM Satellite Radio, and records it on a memory medium (e.g., a recordable CD) for later playback at a location that either cannot receive the satellite signal or does not need real time reception. As in Patsiokas, the selection of the recorded program to be played back is subscriber controlled.

In U.S. patent application 2004/0083487 Collens et al describe a media distribution system which delivers content to a user in encrypted form and then delivers keys to unlock the content on a specific playback device.

In U.S. patent application 2004/0133923 Watson et al describe a digital home movie library in which a broadcaster wirelessly transmits movies to a set top box for storage onto a hard drive for later viewing by a viewer. Newly manufactured and refurbished set top boxes are preloaded with next month's content, approximately 30 movies, but do not become available until an appropriate time.

In U.S. patent application 2004/0225519 Martin stores a library of multimedia works on a storage device and plays a selection based on user preferences. Martin stores a library of multimedia works on a storage device, the multimedia works in the library being inaccessible except upon unlocking, and selectively unlocks portions of the library based on preference information indicative of preferences of a user of the multimedia works. Fees assessed to the user and royalties paid to rights holders can be based on the media played by the user. The stored works may be received on a removable medium, or may be downloaded wirelessly or through a wired connection.

In U.S. patent application 2002/0116277 "Portable audio system housing a preloaded purchaser selected library od [of] MP3 compressed music titles stored on a hard disk drive," Kraft describes a system similar to the current iPod™ for purchasing music over the Internet from a source similar to Apple's iTunes Music Store™.

In U.S. patent application 2003/0070174 Solomon describes a wireless video-on-demand system which uses a low bandwidth channel (e.g., FM and TV subcarriers, or paging bands) to send encrypted movies slower than real time. The movies are buffered in storage and, when completely received, made available on demand for VCR like viewing.

In U.S. patent application 2004/0266336 Patsiokas et al describe a system for recording and time-shifting a broadcast so that the user does not experience signal dropouts when a live signal is not available. Patsiokas also facilitates the purchase of live or time-shifted broadcast content.

In U.S. Pat. No. 6,289,455 "Method and apparatus for preventing piracy of digital content" Kocher et al describe a secure CryptoFirewall which protects critical portions of memory so that cryptographic keys used by a cryptoprocessor are inaccessible to all other parts of the system. These keys are made inaccessible to avoid the danger of a pirate attempting to learn them, creating a CryptoFirewall in Kocher's terminology.

This architecture prevents the frequent error in the implementation of cryptographic systems of storing keys in normal read-write memory where the keys are potentially accessible to piracy. The thinking behind this frequent error is that keys need to be written when entered and read when used for encryption or decryption. While this is true, allowing keys to be read by parts of the system which have no need for them other than for piracy, is extremely dangerous.

In U.S. patent application 2003/0014767 Stumphauzer has a user of a radio broadcast service generate a personalized playlist on a web site. The playlist is subsequently transferred to a receiver either by the broadcast service or the user. The receiver then monitors the available programming contents of all of the programming channels and determines if any of the programs being broadcast match any of the selections on the playlist. If a match exists, then the receiver automatically tunes in the channel playing the matching program.

In U.S. patent application 2003/0129941 Kawamata et al buffer past signals to allow switch over to stored content when the signal is lost. The substituted content can be based on user preferences. Kawamata uses a directed, bidirectional channel such as a cell phone channel to communicate lost packets to a user of a unidirectional non-directed (i.e., broadcast) channel such as a satellite channel. Since, in normal operation, only a small fraction of packets is lost on the satellite channel, the higher cost associated with the cell phone channel is not as much of an issue as if the cell phone channel were used for the entire communication.

In U.S. Pat. No. 6,697,608 "Digital audio/visual receiver with recordable memory" King-Smith describes a broadcast receiver with memory to give the user a wider selection of content.

In U.S. Pat. No. 6,434,622 "Multicasting method and apparatus" Monteiro et al use multicasting over the Internet to target advertising based on user demographics.

In U.S. patent application 2003/0236843 Weber et al use multicasting networks to provide enhanced personalization of playlists and demographically targeted advertisements.

In U.S. Pat. No. 6,845,230 Syed uses a GPS module and an uplink module (a reverse channel) to provide broadcast data specific to the receiver's location. The uplink is also used to transmit profile information defining the user's desired broadcast format, to dynamically update private keys used for authentication and decoding, and for buy activities.

In U.S. patent application 2004/0133914 Smith et al simulate a broadcast of a number of channels using digital media content stored in memory. Targeted advertisements are inserted into the simulated broadcast which advertisements can depend on demographics, time of day, geographical location, and frequency of play of the advertisement.

In U.S. Pat. No. 6,163,683 Dunn et al use a mixture of analog and digital transmissions with multiple transmitters to cover a larger area than is possible with just one transmitter. The radio receiver automatically retunes to a new transmitter as it crosses from the area served by one transmitter into the area served by another transmitter. A secondary channel is used to control storage of program information at receivers for delayed playing and to allow for playing previously transmitted and stored material that is locale-specific (e.g., information on and ads for local hotels, gas stations, etc.).

In U.S. Pat. No. 6,725,022 Clayton et al also utilizes automatic retuning of receivers as a mobile receiver loses the signal from one transmitter and gains the signal from another transmitter of the same format. Clayton also makes use of wireless communication between an Internet gateway and receivers to personalize broadcasts; to allow the user to communicate preferences from a PC to his receiver; to communicate information to the user that is stored in the receiver (e.g., information on a broadcast that the user indicated interest in); to communicate information on purchases authorized by the user (e.g., by pressing a BUY button); and to communicate program material to the receiver for storage and later playback.

In U.S. Pat. No. 6,600,908 Chan uses inaudible digital information modulated onto an FM signal to convey traffic, stock, weather, sports, and similar information to a user of an FM radio. This information is made available "on demand" by the user pushing a button and allows the FM station to broadcast its normal media (e.g., music) without interruption for conveying the on demand information. Users can access the on demand information when they want, rather than at preset times of the station's choosing.

In U.S. patent application 2004/0116070 "Method, system, and computer program product for providing multi-tiered broadcasting services," filed Nov. 20, 2003, Fishman et al describe a tiered subscription system for use with satellite radio. The present invention gives the broadcaster greater control than Fishman, thereby providing a better experience for the subscriber and more effective exposure for the advertiser. For example, in the present invention, specific songs can be deleted to make room for ads, ads can be targeted to specific subscribers, ads are less likely to be lost in transmission, ads that are lost in transmission are replaced by similar ads, audit information is provided to the broadcaster and advertiser, and the radio receiver is more secure.

In U.S. Pat. No. 6,834,156 Marko et al increases bandwidth efficiency in a digital broadcast system by storing content segments such as musical recordings and prerecorded commercials in a local memory in the receiver. At least some of the locally stored content segments are encrypted. The transmission bandwidth requirement is reduced when a content segment index or identifier and progress data is transmitted in lieu of the corresponding content segment. Marko also allows the user to purchase a broadcast program by pressing a button, thereby initiating an information exchange with a distribution center, resulting in the requested broadcast being decrypted and stored on a portable storage device (e.g., an optical disc).

In U.S. Pat. No. 5,815,671 Morrison describes a system for customizing entertainment for individual subscribers which includes the possibility of offering commercial-free service to some subscribers and commercial-supported service to other subscribers. Further, commercials can be targeted to specific program subscriber groups. Morrison transmits program materials, commercials, announcements and other message materials, with program break flags and message flags interspersed to indicate where message materials (e.g. commercials) are to be inserted in the program materials, while the message flags identify the particular message to be inserted.

In U.S. Pat. No. 6,463,585 Hendricks et al describe a multiple channel architecture to allow demographically targeted TV advertising. Information reported by the receiver to the cable head end is used to generate billing for commercial advertisers, and to analyze viewer watching habits.

U.S. patent application 2005/0222764 of Uyeki et al and related U.S. patent application 2005/0222760 of Cabral et al describe vehicles navigation systems which utilize traffic information to facilitate routing. Similarly, the recently released Garmin 2370 Street Pilot and similar devices utilize traffic information obtained via satellite or FM radio to automatically calculate and suggest faster alternative routes.

The present invention can be viewed as using a highly advanced codebook to reduce the communications burden. Codebooks have been used for hundreds of years, with the international distress signal SOS being a very simple example. Instead of sending the message, "Help, I need assistance!" the operator sends the much shorter codeword "SOS" instead. Codebooks have been in use since at least the nineteenth century to compress transmissions. As noted by David Kahn in *The Codebreakers* (Macmillan, N.Y., 1967) pp. 189-190:

"Samuel F. B. Morse sent, "What hath God wrought!" in 1844. The next year his lawyer and promotional agent, Francis O. J. Smith, published a commercial code . . . Smith's pioneering venture was followed by dozens, then scores, then hundreds of commercial codes. Though a few had as many as 100,000 entries . . . most [were] in the neighborhood of Smith's 50,000-entry size. . . . And they greatly increased the number of phrases [as opposed to individual words], thereby raising their toll-saving potential."

More modern work also uses codebooks for data compression with the widely used Huffman Coding and LZ (Lempel-Ziv) algorithm being prime examples. Huffman coding (D. A. Huffman, "A Method for the Construction of Minimum Redundancy Codes," *Proceedings of the IRE*, vol. 40, pp 1098-1101, 1962) uses codes with short bit patterns to represent frequent source symbols and longer bit patterns to represent infrequent source symbols, much as Morse code uses a single dot for the letter E versus two dashes and two dots for the letter Z, taking three times as long to send a Z as an E (including inter-letter spacing). In "A Universal Algorithm for Sequential Data Compression," *IEEE Transactions on Information Theory*, vol. IT-23, No. 3, May 1977, pp 337-343, Ziv and Lempel note (page 337 bottom of first column): "In this paper, we describe a universal coding scheme which can be applied to any discrete source and whose performance is comparable to certain optimal fixed code book schemes designed for completely specified sources." The LZ algorithm keeps a running codebook of bit sequences that have already been seen by the encoder and decoder, uses codewords to represent those sequences so they can be compressed when they are seen again, and creates extensions of the codebook (a form of update) as new sequences are seen. It is universal in the sense that, as the number of encoded source bits tends to infinity, the performance of the LZ algorithm is as almost as good as that of any other compression algorithm.

Codebooks have also been used in vector quantization of speech, video, and other information. Y. Linde, A. Buzo and R. M. Gray, "An algorithm for vector quantizer design," IEEE Transactions on Communications, Vol. COM-28, pp. 84-95, January 1980, is the seminal reference in this area. Statistical clustering via the Lloyd algorithm (often called k-means) is used to design a reproduction codebook. A nearest neighbor search finds the best match for an input vector and an index, chosen from the "channel codebook," is transmitted or stored. The decompression is a table lookup using the index to find the selected reproduction codeword. Linde's codebooks are precomputed (trained), but updateable versions ("codebook replenishment") came soon after, especially for video coding. There is also a literature on adaptive algorithms, where codebooks are modified on the fly, and universal algorithms, where the codebook is composed of many subcodebooks. Unlike Huffman and LZ coding which is lossless, the vector quantization literature introduces distortion into the process.

SUMMARY OF THE INVENTION

While the invention is illustrated using specific technologies and examples, all such technologies and examples are intended solely for illustrative purposes and not by way of limitation. Similar technologies and examples known in the art or developed in the future can be substituted without departing from the spirit of the invention. Unless otherwise stated, all descriptions below are of the preferred embodiment. For clarity of exposition, that limitation will not be repeated each time it applies and is tacit.

Similarly, whenever an embodiment is said to use any method known in the art to accomplish a goal, that includes both methods known currently or developed in the future. Again for clarity of exposition, the inclusion of methods developed in the future is tacit.

The present invention takes advantage of the rapidly decreasing cost of storage. It uses storage to leverage scarcer, more valuable bandwidth. As a specific example, the preferred embodiment uses terrestrial FM radio broadcast of audio entertainment, allowing an FM channel (synonymous with FM station) that now broadcasts one channel of medium-quality audio entertainment to instead broadcast 100 channels of CD-quality audio entertainment without any increase in the station's spectrum allocation. (While the spectrum utilized will be referred to as "an FM channel" and the transmitter or station referred to as "an FM transmitter or station," it should be understood that FM refers to the current band designation, not necessarily the modulation format utilized.)

In the preferred embodiment each playback device (synonymous with "radio" and "receiver") includes a hard disk drive with a storage capacity of 10 TB. While this amount of hard drive memory currently (mid-2006) requires an array of individual drives costing approximately $3,000, such a disk drive will be cost effective in low-end consumer electronics in the near future. Since Apple's iTunes™ Music Store's 128 kbps music is indistinguishable from CDs to the vast majority of users, a 10 TB disk drive can hold over 170,000 hours of near CD quality audio entertainment. Assuming that a "heavy" user listens to 8 hours of radio per day, 250 days per year, he will be listening to radio 2,000 hours per year. A 10 TB drive allows such a user to go for well over 80 years before he would hear repeated content, if all stored content is of interest to him. If, as is more typical, 100 different genres or channels of audio entertainment are stored on the disk drive and a user listens primarily to 5 of these channels (never listening to 95% of what is stored), that reduces the "time until repetition" by a factor of 20 to 4 years, still long enough to satisfy any reasonable user.

While iPods™ and similar playback devices will also benefit from reductions in storage costs, the present invention has a number of advantages over such playback devices:

The user is spared spending endless hours loading the playback device with music of his choosing. This is already a problem and will become much worse with larger drives.

The user is spared the burden of generating playlists and constantly modifying playlists to prevent them from getting "stale."

The user is presented with new songs she has never heard before or had forgotten about, preserving the "surprise factor" of current radio broadcasts.

The user is not restricted to "music only mode." Rather, he is given a choice between "music only mode" and "DJ mode" and, in DJ mode, a choice as to the amount of DJ talk and even the DJ's language.

The user can choose a format that is indistinguishable from current radio broadcasts (either terrestrial or satellite), but with a much wider selection of content than on current terrestrial broadcasts, exceeding even current satellite radio offerings.

The user can choose between different priced tiers of service including free, commercial-supported entertainment and subscription-based, commercial-free entertainment.

These advantages are obtained by:

preloading, at the time a playback device is manufactured, a huge library of digital audio content segments onto the playback device's 10 TB hard disk drive;

transmitting new content segments (content library updates) to the playback device, as they become available;

preloading at the time of manufacture a playlist library (herein synonymous with a collection of playlists) with one or more playlists for each of the 100 channels to be broadcast using the playback device's 10 TB hard disk drive;

transmitting new channel playlists (playlist library updates) to the playback device, as they become available, and storing them on the playback device's 10 TB hard disk drive;

using each channel's currently effective playlist to control the order in which library content segments are played on that channel on the playback device; and transmitting monthly user authorization messages to each playback device indicating the tier of service (e.g., commercial-supported or commercial-free) to which it is entitled and providing one or more cryptographic keys which gives the playback device access to content segments that are included in that tier's playlists for the month.

As described in detail below, in the preferred embodiment all transmissions referred to above are done via a combination of an FM channel, the Internet, a PC, and a WiFi (IEEE 802.11x) network. Note that preloading information on a playback device at the time of manufacture, as described above and used herein, is different from the manner in which the term "preloading" is usually used in the art. Usually preloading refers to loading a content segment a short time (e.g., hours or days) before the user requests that the content segment be played, whereas herein preloading refers preferably to preloading content segments at the time of manufacture. Herein, even if content segments are loaded after the time of manufacture (e.g., at the time of sale), they are long-lived (preferably never being deleted) and hence will often have been preloaded months or even years before the user requests that the content segment be played.

While a single FM channel can be used by the present invention to broadcast 100 channels of high quality audio, the preferred embodiment utilizes a network of FM stations which are dedicated to use in the present invention. FCC approval will likely be required for this approach, but that is a non-technical barrier that is not of concern here. Hopefully, the improvements that the present invention will provide to the public will encourage any such required approvals, and alternative embodiments exist which do not require regulatory approval. A network of dedicated FM stations is preferred since that provides coverage over a larger geographic area, for example the Continental United States, as well as a higher data rate.

Information sent to a playback device over the Internet is buffered on a PC and sent over a WiFi network connected to the PC when the playback device is within range of the PC's WiFi network, a technique known as a "store and forward communication network." The WiFi network is also used in peer-to-peer mode to transfer information between PC's and playback devices that are within range of one another. Such peer-to-peer transfers are particularly valuable in mobile playback devices. For example, as car #1 passes car #2 or a PC/WiFi location, if the playback device in car #1 needs information available from car #2 or the PC/WiFi location, that information is passed to car #1 over the WiFi network in a short, high-speed burst. The mobile portion of this peer-to-peer network is of variable geometry (i.e., it can change as cars move in and out of range of one another and of fixed WiFi locations). This peer-to-peer network is also used to allow playback devices that are unable to communicate directly with the broadcaster (e.g., are out of range of PC/WiFi locations for more than a preset time period, such as one day) to communicate with the broadcaster via a combination of the peer-to-peer network and at least one of the elements of that network which is able to communicate with the broadcaster. Any known protocol for establishing peer-to-peer networks and for using peer-to-peer networks to communicate with a "server" or "host" can be used.

Since the Internet/WiFi network combination is bidirectional (unlike the usual FM channel which is unidirectional), each PC can communicate with the broadcaster (the owner of the network of FM channels) over the reverse part of the Internet/WiFi channel (also called the reverse channel) to tell it which playback devices, if any, are currently in range of its WiFi signal and which data packets transmitted over the FM channel, if any, are missing on each of those playback devices. The broadcaster then directs missing packets and other information over the Internet to individual playback devices without any intervention on the part of the user. The broadcaster also makes use of this information (which transmitted packets are missing on which playback devices) to decide which packet retransmissions over the FM channel should be given highest priority. The bidirectional Internet/Wifi channel is also used for feedback to the broadcaster on user listening habits, billing for purchased music, etc. as detailed later.

A playback device in an automobile on a freeway can utilize the peer-to-peer network formed with playback devices in automobiles in front of it to alert a PC/WiFi location that it will soon arrive and which data packets it is missing. That way, the PC/WiFi location can take whatever steps are necessary (e.g., communicating with the broadcaster over the Internet to obtain the required data packets) to have the required data packets ready for immediate transmission when the playback device comes in range.

As in current playback devices, a user interface allows the user to specify the channel to which she wishes to listen, causing that channel's current playlist to become effective. Determination of a channel's current playlist can be accomplished in a number of ways. For example, playlists can have times during which they are to be used (e.g., so that quiet music is played at night, or so that Christmas music is only played from December 1 through December 27, etc.), they can be used in numerical order, or commands can be broadcast telling playback devices the current playlist for each channel. It is also possible to broadcast the playlist in essentially real-time, rather than retrieve the playlist from memory.

The content library includes content segments of all types currently found on radio broadcasts, including music, news, interviews, sporting events, DJ introductions, station announcements, commercials (herein used interchangeably with "advertisements"), etc. By concatenating these content segments into a playlist (possibly with fade-in, fade-out, overlap, etc.), the broadcaster can create an audio program characteristic of a radio broadcast, by which is meant that the audio program thus produced is similar to current radio broadcasts on the AM, FM or satellite radio bands. The primary differences between the audio program produced by the present invention as just described and a current radio broadcast are the lack of dropouts, the much greater channel selection, and the choice of tier of service.

The present invention allows new options as well, such as allowing the user to choose between music only and DJ modes. This is accomplished by creating two playlists for each channel, one with DJ introductions to songs and one without such DJ introductions, and letting the user select which playlist to use. (Creating these two playlists can either be done by the broadcaster, or as described late herein, by deleting the introduction segments from a single playlist.) Similarly, by having different DJ introductions to each song, some longer and some shorter, the user can control the amount of DJ talk by specifying a preferred length for DJ introductions (either quantitatively qualitatively) and having the playback device select the DJ introduction most compatible with the user specified preference. Or, the playback device can have more than two playlists for each channel: one with no DJ introductions (music only) and several with different levels of DJ introductions (DJ mode, with user-controllable amounts of DJ talk). Further, the playback device includes a skip button which allows the user to fast forward through and/or skip the rest of a content segment, allowing the user to shorten DJ introductions in that manner as well. Since DJ introductions are much shorter than the songs they precede, the additional memory and bandwidth required for these options is small. And, as will be shown below, playlists are a very small fraction of the information stored and transmitted. Hence offering the user the option of different levels of DJ talk places almost no additional burden on system resources.

Similarly, DJ introductions in different languages can be offered with very little additional storage or bandwidth requirements. The user can also be offered subchannels within each channel. For example, a 1960's rock music channel can offer subchannels for 1960's acid rock, 1960's English rock, and 1960's Motown music; a classical music channel can have subchannels by type (e.g., sonatas, concertos, symphonies, opera, etc.), by composer, and by instrument (e.g., bassoon, piano, etc.) or instrument class (e.g., woodwinds, strings, etc.) To avoid user overload, particularly when the playback device is in a moving vehicle, such subchannels are options, not required selections. Selecting a channel without taking additional action to request a subchannel reverts to a default playlist for that channel.

The preferred embodiment manages the large number of choices created by these options via a tree structure in the user interface. First, the user selects a channel of audio entertainment, for example 1960's rock music. At this point, the playback device initiates action to use a playlist consisting of the default 1960's rock channel. The user is also asked via the user interface if she wishes to choose other than the default settings, for example by pushing a button. If the user indicates that she wishes a non-default setting, then a menu with several levels of DJ talk is offered, followed by a menu with different subchannels (e.g., 1960's acid rock, 1960's English rock, 1960's Motown music, etc.). A final menu can then offer different DJ languages, but since the language choice is likely to be the same for all channels, the preferred embodiment uses a setup menu to select DJ language and remembers that choice until it is changed.

While usually a DJ introduction will be associated with just one song, it is possible for a DJ introduction to be associated with multiple songs, for example two versions of the same song or two related songs. Also note that the variable DJ introduction aspect of the present invention is applicable to alternative embodiments in which only the variable DJ introductions are stored on the playback device or, more generally, only part of the content library is stored on the playback device.

Because playlists require so little bandwidth, playlists for the non-default settings can either be entirely new playlists or derived from the default playlist. In the latter event, for example, the 1960's acid rock subchannel playlist can be derived from the default 1960's rock channel playlist by including an indicator for the subchannel as part of the content segment number (described in detail later) or by the addition of a totally new field. With this approach, the playlist for the 1960's acid rock subchannel playlist is derived from the default 1960's rock channel playlist by only playing content segments whose subchannel indicator specifies the 1960's acid rock subchannel. In the case of a non-default DJ language or amount of DJ talk, the new playlist can be derived from the default playlist by specifying which content segments on the default playlist are to be replaced and which new content segments (if any) are to replace them. Such techniques are especially useful for creating a number of options for classical music. For example, playlists for a particular composer, a particular artist, or a particular instrument can easily be created by including subchannel indicators based on those criteria.

The present invention allows commercials to be customized for and directed to different demographic markets. When a playlist specifies a commercial is to be played, it can specify different commercials to be played to different demographic groups, with the demographic group being stored in the playback device. For example, if the demographic information is the user's zip code, a user from a wealthy zip code can be given more commercials for brokerage houses, banking opportunities, etc. while a user from a less wealthy zip code can be given more commercials for discount stores, debt consolidation services, etc. Demographic information can also include, for example, purchasing decisions of the user, web sites visited by the user, web searches performed by the user (e.g., obtained from Google), his credit history, and feedback from the receiver to the broadcaster on the listening habits of the user.

Playlists optionally have start and stop times, before which and after which they cannot be used. Start times allow media to be placed on the playback device's hard drive before their official release dates, yet not be accessed until the producer of the media allows. This is of particular value in an alternative embodiment for broadcast of television media, ensuring that viewers cannot access a pilot program, a season premiere, a season finale, or other program with time-value before its intended broadcast time. It is also useful for broadcast of audio media, such as songs, that have specific release dates.

Even though many of the audio content segments played by a playback device in the above-described preferred embodiment are preloaded at the factory rather than broadcast to the playback device, from a technical point of view the broadcaster is still broadcasting even those audio content segments. This is because the broadcaster's transmissions are an extremely efficient form of source coding or data compression, utilizing an advanced form of code book. Code books used in the telegraph era had long lists of phrases that were replaced by short alphabetical or numerical equivalents. Thus for example, a naval code might have equivalents such as "Proceed at full speed to"=15297; "Pearl Harbor, Hi."=05417; "Commence firing"=91746; etc. With five digit equivalents, such a code can handle 100,000 phrases, letters of the alphabet, numbers, etc. The message "Proceed at full speed to Pearl Harbor, Hi." would then be encoded as 15297, 05417. Since, on average, the phrases in the code book are typically much longer than five characters each, the encoding process compressed the message considerably. In the present invention, the library of content segments is a form of codebook and the content segments specified in a playlist are an extremely efficient compressed form of those content segments.

Using the preferred embodiment outlined above, the present invention allows FM stations to offer a large number of channels with diverse offerings of higher quality. It can do so because content library updates, playlist library updates, and user authorization messages require much less bandwidth than real-time broadcast of high quality audio. For example, a music channel requires approximately 1.4 Mbps if encoded in CD format and approximately 100-200 kbps for near CD quality audio if encoded in MP3, AAC, or similar compressed formats. In contrast, as shown immediately below, a playlist for a popular music channel requires approximately 0.12 bps, a reduction by a factor of a million when compared with compressed formats, and a factor of ten million when compared with CD encoded music. A radio service offering 100 such channels has a playlist data rate of 13 bps, an almost negligible requirement.

Playlist Library Updates Data Rate

The data rate of a channel's playlist is derived as follows: As noted earlier, a 10 TB hard disk drive can store 170,000 hours of near-CD-quality compressed music. At an average of three minutes per song, this translates into a content library of 3.5 million songs, over three times the current size of Apple's iTunes Music Store™. Since $2^{22}$>3.5 million, 22 or more bits are sufficient to specify such a three minute song within a playlist and the preferred embodiment uses 24 bits to specify a content segment number. Playlists consist of sequences of such 24-bit content segment numbers, resulting in a playlist data rate of (24 bits)/(3 minutes)=8 bits/minute=0.13 bps per channel.

Alternative embodiments using, for example, 64 or 128 bit content segment numbers, have a corresponding increase in data rate. But using even 128 bit content segment numbers results in only 0.70 bps per channel. Similarly, alternative embodiments which specify a fade in, fade out, and overlap in a sequence of content segments (as in many current radio broadcasts) do not unduly increase the data rate. For example, if the fade in time (time for ramp up of volume at the beginning of a content segment) is between 0 and 8 seconds in half second increments, four bits suffice to specify the fade in time. Similarly, four bits suffice for a fade out time (time for ramp down of volume at the end of a content segment) with the same range of possibilities. Four additional bits can specify any sixteen possible overlap times of successive segments, with negative overlap times indicating a period of silence between content segments. Overall, these twelve additional bits increase the playlist date rate by 50% compared to merely using a 24-bit content segment number. In a similar manner, more complex fade in, fade out and overlap strategies can be specified with only a minimal burden on data rate, as can other possibilities (e.g., playing only the first T seconds of a content segment). Herein, reference to a sequence of content segments specifically is intended to include both simple concatenation of content segments as well as more complex sequences, such as those with fade in, fade out, and overlap.

Returning to the preferred embodiment, the 0.13 bps per channel data rate is approximate and depends on the length of songs and other factors. For example, it can be reduced by compressing the data in the playlist (e.g., using 8 bits to specify one of up to 256 genres of music, 16 bits to specify a song within that genre, and only sending genre information when it changes from one song to the next), but will be increased somewhat when filler content, commercials, etc. are included in the playlist. But 0.13 bps per channel is so small a data rate that such changes do not alter the clear conclusion that playlist library update data rates will be a negligible burden. For example, the preferred embodiment's 100 channels require 13 bps if playlists are never repeated and there is one playlist per channel. If there are 9 playlists per channel (e.g., for three tiers of service, each with three levels of DJ talk), that requires 117 bps, still a negligible burden. Further, even that burden can be reduced by data compression since playlists that are the same except for different tiers of service, different levels of DJ talk, and different time periods are highly correlated.

Playlist updates can either specify completely new playlists or modifications to existing playlists. Examples of modifications to a playlist which already consists of 500 content segments include:

Add content segment #1047652 (but specified as a 24-bit binary number) after the $125^{th}$ content segment of the current playlist.

Delete the $400^{th}$ content segment from the current playlist.

Replace the $437^{th}$ content segment of the current playlist with content segment #98247.

Key Distribution Data Rate

While some content segments such as commercials, DJ introductions, and station announcements may not require protection and may not be encrypted, valuable content segments such as music are encrypted. The preferred embodiment uses NIST's Advanced Encryption Standard (AES) for all conventional (symmetric) encryption operations. AES allows 128, 192 and 256-bit keys and all three key sizes are used. AES is specified in FIPS PUB 197 available on-line at http://csrc.ni st.gov/publications/fips/fips 197/fips-197.pdf and in hard copy form from the Government Printing Office.

AES has a 128-bit block size, meaning that plaintext (unencrypted data) is operated on in 128-bit portions to produce 128-bit ciphertext portions, and vice versa. If a plaintext, other than a key which is to be encrypted, is longer than 128 bits, the plaintext is broken into 128-bit blocks and encrypted using AES in cipher block chaining (CBC) mode as defined in NIST Special Publication 800-38A "Recommendation for Block Cipher Modes of Operation." For example, a content segment (CS) consisting of a three minute song encoded at 128 kbps is 23,040,000 bits long and will be broken into 180,000 plaintext content segment blocks, denoted $CS_1$, $CS_2, \ldots CS_{180000}$, which are encrypted into encrypted content segments (ECS's) consisting of 180,000 128-bit blocks $ECS_1, ECS_2, \ldots ECS_{180000}$. via the relation $$ECS_i = E_{CEK}(CS_i + ECS_{i-1}) \text{ for } i=1, 2, \ldots, 180000$$

where $E_K(P)$ denotes the AES encryption of the 128-bit quantity P under key K, +denotes the XOR operation (bit-by-bit addition mod-2), CEK is the 128-bit content encrypting key used to encrypt this content segment, and $ECS_0$ is an initialization vector as defined in NIST Special Publication 800-38A "Recommendation for Block Cipher Modes of Operation.". Because XOR is its own inverse, the decrypting operation is $$CS_i = D_{CEK}(ECS_i) + ECS_{i-1} \text{ for } i=1, 2, \ldots, 180000$$

where $D_K(C)$ denotes the AES decryption of the 128-bit quantity C under key K.

Keys longer than 128 bits are encrypted using AES's Counter Mode, as described in NIST Special Publication 800-38A "Recommendation for Block Cipher Modes of Operation." Counter mode has the advantage that the resultant ciphertext is the same length as the plaintext, even if the plaintext is not a multiple of the 128-bit AES block size. In contrast, CBC mode pads out any partial plaintext blocks since CBC must act on multiples of the block size.

Keys which are 128 bits in length are encrypted using AES's Electronic Code Book (ECB) Mode, as described in NIST Special Publication 800-38A "Recommendation for Block Cipher Modes of Operation."

AES is extremely secure, so that breaking into the hard disk drive which stores the encrypted content library has no value to a thief without also learning the keys used. Content providers can therefore entrust large, extremely valuable content libraries to the present invention with no economic threat. (Further, breaking into the hard disk drive is made difficult via physical security mechanisms known in the art.)

Encrypting content segments does, however, place an added communication burden on the system since a playlist is of no value to a playback device without the content encrypting keys needed to decrypt content segments specified by that playlist. To minimize this added burden, each content segment's 24-bit content segment number (defined immediately above in the section "Playlist Library Updates Data Rate") is divided into a content group number (the first 16 bits of the 24-bit content segment number) and a content group segment number (the last 8 bits of the 24-bit content segment number), and all content segments within a group are encrypted using the same 128-bit content encrypting key. (In alternative embodiments, groups of content segments can be larger or smaller, including one content segment per group, in which case there are effectively no groups.)

Preferably, if a playlist for a particular channel at a particular tier of service utilizes one content segment in a content subgroup, then all $2^8=256$ content segments in that content segment group will be used either by that playlist or by another playlist for that channel and tier of service which is effective within the same month. This condition is useful for reducing the key distribution data rate since, as discussed immediately below in "User Authorization Message Data Rate," playback devices are sent monthly authorization messages which include a "key of the month" for the playback device's tier of service, with the key of the month encrypted in a key specific to each playback device. All content encrypting keys needed by a tier of service during that month are transmitted to users' playback devices entitled to that tier of service (either broadcast over the FM channel or communicated over the Internet/WiFi channel; either all at once or on an as needed basis or a combination of the two) encrypted in the key of the month for that tier of service and with an additional 16 bits to specify the content group number with which each content encrypting key is to be used.

In the preferred embodiment, content encrypting keys, encrypted under the key of the month for a tier of service are included as part of a playlist for that tier of service, at the first occurrence of a content segment that month which needs that content encrypting key. After decrypting these content encrypting keys, playback devices store them in protected memory (described in detail later) and erase them at the end of the month. (An alternative embodiment sends all content encrypting keys needed during a month by a tier of service in a separate message, rather than as part of a playlist. Another alternative embodiment stores content encrypting keys for as long as the playback device is authorized to the tier of service associated with the playlist that included the content encrypting key.)

With the above described preferred embodiment, and assuming three minute encrypted content segments, the key distribution data rate is (128+16) bits/key*1 key/(256*3 minutes)/channel/tier of service or 3.125E-3 bps per channel per tier of service. (The factor of 256 comes from the fact that each key is used to encrypt 28=256 content segments.) With 100 channels and 3 tiers of service, the overall key distribution data rate is approximately 1 bps, even more negligible than the playlist data rate computed in the preceding section.

The above described method uses a key hierarchy with three keys. For a given content segment, these keys are: the key specific to a playback device, the key of the month (which is sent encrypted under the key specific to the playback device), and the content encrypting key for that content segment (which is sent encrypted under the key of the month).

User Authorization Message Data Rate

User authorization messages are sent monthly to each authorized user's playback device indicating the tier of service to which that user's playback device is entitled and providing a key of the month which gives that playback device access to all encrypted content segments included on that tier of service's playlists for that month. In the preferred embodiment, a user authorization message consists of the following fields:

a 48-bit field specifying the serial number of the user's playback device;
a 32-bit field specifying the current date and time;
a 4-bit field specifying the month for which the authorization is valid;
a 4-bit field specifying the tier of service to which the user is entitled;
a 192-bit field specifying the key of the month for the authorized tier of service; and
a 160-bit field providing a digital signature, produced by the broadcaster, proving that the user authorization message is legitimate.

Each playback device is manufactured with a unique serial number (accessible to its microprocessor) and cryptographic key (hereafter its device key) so that messages can be addressed to a particular playback device and, when appropriate, be encrypted in a manner that only that playback device can decrypt. (In alternative embodiments serial numbers and/or cryptographic keys may be shared by more than one unit, for example when all billed to the same account. In another alternative embodiment, each playback device has multiple device keys.) Since $2^{48}$ is approximately 280 trillion, a 48-bit serial number allows as many playback devices as desired to be manufactured without running out of serial numbers.

The current date and time, accurate to one second in 100 years, can be specified by a 32-bit number. The month for which the authorization is valid can be specified by a 4-bit number, allowing authorizations up to 16 months beyond the month of the current date and time. Time can either be absolute or relative.

Under the reasonable assumption that there are no more than 16 tiers of service, another 4-bit number can specify the tier of service to which the user is entitled.

The key of the month for the authorized tier of service is a 192-bit quantity and is sent to each playback device encrypted in Counter Mode by AES using that playback device's 256-bit device key so that the key of the month cannot be used by playback devices other than the one for which the user authorization message was intended. (As already described in "Key Distribution Data Rate," once a playback device has the key of the month for a tier of service, that allows it to decipher content-encrypting keys which are themselves encrypted in the key of the month.)

A 160-bit digital signature is used to prevent opponents from injecting spurious messages which might cause playback devices to use an incorrect key of the month, thereby sabotaging the broadcasting service. (The digital signature is not needed to prevent playback devices from accessing tiers of service to which they are not legitimately entitled because the key of the month, and hence the content encrypting keys, for those tiers of service will not be known to an unauthorized playback device). Digital signatures are well known in the art and are described for example in NIST's FIPSPUB 186-2 "Digital Signature Standard (DSS)", available on-line at NIST's web site or through the Government Printing Office. FIPSPUB 186-2 requires the use of the Secure Hash Algorithm (SHA) described in NIST's FIPSPUB 180-1, "Secure Hash Standard", also available on-line at NIST's web site or through the Government Printing Office. The variant of SHA described in FIPSPUB 180-1 is called SHA-1 since it is slightly different from the original FIPSPUB 180's SHA. While the DSS allows variants, the preferred embodiment of the present invention uses 160-bit signatures as specified therein. The preferred embodiment uses public key cryptography's digital signatures instead of conventional cryptography's message authentication codes (MAC's) to avoid placing the broadcaster's secret key in any playback device. This way, even if an opponent takes apart a playback device and learns the broadcaster's public key used to authenticate the digital signature, the opponent is unable to generate new digital signatures from it. Alternative embodiments can use other digital signatures (e.g., RSA) or MAC's.

Combining the lengths of the various components of a user authorization message, the overall length is 48+32+4+4+192+160=440 bits and the associated data rate is 440 bits/month/user=0.00017 bps/user. In the preferred embodiment, user authorization messages are sent over the Internet/WiFi network combination and are a negligible burden. Because of its bidirectional nature, this embodiment allows the broadcaster to detect if clones of a playback device have been constructed, when more than one of them requests a user authorization message for the same serial number playback device; and greatly reduces the number of user authorization messages that must be transmitted. Without a reverse channel, the broadcaster does not know if a user authorization message has been received, for example if a car is parked in a garage, and must therefore transmit each user authorization message many times to ensure uninterrupted service.

In alternative embodiments which do not have access to a bidirectional communication channel such as the Internet (e.g., if all communications are over FM channels or over a satellite channel), a large system with 100 million users requires at least 17 kbps for user authorization messages, and probably several times that rate due to the need, noted above, to repeat user authorization messages a number of times. While not negligible, this is a burden that can be handled since, as discussed below, an FM channel has a data rate of at least 150 kbps and a network of FM channels will have an even greater data rate. A system with 100 million users almost certainly would have more than one FM channel.

User authorization techniques currently in use for subscription-based media broadcast can greatly reduce the user authorization message data rate by sending authorization messages to a group of users at a time. For example, if users are addressed in groups of 256 at a time, a 1024-bit field can be included which tells the 256 receivers which tier of service is authorized for each one during the specified time period. For enhanced security, the key of the month required by each playback device is preferably encrypted separately for each playback device, though an alternative embodiment shares the same device key with all 256 playback devices in this grouping. (Since the grouping can be kept secret from the users, there is not much danger in sharing device keys in a system with millions of users.)

Reasons for Different Key Lengths

As noted above, device keys are 256 bits long, keys of the month are 192 bits long, and content encrypting keys are 128 bits long. There are two reasons for these different key lengths. First, the value of the information protected by each class of key is different and the use of longer keys to protect more valuable data is standard practice. In order of their economic value the keys are:

256-bit device keys protect keys of the month, 192-bit keys of the month protect content encrypting keys, and 128-bit content encrypting keys protect content segments.

Second, as will be seen later in the discussion of FIG. 7 in the section "Cryptoprocessor Detail," significant effort is expended to make sure that the three classes of protected data (keys of the month, content encrypting keys, and content segments) are directed only to those portions of the playback device where they are intended to go. Using different key sizes prevents an opponent who is able to hijack less secure portions of the playback device (e.g., its microprocessor) from issuing commands which might allow him to see a class of protected data in a portion of the playback device where it is not intended. For example, if the key size were the same for all three classes of protected data, the opponent might be able to get the cryptoprocessor to decrypt a key of the month and have it appear where a content segment usually appears, producing an audio output that might allow him to discern that key of the month.

Real-Time Broadcasts Data Rate

Some programs, such as traffic reports, weather reports, and sporting events at first do not appear to lend themselves to preloading content segments at the time of manufacture due to the essentially real-time nature of such content, but the preferred embodiment uses an innovative preloading and update technique that is an extension of the basic approach taken to all content. In this technique, content segments (preloaded and/or updated) include speech and other segments that can be concatenated to produce the desired broadcast and a playlist consists of a list of these content segments.

For example, a live baseball game broadcast might include the announcer saying "It's the bottom of the ninth. The Yankees are down 2-to-5. Bases are loaded. The count is 3-and-2. He swings. It's in the stands. A home run!" By preloading or updating the content library to include each of those seven sentences plus pauses of variable lengths, the announcer's statement can be communicated to playback devices by sending a playlist consisting of those seven or more (for pauses) content segments. (Unlike music and many other content segments, these content segments are preferably sent and stored in memory in unencrypted form, and it is the playlist that is encrypted instead. A header on each content segment and playlist indicates whether or not it is encrypted so that playback devices can treat them appropriately.)

Many variations on this basic approach are possible. For example, the content segments can be shorter (words or even phonemes) or longer than the above example, and different versions of the same statement (e.g., with different emotional content) can be used depending on the context. For example, a user who is known to be a Yankees' fan can hear the above broadcast with enthusiastic emotional tones appropriate to such a fan, while another person can hear it with disappointed emotional tones.

Creating such a playlist in essentially real-time is preferably accomplished by a computer recognition machine which transforms an announcer's real-time, spoken description of the event into the playlist. A trained announcer can restrict himself to phrases in the machine's lexicon, and occasional deviations therefrom can be handled as exceptions which are broadcast in essentially real-time without use of the playlist and content segment library.

FM Channel Data Rate

FM channels are spaced 200 kHz apart but have nominal bandwidths of 150 kHz, with the remaining 50 kHz being used for guard bands. While the achievable data rate of such a channel depends on its SNR which varies from user to user, a good rule of thumb in communication engineering is that each Hz of bandwidth allows at least one bit/sec (bps) of data transmission. Conservatively using 1 bps per Hz of bandwidth and assuming the channel is dedicated to sending digital data, a single FM channel is capable of 150 kbps. Using 128 kbps as the required data rate for near CD quality music, a single FM channel can update at a rate slightly faster than real-time (150/128=117% of real-time). As already noted, the playlist data rate of 12 bps places almost no burden on the FM channel and can be neglected in these computations.

Thus a single FM channel can transmit approximately 28 hours of new music per day, allowing even a large number of channels' content libraries to be updated from a single FM channel. For example, with 100 music channels refreshed by a single FM channel, every day, each channel's content library can be updated with 0.28 hours=17 minutes=6 new songs at three minutes each. Over a month, each channel can add 180 new songs or equivalent content to its library, far exceeding the demands of most users for new material.

The above numbers need to be reduced if the playback device is not capable of almost error-free reception 24/7, although that may be possible since:

FM signals penetrate buildings well.

Fixed receivers have adequate AC power to be listening 24/7.

In automotive applications, the power requirements of modern receivers would not place a significant burden on the car's battery. The same is true for the storage mechanism since data can be buffered in low power semiconductor memory and the hard drive only spun up for short periods to empty the semiconductor memory buffer.

The above numbers also need to be reduced to account for overhead in the transmission protocol (e.g., synchronization, encryption, error detection, error correction, and erasure correction). However, these burdens are minimal. Error detection is almost free since, as is known in the art, p parity bits produce an undetected error rate of $2^{-p}$, independent of the block size. Thus 64 error detecting bits produce an undetected error rate of less than $10^{-19}$ per block. As will be shown later in the discussion of FIG. 5, error or erasure correction is not much more expensive, primarily loading the channel proportional to the channel's expected down time, or unavailability to the receiver. To a first approximation, we can therefore neglect overhead burdens and look only at the fraction of time the playback device can be expected to "see" the transmitted signal, hereafter referred to as the reception duty cycle.

If a single FM channel is used, the reception duty cycle will be highly variable. This is because FM channels are inaccessible more than approximately 50 miles from the transmitter.

Hence a car that is used primarily for commuting or a fixed location will have a high reception duty cycle, but one that is used primarily for long distance trips will have a low reception duty cycle.

The problem of lost reception due to distance is preferably overcome by forming a network of FM channels across the country, all broadcasting the same library update and control signal information. The playback device is preferably designed to automatically search for FM channels that are part of the network (e.g., by looking for properly formatted data for the system, or for an ID unique to the network). Then, as the playback device leaves the reception area of one FM channel, it changes to another FM channel in the network, if available. The playback device preferably has multiple tuners (or a single tuner capable of decoding more than one station) in a DSP implementation so that, if the playback device can see more than one FM channel in the network simultaneously, it can get update information from all accessible FM channels at the same time, thereby increasing its reception duty cycle, possibly to greater than 100%. Given the economies of IC design, such multiple tuner playback devices are economically practical and becoming more so every year.

In the preferred embodiment the communication burden imposed by library updates is also minimized by performing a second preloading operation at the point of sale, loading any library updates that became available between the time the playback device was manufactured and the time the playback device is sold. In an alternative embodiment, the entire preloading operation is performed at the point of sale.

If one or more content publishers will not allow preloading at the factory or point of sale, in another alternative embodiment, the playback device downloads its entire content library over the FM channel. Given a single FM channel's ability to download approximately 28 hours of music per day and the ability to form a network of FM channels, a playback device will be able to offer reasonable service levels within a few days of installation. In the interim (and afterward), the playback device can tune to FM stations using currently-existing, real-time broadcasts.

While, as described later, efforts are made to ensure that each playback device has as high a probability as possible of receiving all library and playlist updates before they are needed, the preferred embodiment is designed so that a missing update causes no disruption to the listening experience. For example, if a playlist would normally be activated by a user action (e.g., tuning to a new channel) and that playlist is not yet available at the receiver, then an earlier playlist which is in memory is used instead. This behavior can be easily effected if playlists for a channel are numbered consecutively, in which case the playback device uses the highest numbered playlist for a selected channel.

Similarly, if a playlist specifies playing a content segment that is not yet available at the receiver, that content segment can be skipped, or alternative selections can be used instead as described below. The latter option will be particularly useful when the content segment is a commercial. Content segment numbers longer than 24 bits can facilitate such commercial substitution. For example, with a 64 bit content segment number, 8 bits can specify the type of content segment (e.g., music, DJ introduction, commercial, station announcement, etc., allowing up to 256 different content segment types), and segments which are commercials can use 32 bits to specify the product being advertised (allowing up to 4 billion different products), and the last 24 bits can specify a sequence number in commercials for that product (allowing up to 16 million different commercials for each product). With such a numbering scheme, if a playlist specifies that commercial number 179 should be played for product number 34,981 and that commercial is not yet in memory, then the highest commercial number (e.g., 178) that is in memory for that same product is substituted. Similar techniques can be used for DJ introductions, station announcements, and even songs (by grouping songs of a similar type together, in the same way that commercials for a given product were grouped together in the above description).

Content segments that are related (e.g., a DJ's introduction to a song and the song itself) are treated as a single entity in terms of playback strategy so that, for example, a content segment which is an introduction to a song is not played if the content segment which is the song itself is not yet available.

Internet/WiFi Channel

As noted earlier, the preferred embodiment augments the data rate available via the network of FM channels with an Internet connection to each playback device, relayed to the playback device through a personal computer (PC) by a WiFi (IEEE 802.11x) wireless link, hereafter referred to as an Internet/WiFi channel. (The use of a PC and WiFi are by way of example, and not intended as a limitation. For example, a wired LAN can be used in place of the WiFi. Similarly, transmissions over licensed spectrum can be substituted for the unlicensed 802.11 transmissions.) WiFi access is preferably built into the playback device but can also effected by connecting an external WiFi transceiver to a dataport, such as a USB connector, on the playback device.

Fixed playback devices (e.g., at home or work) will usually have Internet/WiFi channel access on a constant basis and mobile playback devices (e.g., in a car) will have such access on an intermittent basis (e.g., when parked at home or at work, or when passing a WiFi "hot spot"). The system must therefore be designed to work with playback devices that have access to the Internet/WiFi channel only intermittently, and is biased to sending less time sensitive content updates (e.g., music, comedy, interviews) over the Internet/WiFi channel, and to save more data rate of the FM channel for time sensitive content updates (e.g., traffic, stock quotes, real-time sporting events). As previously noted, playlist updates are a negligible load on the communication channels so they can be transmitted over either or both channels depending on their priority and available bandwidth.

Particularly in the case of a WiFi link that is associated with a particular playback device (e.g., a WiFi located in the user's home), data sent over the Internet while the playback device is not in range of the WiFi link is stored by the PC and communicated to the playback device when it is in range. The higher data rate of WiFi (54 Mbps via currently available 802.11g access 1 points) compared to Internet connections (1 Mbps for today's typical consumer broadband connection) lends itself to this buffering by the PC. A car that is within range of the WiFi link for one hour can absorb up to two days of buffered updates.

Including an Internet/WiFi channel in the preferred embodiment increases the data rate available for content and playlist updates. If, for example, half of a 1 Mbps Internet connection is available for such updates, then updates can be communicated over the additional channel at almost four times real-time. And, since Internet connections typically have over 95% reliability (less than 5% down time), that 500 kbps is highly reliable compared to the FM channel, where tunnels and other barriers will produce unpredictable drop outs. Critical information, such as messages authorizing a user to a tier of privileges for the next month, are therefore preferably sent over the Internet/WiFi channel.

Including an Internet/WiFi channel in the preferred embodiment also allows the user to program playback device preferences (e.g., presets, music only vs. DJ mode, level of DJ talk, routes for traffic reports, quotes lists for stocks, etc.) and any other desired data from a user interface on a personal computer (PC), rather than being required to use the much more limited user interface that can fit on the smaller playback device. This is accomplished by giving the user software which runs on his PC and implements this function, communicating the resultant data to the playback device via the WiFi channel. (In an alternative embodiment, this function can be accomplished by having the user access the broadcaster's web site, inputting her preferences, and the broadcaster then updating the playback device's memory with those preferences.) In either embodiment, preferably the PC interface is via a web browser.

The bidirectional nature of the Internet/WiFi channel also allows feedback communications from the playback device to the broadcaster which can be used for a number of purposes including, for example, but not by way of limitation:

which channels were listened to and for how long (herein, "user channel use information");

which content segments were skipped and repeated (herein "user skip information" and "user repeat information");

which commercials were listened to, which commercials were skipped (when allowed), which commercials were repeated, and the demographics (e.g., zip code, listening tastes) of the user (herein "user commercial information"); and which songs were purchased by the user (when that option is included and termed herein "user purchase information").

This information allows more accurate and timely marketing data than Nielsen or Arbitron ratings, and without the cost of such services. This information also allows billing of advertisers if contracts call for billing based on the number of times a commercial is heard, and a premium if it is heard by certain demographics of the user pool. This information further allows billing of subscribers for songs or other services purchased via the playback device interface.

While the preferred embodiment uses a channel consisting of the Internet, a PC, and a WiFi connection to supplement the FM radio channel, other devices known in the art can meet the same need without departing from the spirit of the invention. For example, a low power, unlicensed transceiver in the FM or the Family Radio Service (FRS) bands can replace the WiFi connection and a dedicated device can replace the PC. Or, a digital cell phone channel can be used in addition to or in place of the Internet/WiFi channel. In this last embodiment, data can be sent as "interruptible data" over the cell phone channel only when that channel is not fully loaded by its primary use, voice telephone traffic. Since the cost of building and operating a cell phone system depends almost entirely on the maximum amount of traffic that can be carried, and is almost independent of the amount of traffic actually carried, such interruptible data can be sent at very low cost. The cost of using a cell phone channel is further reduced because the updates are intended for a large number of playback devices, and can therefore be broadcast (also known as multicast in this context) to all playback devices in range, amortizing the cost of the cell phone channel over a large number of playback devices.

Tiered Service

Users are given the option of tiered subscription services. Different playlists are stored for each channel for each tier of service and users are given access only to the playlists and content encrypting keys for their authorized tier. For example, free access can be granted to users choosing that lowest tier of service by giving them access only to playlists which include frequent commercials, much as current terrestrial radio does not charge for its service.

Commercial-free music with commercial-supported talk channels can be offered for $12.95 per month, the same as in current satellite radio offerings by giving that tier of users access to commercial-free playlists on music channels and commercial-supported playlists on talk channels.

And commercial-free music and talk channels can be offered for $19.95 per month by giving users who choose that highest tier access to commercial-free playlists on both music and talk channels. Clearly, intermediate and many other offerings are also possible with such tiered playlists.

Multiplexing

Multiplexing techniques known in the art are used in the present invention to share the data rate of a channel (e.g., an FM channel or WiFi channel) among various data sources (e.g., content library updates, playlist library updates, and user authorization messages). Multiplexing techniques include, for example, time-division multiple access (TDMA), frequency-division multiple access (FDMA), code-division multiple access (CDMA, also known as spread spectrum modulation), and the use of packet-based protocols such as TCP/IP (Transmission Control Protocol/Internet Protocol).

Applicability to Media Other than Audio

Although the preferred embodiment of the present invention uses audio entertainment as discussed above, the invention is applicable to any media, including for example (but not by way of limitation), video (including television and movies), books, pictures, maps (including for automobile navigation), video games, computer software, magazines, musical scores (both lyrics and tunes), manuals, catalogs, courseware, cell phone ring tones, and all other forms of digital content known in the art.

When applied to movies, the present invention improves on current approaches such as "video on demand" because:

It substitutes cheap mass storage for more expensive communications.

It is more efficient than communication methods that repeat transmitted movies to ensure they are received in their entirety.

It offers the user a much larger selection.

It offers the user interface(s) so that he is not inundated by the large selection. For example, playlists can specify a subset of the entire library that is available at a given time, thereby preventing user-overload, and the user can select a movie from that subset. Optionally, the subset offered by the playlist can be chosen based on user preferences (e.g., past viewing habits or other demographic information) and some selections can be made available for an added charge.

It offers the video producer a more profitable and secure distribution mechanism.

The use of video playlists allows tiered services and demographically targeted advertisements at almost no increase in bandwidth. For example, a movie can be broken into five video content segments (instead of audio content segments as in the preferred embodiment), and video commercials inserted in the playlists for all but the highest (commercial-free) tier of service. Each video commercial is assigned a unique video content segment number and can be demographically targeted by assigning different playlists to different demographically defined user groups.

BRIEF DESCRIPTION OF THE DRAWINGS

The foregoing and other objects of the invention will be more clearly understood from reading the following description of the invention in conjunction with the accompanying drawings in which.

DETAILED DESCRIPTION OF THE EXAMPLE EMBODIMENTS

Having generally described the present invention, a further understanding can be obtained by reference to the specific preferred embodiments, which are provided herein for purposes of illustration only and are not intended to limit the scope of the appended claims.

Figure 1:
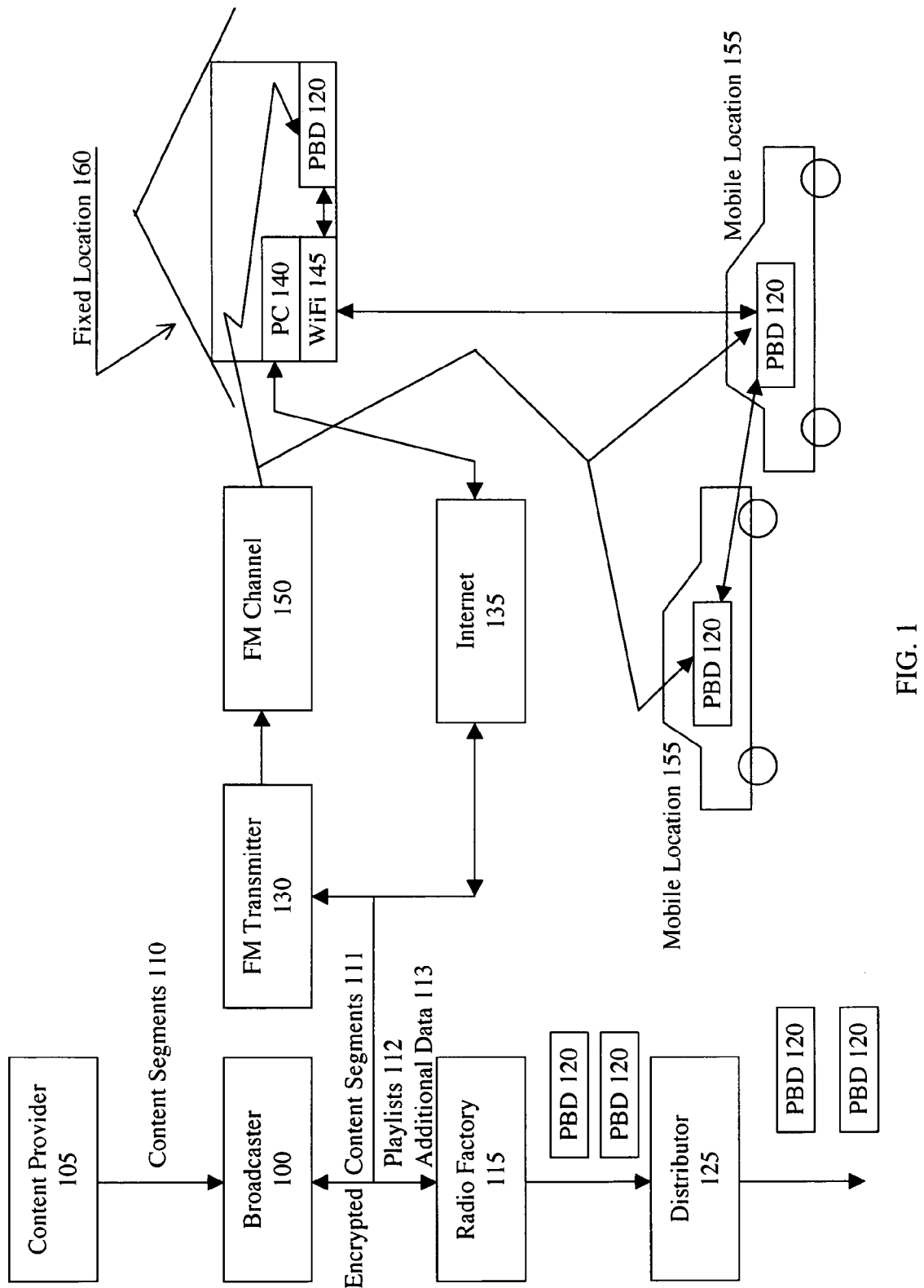
FIG. 1 is a schematic diagram illustrating the information flows in the preferred embodiment of a storage-based broadcasting system.

FIG. 1 illustrates the information flows in the preferred embodiment of a storage-based broadcasting system. Broadcaster 100 uses one or more FM channels 150 (here, as will often be done to avoid clutter, only one of a possible plurality of devices is shown in the Figure, the possible plurality being clear from wording used in the specification) and one or more auxiliary channels consisting of the Internet 135 in combination with PC's 140 and WiFi transceivers 145 to broadcast one hundred channels of near CD quality audio to playback devices 120 (each abbreviated as PBD 120 in FIG. 1) located in mobile user locations 155 (e.g., in a car) and fixed user locations 160 (e.g., in a home or office). Content providers 105 send content segments 110 to broadcaster 100. Content segments 110 can be sent from content providers 105 to broadcaster 100 by any method known in the art for sending information, for example in physical form (e.g., tapes, optical disks, or any other information storage media) and/or electronic form (e.g., via satellite, fiber optics, leased lines, a LAN, or any other electronic communication channel). Content segments 110 include by way of example, but not limitation:

entertainment content such as music, drama, comedy, sports coverage, audio books, and sporting events;

educational content such as news, interviews, lectures, and discussions, information content such as traffic, weather, and stock prices;

filler content such as spoken introductions to songs (e.g., "And now here's Martha and the Vandella's 1964 hit, Dancing in the Streets!"), DJ patter (e.g., "This is your Saturday night party hosted by Wolfman Jack."), station announcements (e.g., "You're listening to KFRC-FM in San Francisco"), jingles, contest announcements, and other filler material such as is currently used on terrestrial radio; and commercials.

Content segments 110 can either be recorded (e.g., music, except for live concerts) or real-time (e.g., a baseball game).

Figure 2:
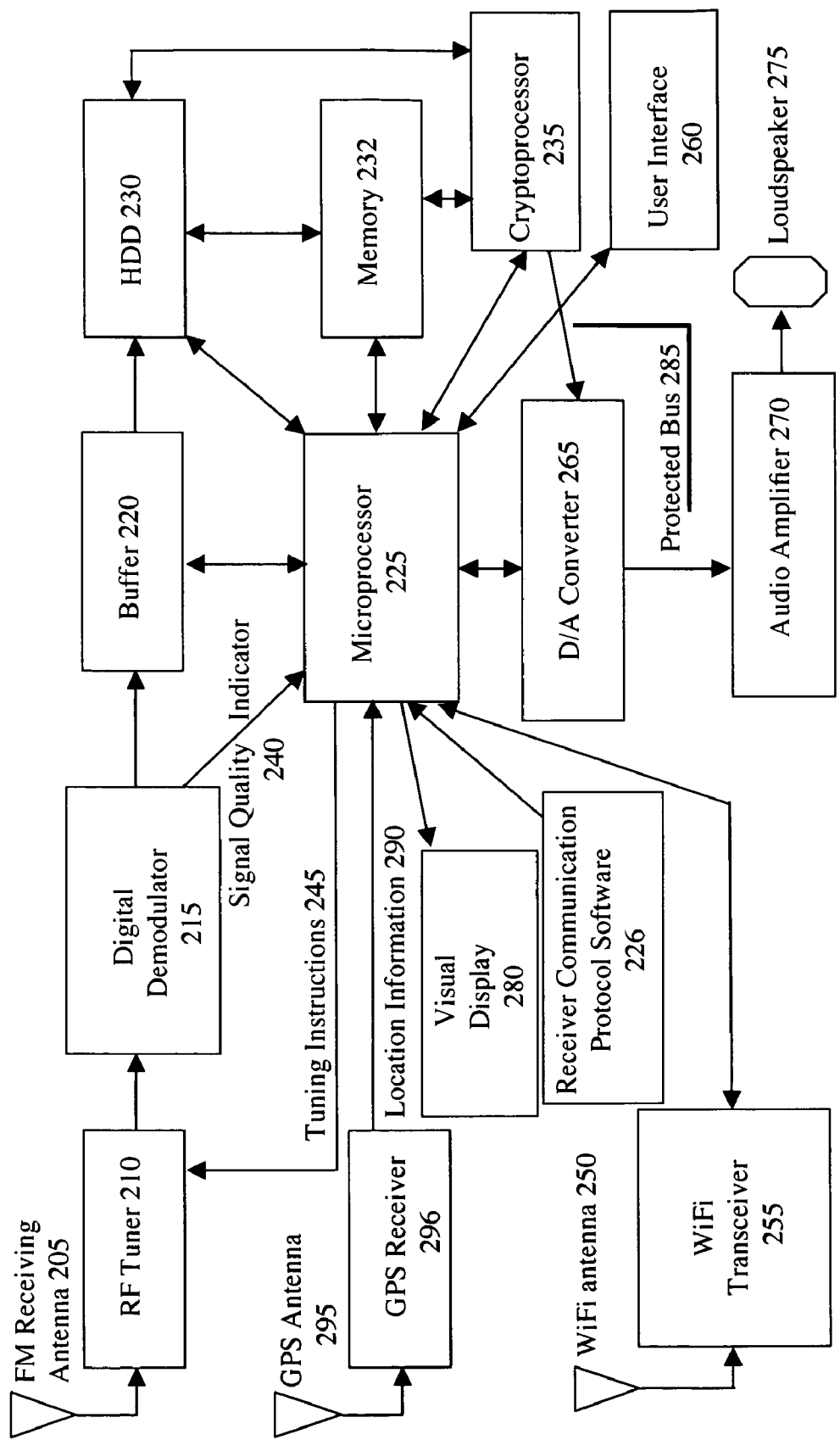
FIG. 2 is a block diagram of an exemplary embodiment of a playback device.

While content providers 105 are depicted in FIG. 1 as distinct from broadcaster 100, that distinction is only in terms of function and is specifically not intended to preclude the possibility that one or more content providers 105 are either affiliated with broadcaster 100 or are parts of the same legal entity. For example, if broadcaster 100 is a large radio company such as Clear Channel, one or more content providers 105 can be DJ's or in-house audio production groups employed by Clear Channel. Similarly it is explicitly intended that any entity or device pictured in any of the Figures may be part of some other entity or device, and their being depicted as separate is only intended to describe their different functions. For example FIG. 2 depicts a microprocessor 225 and a memory 232 in separate boxes. Most microprocessors incorporate some on-board memory and FIG. 2 is intended to include a device whose only memory is such on-board memory, provided only that such on-board memory is used for the functions assigned herein to memory 232.

Broadcaster 100 amalgamates content segments 110, encrypts content segments 110 with AES in cipher block chaining mode (described above in detail in the section "Key Distribution Data Rate") to produce encrypted content segments 111, and sends at least a portion of encrypted content segment 111 to one or more radio factories 115, again using any method known in the art for sending information. Because of the extremely high value of the content library consisting of all content segments 110, each AES key is preferably used to encrypt only a small portion of the content library. Radio factory 115 includes independent entities as well as entities which are part of or affiliated with other entities pictured in FIG. 1.

Some content segments 110 may not require encryption (e.g., commercials) and may be transmitted in unencrypted form. However, for simplicity of exposition, such content segments that do not require encryption are included in the definition of encrypted content segments 111. That convention allows the use of the simple phrase "encrypted content segments 111" instead of the technically more correct "encrypted content segments 111 and/or content segments 110."

Broadcaster 100 also generates playlists 112 (sequences of 24-bit content segment numbers) and additional data 113 (e.g., the broadcaster's public key, unique playback device serial numbers and cryptographic keys, software upgrades for playback devices 120) and sends them to radio factory 115.

Radio factory 115 manufactures playback devices 120, each with a unique serial number and 256-bit cryptographic key (for use with NIST's AES) as well as the broadcaster's public key (for use with NIST's DSS, as discussed in the section "User Authorization Message Data Rate" above). Either radio factory 115 or broadcaster 100 can select the unique playback device serial number and cryptographic key to be stored in a particular playback device 120, and that information is then communicated to the other of these two entities.

In an alternative embodiment, because the table of unique playback device serial numbers and cryptographic keys is highly confidential information, this information may be communicated in a manner which allows it to be used, but not necessarily known to one or both of the parties to this communication. For example, if only a third party is to be entrusted with this table, that third party can generate and store the table, burn the serial numbers and keys into write-once memory on a chip (readable only by the cryptoprocessor described later herein) and the chips then shipped to radio factory 115. Similarly, instead of the third party sending broadcaster 100 the cryptographic key for a playback device 120 when that playback device 120 is to be reauthorized for service, the third party can create the information derived from the cryptographic key and communicate that information to broadcaster 100 for broadcast to the playback device 120 whose service is to be reauthorized.

Radio factory 115 preloads at least a portion of received encrypted content segments 111 and playlists 112 into playback devices 120. Playback devices 120 are then shipped to a sequence of one or more distributors 125 (e.g., wholesalers, retailers, automobile manufacturers) where they are sold or otherwise distributed to users. Preferably, broadcaster 100 sends at least a portion of encrypted content segments 111, playlists 112 and additional data 113 (e.g., software upgrades) to distributors 125 so that playback devices 120 can have their content libraries, playlist libraries, software, etc. updated prior to leaving distributor 125.

Because the extremely valuable content library in playback devices 120 is in encrypted form, with only a small number content segments encrypted in the same key, content providers 105 need not fear if a pirate takes apart a playback device 120 in an attempt to gain access to the content library, or if he is able to learn a small number of keys (e.g., through techniques such as differential power analysis described in Jaffe et al's U.S. Pat. No. 6,654,884). Further, as discussed in detail later, keys that can decrypt content segments are stored in protected memory, not accessible to the user, and only a small part of one content segment is ever present in playback device 120 in unencrypted form at any point in time. In assessing the threats that the huge content library of the present invention presents to content providers 105, it should be remembered that, with current media broadcast and distribution methods, a pirate can gain access to content segments by purchasing or borrowing CD's or by recording the content as it is broadcast.

Broadcaster 100 transmits information including a portion of encrypted content segments 111 (library updates), playlists 112 (playlist updates) and additional data 113 (e.g., the current time, software upgrades, and user authorization messages) via an FM transmitter 130 and FM channel 150 to playback devices 120 at both mobile locations 155 and fixed locations 160.

Broadcaster 100 transmits a portion of encrypted content segments 111, playlists 112 and additional data 113 (e.g., software upgrades for playback devices 120) via the Internet 135 to PC's 140 located in fixed locations. PC's 140 relay all or a portion of the encrypted content segments 111, playlists 112, and additional data 113 that they receive to any playback devices 120 that are in range of associated WiFi transceivers 145.

Playback devices 120 and WiFi transceivers 145 (along with associated PC 140) that are in WiFi range of one another also form a peer-to-peer network so that encrypted content segments 111, playlists 112 and additional data 113 received by a first playback device 120 or one WiFi transceiver 145 that have not been received by a second playback device 120 or WiFi transceiver 145 can be communicated to that second playback device 120 or WiFi transceiver 145. For example, in FIG. 1, one car's playback device 120 is depicted as being in range of WiFi transceiver 145, while the other car's playback device 120 is depicted as being out of range (i.e., no connecting line), and the link between the two car's playback devices 120 depicts information flow over the variable geometry, peer-to-peer network. Use of the peer-to-peer network thus formed extends the reach of WiFi hot spots, at least some of which are preferably located near busy roads or freeways.

PC 140 also receives information (e.g., which updates have been received, usage, and billing data) from playback device 120 via WiFi transceiver 145 that it then communicates via PC 140 and Internet 135 to broadcaster 100. Communication over Internet 135 and WiFi transceiver 145 preferably use the well known TCP/IP protocol.

In the case of playback devices at a fixed location 160, PC 140, WiFi transceiver 145, and playback device 120 will typically all be in the same location and playback device 120 will usually be in range of the WiFi signal. In the case of playback devices at a mobile location 155, playback device 120 will typically be in range of the WiFi signal or another playback device 120 which is range of the WiFi signal (the peer-to-peer network) only on an intermittent basis. Protocols for transferring information between playback device 120 and WiFi 145 use any techniques known in the art for hand-off and acknowledgement to ensure that all necessary information has been exchanged. Such techniques are used in cellular telephones and existing WiFi networks. See, for example, 1.

Ramani and S. Savage, "SyncScan: Practical Fast Handoff for 802.11 Infrastructure Networks," IEEE INFOCOM 2005, Miami, Fla., Mar. 13-17, 2005.

This use of PC 140/WiFi transceiver 145 in a peer-to-peer network might be objectionable to users if PC 140 stores user-confidential information (e.g., passwords, financial data, etc.) that might inadvertently be compromised. That concern is overcome in the preferred embodiment by making PC 140 a special purpose personal computer, used only as part of the present invention and for similar purposes not involving user-confidential information. Since the computational requirements of PC 140 are small by current standards and a display and keyboard are not required, such a special purpose personal computer can be built very inexpensively.

Broadcaster 100 makes decisions as to which information is communicated via FM channel 150, via Internet 135, and via both FM channel 150 and Internet 135. Since wireless bandwidth is usually a scarcer resource than wired bandwidth, preferably broadcaster 100 sends time-sensitive information over FM channel 150 and/or Internet 135, but sends less time-sensitive information solely over Internet 135. Examples of time-sensitive information include, for example, encrypted content segments 111 that relate to news, traffic, weather, stock quotes, and live sporting events, as well as specially requested user authorization messages (e.g., when a user calls customer service to complain that his playback device 120 is not working properly and needs an "emergency" user authorization message). Examples of less time-sensitive information include, for example, encrypted content segments 111 consisting of commercials, new music, interviews, and comedy, as well as routine user authorization messages, which can be sent well in advance of their being needed. Playlists 112 can be either time-insensitive or time-sensitive, depending on their specified content.

FIG. 2 is a block diagram providing a more detailed view of playback device 120 of FIG. 1, again using the preferred embodiment for illustrative purposes. Signals from FM transmitter 130 of FIG. 1 are received by FM receiving antenna 205 and passed to RF tuner 210. RF tuner 210 amplifies the received signal and selects the desired 200 kHz FM channel within the 88-108 MHz FM band. RF tuner 210 then pass the signal to digital demodulator 215 which extracts the digital information transmitted by FM transmitter 130 and stores it in memory buffer 220. Preferably RF tuner 210, digital demodulator 215, and memory buffer 220 are implemented as part of a custom, single-chip implementation of the electronic portion of playback device 120. STMicroelectronics' TDA7701 single-chip FM tuner, available in 2005 for less than $2.50 each, is an example of the type of integrated circuit that will be used, although naturally the TDA7701 does not implement all of the functions needed for the present invention.

The preferred embodiment utilizes a network of FM transmitters 130, in which case playback device 120 preferably is capable of receiving multiple FM channels simultaneously, thereby increasing the data rate of the FM channel. This can be accomplished either by using a single RF tuner 210, digital demodulator 215, and buffer 220 which is capable of directly receiving multiple 200 kHz FM signals (e.g., by treating the multiple channels as a single, larger channel), or by having playback device 120 incorporate multiple RF tuners 210, digital demodulators 215, and buffers 220. (Multiple microprocessors 225 and other elements may also be used by playback device 120 if desired.)

Microprocessor 225 monitors data accumulated by buffer 220 and, when it detects that a complete packet has been received, stores the packet on hard disk drive (HDD) 230, either directly from buffer 220 or by reading data from buffer 220 and then transferring the data itself. Microprocessor 225 then performs a number of operations (described later in detail in FIG. 6) under control of receiver communication protocol software 226.

Memory 232 is used by microprocessor 225 in its operations and may also transfer data directly to HDD 230 when so directed by microprocessor 225. Preferably, microprocessor 225 and memory 232 are implemented as part of the custom, single-chip implementation of the electronic portion of playback device 120. Memory 232 includes random access memory (RAM), flash memory, and read-only memory (ROM), thereby providing both "boot" instructions to microprocessor 225 on power up, memory for storing program instructions, and memory for storing data. (While, in the preferred embodiment, memory 232, buffer 220, and hard disk drive 230 are distinct entities, alternative embodiments utilize a single memory or storage device for all three purposes. Alternative embodiments can also utilize more than one device for each purpose. Alternative embodiments can also utilize other forms of memory such as EEPROM and optical disk memory. While FIG. 2 depicts separate blocks for HDD 230 and memory 232, both are a form of memory and herein use of the term "memory" without the part number 232 is specifically intended to include all forms of memory, including HDD 230.)

Microprocessor 225 issues instructions to and exchanges data with cryptoprocessor 235. Cryptoprocessor 235 stores cryptographic keys used to encrypt and decrypt information. For example, as described later in more detail, cryptoprocessor 235 stores content encrypting keys so that cryptoprocessor 235 can decrypt encrypted content segments 111 and thereby reproduce content segments 110 which can be played by playback device 120. To increase security, content segments 110 thus reproduced by cryptoprocessor 235 are conveyed to D/A converter 265 on protected bus 285, making them inaccessible to microprocessor 225 and other portions of playback device 120 which are more vulnerable to attack.

In the preferred embodiment, the signal paths from D/A converter 265 to audio amplifier 270 and thence to loudspeaker 275 convey analog, as opposed to digital, representations of content segments 110, are thus not of as much concern from a piracy point of view, and do not require a protected bus 285 or other form of protected signal path. In alternative embodiments, these two signal paths can be protected, for example by using digitally encrypted representations of the content segments 110, where the key used for encryption is embedded in protected memory at both ends of the signal path and mutual authentication of the object at the other end of the signal path is used.

Cryptoprocessor 235 and/or D/A converter 265 issue signals to microprocessor 225 indicating the progress of a particular content segment 110 which they have been instructed to decrypt and play, for example when the playing is complete. But use of protected bus 285 to convey decrypted content segments 110 prevents their inadvertent communication to insecure portions of playback device 120. Cryptoprocessor 235 has other design features to enhance security as detailed later in FIG. 7.

Microprocessor 225 issues instructions directing HDD 230, memory 232 and cryptoprocessor 235 to exchange information. While shown in FIG. 2 as separate data paths, preferably, such exchanges occur over one or more data buses, all of which are physically and electrically separate from protected bus 285 used for output of unencrypted content segments 110.

Microprocessor 225 receives signal quality indicator 240 from digital demodulator 215 which is indicative of the SNR of the received FM channel signal. Signal quality indicator 240 can be implemented in any manner known in the art, but for sake of completeness an exemplary implementation is also included herein: Transmitted digital signals can take on only a finite number of values, here denoted by n. The number of bits transmitted per signal is $\log_2(n)$. The set of signals which can be transmitted is called a signal constellation and denoted $\{x_i\}_{i=1}^n$. [While signals are analog and exist in continuous time, as is well known in the art, these signals can be portrayed in a finite dimensional vector space. Hence the notation $x_i$ instead of $x_i(t)$.] Once a decision is made by digital demodulator 215 as to which of the $\{x_i\}_{i=1}^n$ it believes was sent, digital demodulator 215 subtracts the believed transmitted signal $x_i$ from the received signal r to obtain an estimate of the noise n. If the decision by digital demodulator 215 is correct, the estimate of the noise equals the actual noise. Since error rates are typically very low, the estimated noise over a large number of decisions is close to the actual noise. The inverse of the energy in the estimated noise, computed as 1 divided by the dot product of the estimated noise vector with itself, is an embodiment of signal quality indicator 240. An alternative embodiment of signal quality indicator 240 uses information from receiver communication protocol software 226 indicative of the frequency of error correction and detection (as discussed later) and uses the inverse of the frequency of errors (the time between errors) as signal quality indicator 240. This alternative embodiment of signal quality indicator 240 is communicated to microprocessor 225 by receiver communication protocol software 226, not digital demodulator 215.

Signal quality indicator 240 is used by microprocessor 225 to determine when an FM channel 150 is of use. FM channels 150 that are being used to acquire data are dropped from use when their signal quality indicator 240 drops below a threshold, and FM channels 150 that are not in use are added to those being used when their signal quality indicators 240 rise above a threshold. If playback device 120 is not capable of using all FM channels whose signal quality indicators 240 are above the threshold, signal quality indicators 240 can be used to help optimize the decision as to which channels will be selected. (Other factors are also involved in the decision. For example, if playback device 120 already has most of the information being communicated on a particular channel, that channel is of less value even if its signal quality indicator 240 is very high.)

Microprocessor 225 sends tuning instructions 245 to RF tuner 210 telling it which FM channel(s) 150 to send to digital demodulator 215. Tuning instructions 245 are based on a number of factors, for example:

signal quality indicators 240, as discussed above;
the value of the information on each channel, as discussed above;
the location of playback device 120 (if known from GPS or other means) relative to the location of FM transmitters 130;
the channel to which the user is tuned and/or the history of channels to which the user has tuned;

Preferably, tuning instructions 245 ensure that all FM channels 150 are sampled on a periodic basis so that playback device 120 finds new FM channels 150 as they come into range.

Playback device 120 includes a WiFi antenna 250 and WiFi transceiver 255 which communicates bidirectionally with PC 140 of FIG. 1 and microprocessor 225. Preferably WiFi transceiver 255 is implemented as part of a custom, single-chip implementation of the electronic portion of playback device 120. Broadcom's BCM4318 single chip implementation of the IEEE 802.11g (WiFi) standard is an example of a currently available WiFi transceiver 255. WiFi transceiver 255 is in bidirectional communication with microprocessor 225 so that data received over WiFi antenna 250 and WiFi transceiver 255 can be stored in memory 232 or HDD 230. Although not shown in FIG. 2, optionally WiFi transceiver 255 can communicate directly with memory 232 and/or HDD 230 under instructions from microprocessor 225. Preferably WiFi transceiver 255 includes internal, automatic means well known in the art for choosing the best channels to use within the WiFi 2.4 GHz band. Alternatively, and again not shown in FIG. 2, WiFi transceiver 255 can provide microprocessor 225 with a signal quality indicator 240 for each WiFi channel, similar to that provided by digital demodulator 215, in which case microprocessor 225 can tell WiFi transceiver 255 which WiFi channel(s) to use.

User Interface

Playback device 120 includes a user interface 260 which allows a user to operate and control playback device 120. User interface 260 can be implemented with any of a number of techniques known in the art, with the user interface of Audiovox's SIR-PNP2 satellite radio receiver being an example that includes most of the features required. However, when the user changes channels, the present invention preferably starts at the beginning of a content segment, rather than in the middle as with Audiovox's SIR-PNP2. (An exception to this rule occurs if the user has indicated in a user preference menu that he prefers to pick up where he left off listening, in the middle of a content segment, when returning to a channel playlist that has already been started. This preference can have a subpreference indicating after what period of time the user prefers to start at the beginning of the interrupted content segment.)

Figure 8:
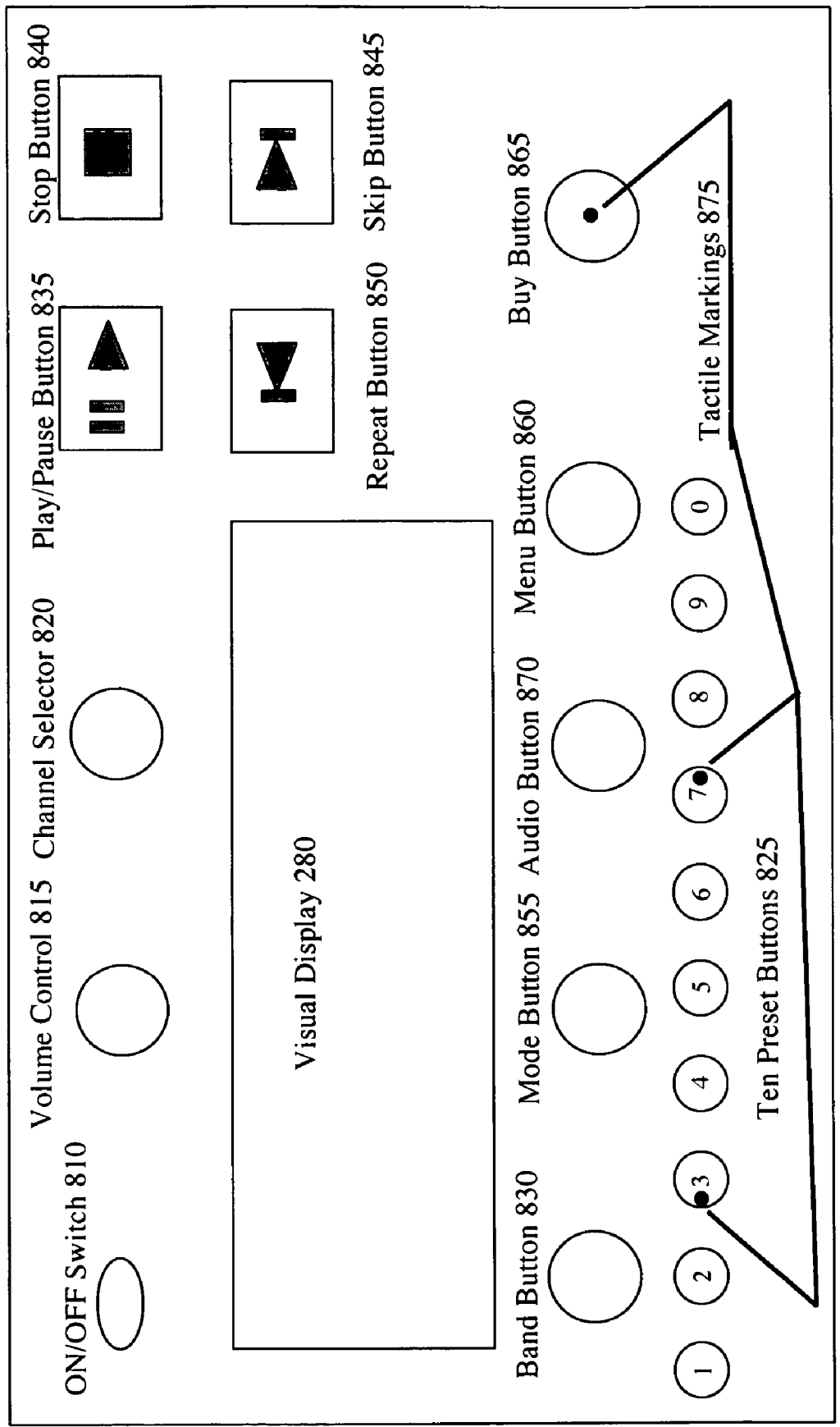
FIG. 8 depicts an exemplary embodiment of a user interface on a playback device.

As detailed in FIG. 2 and FIG. 8, in the preferred embodiment user interface 260 includes Visual output (via visual display 280) to communicate information to the user.
Audio output (via D/A converter 265, audio amplifier 270 and loudspeaker 275 or other acoustic output devices) to communicate information to the user and to output audio content segments 110 for reproduction.
An ON/OFF switch 810.
A volume control 815.
A channel selector 820 which, when rotated, causes playback device 120 to advance to the next program channel in a cyclic fashion (i.e., with one hundred program channels, channel 1 would follow channel 100). If rotated rapidly, channel selector 820 causes playback device to advance five program channels at a time (e.g., from channel #6 to channel #11). If depressed, channel selector 820, allows entry of the desired program channel number via ten preset buttons 825, so that for example, channel #75 is entered by depressing first the 7 and then the 5 of ten preset buttons 825. In this mode ten preset buttons 825 function as digital input, not presets.
Ten preset buttons 825 for rapidly choosing among ten channels set by the user. Depressing one of the ten preset buttons 825 for more than two seconds sets it to the currently active channel. Depressing one of the ten preset buttons 825 momentarily tunes playback device to the last program channel set for that button.
A band button 830 for moving the ten preset buttons 825 among three bands denoted A, B, and C. When band button 830 is depressed, playback device moves to the next band (A, B and C) in a cyclic fashion, thereby expanding the presets from ten to thirty with the addition of just one button. Rotating band button 830 moves playback device 120 between the AM band, the conventional FM band, the satellite radio bands (XM and Sirius), and the new band of programs created by the present invention. When playback device 120 is tuned to the AM, FM or satellite radio bands, the ten preset buttons 825 operate within that band.

A play/pause button 835 which, when depressed momentarily, causes playback device 120 to pause playing the current content segment 110 and, when depressed again, tells playback device 120 to resume playing the current content segment 110. During paused periods, playback device 120 is also muted.

A stop button 840 which stops the playing of the current content segment 110.

A skip button 845 which, when depressed momentarily, tells playback device 120 to skip the remainder of the current content segment 110 or, when held down, to fast forward through the current content segment 110. (As described elsewhere herein, skip button 845 may be inhibited during certain content segments, such as commercials.)

A repeat button 850 which, when depressed momentarily, tells playback device 120 to return to the beginning of the current content segment 110 or, when held down, to rapidly rewind back through the current content segment 110. If repeat button is depressed momentarily during the first three seconds of a content segment, playback device 120 returns to the beginning of the previously played content segment 110.

A mode button 855 which, when depressed momentarily, causes playback device 120 to output one of several modes of on demand reports (e.g., traffic, weather, stock prices) as described later herein in detail.

A menu button 860 to bring up menus for various user preferences (e.g., DJ mode vs. music only mode, controlling the amount of DJ talk in DJ mode, changing display characteristics, etc.).

A buy button 865 which, when activated, indicates the user wishes to purchase the audio content currently being played.

An audio button 870 which when depressed transforms volume control 815 sequentially to a bass/treble control, a balance (left/right) control and a fade (front/back) control. Visual display 280 indicates which of these controls is active and the position of the active control. After acting as a fade control, one more depression of audio button 870 returns volume control 815 to its normal function.

Preferably, and particularly for in-vehicle applications, several of the buttons depicted in FIG. 8 have distinguishing tactile markings 875 on them to make it easier for the user to tell which button she is touching without having to take her eyes off the road to look at playback device 120. For example, buy button 865 can have a raised dot as tactile marking 875, similar to those used on the letters F and J on many computer keyboards. Similarly, two of ten preset buttons 825 can have tactile markings 875. The first and last of ten preset buttons 825 are easily distinguished by their locations at the ends, and interior buttons are made easier to distinguish by adding a raised dot on the left side of the 3 and on the right side of the 7. For similar reasons, ON/OFF switch 810 is a different shape from other buttons.

In the preferred embodiment, mode button 855 activates one of three modes of on demand reports: traffic, weather, and stock prices. As mode button 855 is repeatedly pressed, playback device 120 first recognizes a request for traffic, then weather, and then stock prices, moving among these three modes in response to each press of mode button 855. As with band button 830, the modes are cyclic, so that when the last mode (stock prices) is reached and mode button 855 is depressed again, radio 120 returns to the first mode (traffic). The user is appraised of his current mode selection via visual display 280 and/or an audio announcement via loudspeaker 275.

Traffic, weather, and stock price information are tailored to each user. Rather than receiving all traffic in a large geographic area (e.g., the New York Metropolitan Area or the San Francisco Bay Area), the user is given current traffic along one or more routes of travel previously input by the user via a program run on PC 140 and transferred to playback device 120 via WiFi 145. (An alternative embodiment has the user enter routes on a web site connected to broadcaster 100 and broadcaster 100 then transfers the routes to playback device 120 via FM channel 150 and/or the combination of Internet 135, PC 140 and WiFi 145.) In default mode, the user only inputs the starting and ending points of her desired route, but she is also given the option of requesting a specific route. Routes are specified as a sequence of connected geographic points, the geographic points and connections being defined by broadcaster 100, for example street intersections, freeway exits, etc. Together, the geographic points and connections together with expected travel times form a map which is stored and updated on hard disk drive 230 by broadcaster 100.

If more than one route has been specified by the user, she can activate one of these routes (and optionally input a new route) via user interface 260 and only receive traffic information relevant to the selected route. If no route has been so activated, the user receives traffic information on all routes she has specified.

If a route has been activated, playback device 120 uses techniques known in the art to compute what is normally (i.e., without regard to specific traffic conditions) the fastest path for achieving that route, utilizing the map on hard disk drive 230. Content segments 110 specified by playlists 112 associated with traffic and other on demand reports can be time-varying, can be empty (i.e., of zero time duration), and can be generated by playback device 120 (since, in the preferred embodiment, playback device 120 generates the path of travel for a route which in turn specifies the playlist 112 for traffic on that route).

Consider, for example, that the user has specified a route with starting point A and ending point F, and that playback device 120 has determined that the normally fastest path for achieving that route is to go from point A to point B to point C to point D to point E to point F, where (A,B), (B,C), (C,D), (D,E) and (E,F) are connected point pairs on the map. A table, also stored and updated by broadcaster 100 on hard disk drive 230, specifies content segment numbers that are associated with each connected point pair (i,j) that is specified by the map. If, for example, the connected point pair (A,B) is associated with content segment number 0; the connected point pair (B,C) is associated with content segment number 2,471,005; the connected point pair (C,D) is associated with content segment number 1,194,234; the connected point pair (D,E) is associated with content segment number 528,972; and the connected point pair (E,F) is associated with content segment number 194,234 then the playlist 112 for this path of travel would be (0; 2,471,005; 1,194,234; 528,972; 0).

The current traffic information for travel from any point (e.g., point C) to an adjacent point (e.g., point D) is always contained in the same content segment 110 (i.e., it always has the same content segment number, namely 1,194,234 in the above example) and is updated as new traffic information is received by playback device 120. If there is no relevant traffic information, this content segment 110 is empty (i.e., of zero time duration) so that users hear only relevant information.

A route segment can also have no relevant traffic information because that route segment is not monitored for traffic conditions. In the latter event, the content segment number corresponding to that route segment is a content segment 110 that is always empty, as was the case in our example for connected point pairs (A,B) and (E,F), both of which had content segment number 0. (The content segment number of the null content segment can take on any fixed value, but was chosen as 0 for ease of illustration). All route segments that are not monitored have the same content segment number which is why the above playlist 112 had content segment number 0 repeated as the first and last content segment numbers. Such a playlist 112 is fairly typical since the first and last connected point pairs on a path of travel are typically on local streets where traffic is not monitored.

Playback device 120 is programmed so that, if all content segments 110 in a traffic report are empty a default traffic report (e.g., "There are no delays along your route of travel from point A to point F.") is output. At the end of a traffic report, the user is given the option of requesting an additional report for one or more alternate routes of travel that are normally not the fastest, which alternate routes are also computed by playback device 120. Thus, if the normally fastest route of travel reports significant delays, the user can utilize this option to hear traffic reports along routes that might be faster without having to input a new route request.

If playback device 120 is equipped with GPS or other location determining means and a route has been activated, playback device 120 is programmed to monitor digital information associated with each content segment 110 which specifies traffic conditions on a monitored route segment. This digital information specifies the expected travel time over that route segment. Using this digital information, playback device 120 continuously computes the fastest route of travel from its current location to the specified destination and recommends the route with the shortest travel time.

In alternative embodiments, playback device 120 additionally can interrupt an entertainment or other playlist 112 when the above described digital information associated with each content segment 110 which specifies traffic conditions on a monitored route segment indicates a delay on either the currently active route or any one of the routes specified by the user and stored on playback device 112.

In a manner similar to that used for traffic reports, users can request specific weather and stock prices via a program run on PC 140 and transferred to playback device 120 via WiFi 145 as additional playlists 112. These traffic, weather, and stock price playlists 112 are activated when playback device 120 is put into traffic, weather, or stock price mode by operation of mode button 855, or in alternative embodiments when digital information associated with such content segments 110 indicate a situation that the user might wish to know of (e.g., a stock price meeting a certain threshold).

User requests for specific on demand information are specified in terms of a model created by broadcaster 100. For example, in the above description of a traffic report starting at point A and ending at point F, the model includes the list of connected point pairs on the map and the table which specifies the content segment numbers associated with each connected point pair. On demand weather reports utilize a model based on a geographical division of the territory covered. Financial reports utilize a model based on stock symbols, areas of interest (e.g., interest rates, foreign exchange rates, etc.), etc.

These various models are part of additional data 113 which is communicated by broadcaster 100 to radio factory 115 (e.g., if the models are installed at the time of manufacture), distributor 125 (e.g., if the models are updated just prior to sale), and to playback devices 120 already owned by users (e.g., if the models are updated after sale).

This aspect of the invention gives each user a custom traffic, weather, and stock price broadcast. But, the required increase in bandwidth is minimal or non-existent since each custom broadcast is obtained by editing a subset of information from a normal, non-custom broadcast. The same technique can be used to edit news, sports coverage, etc. to produce a custom broadcast for the user which is more to his interest.

If the user communicates the desired subset (i.e., a route of travel, an area for weather, or a list of stocks) to the broadcaster which then transmits that information to the user's playback device, there is a slight increase in data rate. Considering traffic information, 16 bits is adequate to specify traffic conditions on 650 major roads, each 100 miles long, to one mile accuracy. This is more than adequate for a metropolitan area, but if ¼ mile accuracy is desired, or 5,000 roads are to be covered, or each road is 300 miles long, each of these improvements would add only 2 or 3 bits to the specification, for a maximum total of 24 bits instead of 16.

The critical part of a typical commuter route involves at most five major roads. Using 16 bits per road specification and two such specifications per road traveled (one for the starting point and one for the ending point) the typical commuter route specification requires at most a total of 160 bits. More efficient methods of specifying the route are clearly possible, so use of 160 bits is conservative.

If the traffic information of interest to a user changes once per week (again conservative), this translates into a data rate of 160 bits/week/user=0.00026 bps/user. A system with a million users then has a total data rate burden of only 260 bps to support this aspect of the invention and, as noted, more efficient specification techniques can be used. In the unlikely event that users specify too much data (or as an additional revenue source), the broadcaster can charge users an additional fee for this service, and even make the fee dependent on the amount of specification data that must be sent.

Similarly, prices for up to 65,536 different financial instruments can be selected based on a 16 bit specification. (Since the New York Stock Exchange and NASDAQ together list well under 10,000 companies, this is more than adequate.) If each user specifies ten stocks of interest and changes this list once per week, the total data rate burden on a one million user system is again only 260 bps. Weather specifications appear to impose even less of a burden on the data rate since 16 bits per location seems more than generous and most users will have only one or two areas (not ten) that are of interest.

Alternative embodiments have a different number of modes, and different modes, activated by mode button 855. For example, playback device 120 can have a lodging mode that gives the user a list of possible lodgings near the current location of playback device 120. Microprocessor 225 knows the location of playback device 120 via location information 290 obtained via GPS antenna 295 and GPS receiver 296 or, in alternative embodiments, via other means. (See, for example, U.S. Pat. No. 6,914,560 for location via TV signals. Related techniques make use of signals transmitted by WiFi transceiver 255 and have the advantage that the hardware and computing associated with location determination is moved from playback device 120 to a PC 140/WiFi 145 combination and its cost can thus be shared among a large number of playback devices 120.) Other services besides lodging that are position related (e.g., restaurants, gas stations, stores) can be included in a similar manner. Businesses can be charged a fee to be included or displayed in response to a user request, increasing advertising revenue. (Location information 290 can also be used to make commercials location-dependent as well as demographic-dependent so that, for example, restaurant commercials are for nearby restaurants.)

Another alternative embodiment uses menus, rather than mode button 855, thereby eliminating one button from playback device 120, but at the expense of more user interaction.

When mode button 855 has not been depressed for 2 seconds (or a user-settable threshold), playback device 120 assumes the last mode accessed is desired, activates the appropriate playlist 112, and outputs content segments 110 specified by that playlist 112. If the user is in a tier of service which is commercial supported, playback device 120 first outputs content segments 110 that form one or more commercials, preferably related to the requested mode. For example, traffic mode commercials can be for automobile manufacturers or oil companies while stock prices mode commercials can be for brokerage houses or financial publications. In an alternative embodiments, playback device 120 delays the requested on demand report. For example, playback device can wait until the currently playing content segment 110 has finished before starting the requested on demand report. For such reasons, while the preferred embodiment starts playing the requested on demand report within 2 seconds of the request being made, alternative embodiments can delay the on demand report for a longer period of time, for example the currently playing content segment 110 has concluded. While that delay can be significantly longer than 2 seconds, herein the term "a short delay" includes such delays since they are short enough not to be objectionable to the user. In such alternative embodiments, preferably the user is given the option of overriding the normal operation and indicating that she wants an immediate report (e.g., by pushing mode button 855 a second time).

The present invention's method of delivering traffic, weather, stock prices, etc. improves user satisfaction compared to current systems where the user must wait until the desired information is broadcast and then suffer listening to much information not of interest to him before hearing what is of interest. It also improves advertiser satisfaction since, for commercial supported tiers of service, the user must hear a commercial prior to hearing the desired information.

Note that this aspect of the present invention is widely applicable to other embodiments. For example Sirius and XM satellite radio's traffic reports currently suffer relative to FM's traffic reports since they must cover larger geographic areas due to the nationwide footprint of their signals. For example, Sirius' channel 156 currently broadcasts San Francisco's and Seattle's traffic and weather, forcing a user interested solely in traffic on one specific stretch of freeway to listen to much irrelevant information. Sirius could continue to transmit San Francisco's and Seattle's traffic and weather on channel 156 so that existing radios continue to receive the current information, but also use its control channel to tell new radios, which use this aspect of the present invention, which portions of that channel's audio corresponds to which portions of each freeway. This technique effectively breaks channel 156's broadcast into a number of content segments 110, corresponding to different portions of different roads. When a user requests a traffic report by pressing mode button 855 on such a new radio (playback device 120), the radio then plays the content segments 110 specified by that radio's traffic playlist 112, thereby creating a customized traffic report for the user's desired route of travel. The small amount of memory required for this modification is preferably implemented with solid state memory replacing hard disk drive 230.

Returning to the preferred embodiment, when playback device 120 is outputting information such as stock prices, if skip button 845 or repeat button 850 is depressed twice in rapid succession (in less than 0.5 seconds), they cause playback device 120 to skip or repeat a group of content segments 110, rather than a single content segment. For example, with stock prices, each stock's price information is considered a single content segment 110, and the set of all stock prices requested by the user is considered a group of content segments 110.

Figure 9B:
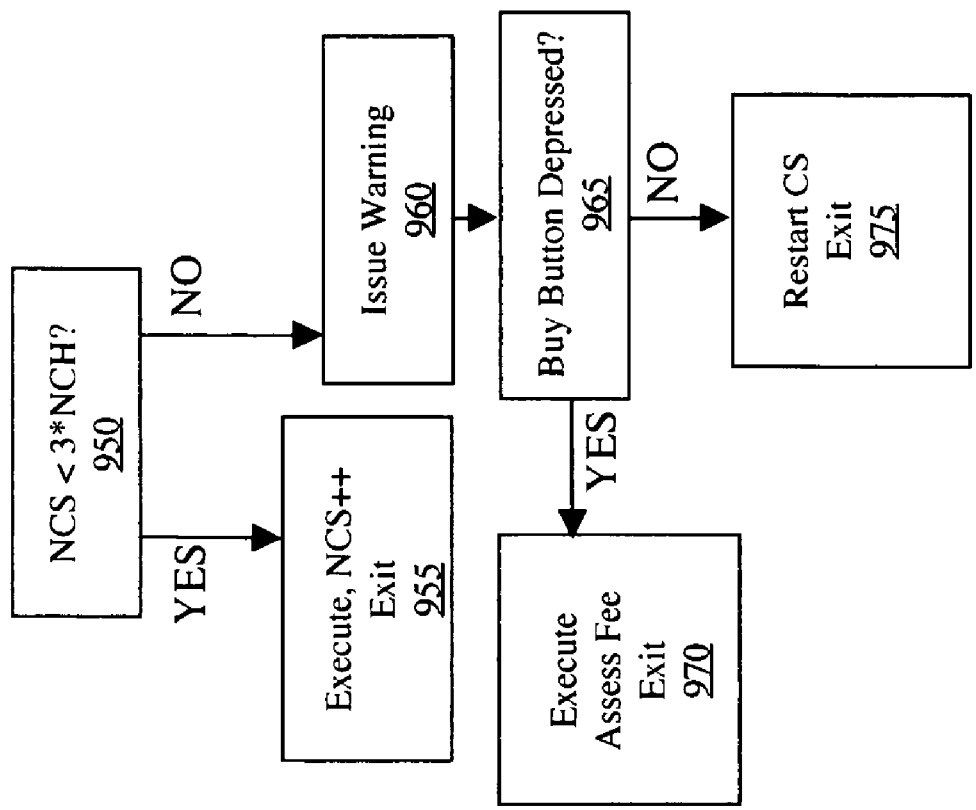
FIGS. 9A and 9B are flow diagrams utilized by a playback device when a user requests that a content segment be accelerated (skipped or fast forwarded)
Figure 9A:
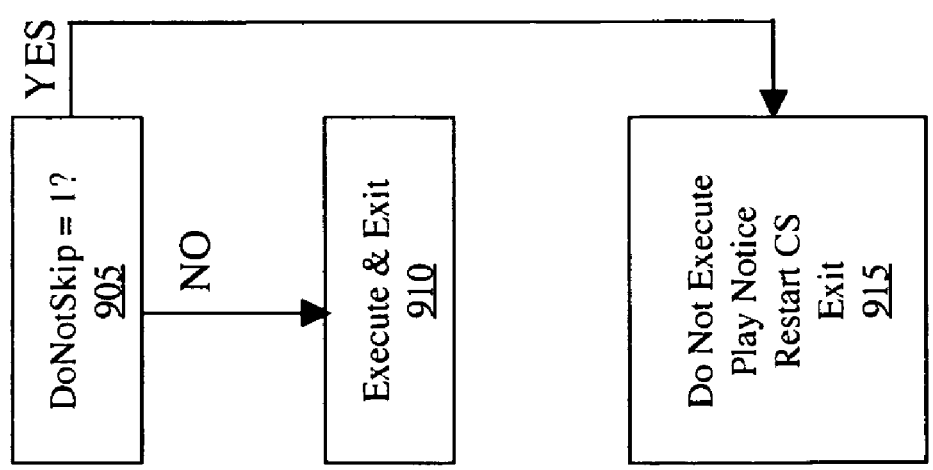

The skip and fast forward functions effected by skip button 845 are disabled when certain content segments such as commercials are being played. These content segments are specified by setting a DoNotSkip bit in a content segment header to 1, while all other content segments have this bit set to 0. When skip button 845 is depressed momentarily (to skip a content segment) or held down (to fast forward through a content segment), microprocessor 225 first jumps to a subroutine depicted as a flow diagram in FIG. 9A.

In block 905, microprocessor 225 checks if the DoNotSkip bit of the currently playing content segment equals 1. If this DoNotSkip bit does not equal 1 then in block 910 microprocessor 225 executes the requested function (skip or fast forward) and exits the subroutine. Microprocessor 225 is so rapid in its execution of this subroutine that the user is unaware that this check has occurred.

If, however, the DoNotSkip bit does equal 1 then microprocessor 225 does not execute the requested function and, to prevent the subscriber from thinking that playback device 120 is broken when it fails to respond to his command, in block 915, causes a notice to be played which states that skip button 845 is currently disabled and suggesting that the subscriber purchase a higher tier subscription, after which microprocessor 225 causes the interrupted content segment (abbreviated CS in the figure) to restart from its beginning and then exits the subroutine.

While, as described immediately above, the preferred embodiment totally disables the skip and fast forward functions associated with skip button 845 during commercials, alternative embodiments inhibit such functions to a lesser degree. For example, the alternative embodiment depicted in the flow diagram of FIG. 9B, keeps track of two integer variables, NCH (Number of Commercials Heard) and NCS (Number of Commercials Skipped), each of which is initialized to zero before entering the flow diagram of FIG. 9B. When the user requests a skip or fast forward function during a content segment whose DoNotSkip bit is 1 (tested outside the flow diagram of FIG. 9B), microprocessor 225 first checks in block 950 whether NCS is less than three times NCH (i.e., whether less than 25% of commercials have been skipped; clearly other thresholds can be used). If block 950's check is positive, then in block 955, microprocessor 225 executes the requested function (skip or fast forward), increments NCS by one (denoted NCS++), and exits the subroutine.

If, however, block 950's check is negative, then in block 960 microprocessor issues a warning that a five cent fee (other embodiments utilize other fees, including non-monetary fees) will be assessed if buy button 865 is pressed. This warning can be effected in different ways and, preferably, is shortened (e.g., to a short beep) after the user has been adequately warned by more complete warnings (e.g., by playing a content segment with that warning) earlier. Program flow then moves to block 965 which checks whether buy button 865 is depressed within two seconds of the end of the warning. If block 965's test is positive, as soon as the buy button is depressed, subroutine flow moves to block 970 which executes the requested function, assesses a fee, and exits the subroutine. If not, subroutine flow moves to block 975 which causes the interrupted content segment (abbreviated CS in the figure) to restart from its beginning and then exits the subroutine.

In these alternative embodiments where skip button 845 is only inhibited during commercials, the reverse channel (consisting of WiFi transceiver 255, WiFi antenna 250, WiFi 145, PC 140 and Internet 135) communicates information from playback device 120 to broadcaster 100 indicating which commercials have been skipped. This information is used for billing purposes (when a fee is assessed for skipped commercials), for rating commercials, and for assigning demographic values to the user (e.g., what type of commercials appeal to the user).

In the preferred embodiment, the repeat button is fully operative during commercials, and information on user requests for repeating commercials is also communicated from playback device 120 to broadcaster 100 over the reverse channel since such information is useful for determining the efficacy of commercials and affecting the user's demographic assignment.

Preferably, when the user changes channels during a content segment 110 that is classified as a commercial, when the user returns to the original channel the playlist starts at the beginning of that commercial content segment 110. This feature is particularly important if the user's tier of service has some commercial-supported and some commercial-free channels since, then, many users will "channel surf" in an attempt to avoid commercials.

In an alternative embodiment, user interface 260 includes a voice recognition capability to allow the user to control playback device 120 via voice commands. Combined with audio output to supplement visual display 280, voice recognition increases safety in playback devices 120 installed in vehicles since the driver need not take her hands off the wheel or divert her attention from the road. Visual display 280 and/or audio output of information to the user includes, for example, the current channel, the current song/artist, volume setting, the time, menu options (when menus are activated).

Buy button 865 allows the user to indicate his interest in purchasing the song, album, or other audio segment(s) currently being played by playback device 120. Purchased audio content can be made available by numerous techniques, for example:
 making that audio content accessible only on playback device 120 whenever the user wishes to hear it;
 making that audio content accessible only on playback device 120 for a limited number of plays (e.g., five plays for $0.10) which can be renewed by an additional payment;
 allowing the user to transfer the audio content to one or more audio devices, such as an MP3 player or an iPod™;
 allowing the user to download that audio content via the Internet to his personal computer or music player; and/or
 sending the user a CD through the mail.

If the user is given more than one of the above or other options for purchased music, preferably user interface 260 stores the identity of the content being purchased and allows that decision to be delayed. This is particularly important in playback devices 120 installed in cars where it is much safer for a driver to wait until the car is stopped to make such decisions. The bidirectional nature of the Internet/Wifi channel allows the user to make his decision at home, on a browser or similar computer interface, as opposed to being forced to use the much more limited user interface 260 on playback device 120.

Purchased music can optionally can use DRM (digital rights management) techniques known in the art to limit the use of the purchased music, for example to
 limit the number of times a song can be played;
 limit the period of time during which a song can be played;
 require payment of a periodic subscription fee for access to purchased songs;
 limit the number of devices to which a song can be transferred; and/or
 limit transfers to new devices to songs that are below a threshold generation. (Songs stored on the device on which they were purchased are first generation. First generation songs transferred to a new device are second generation, etc.)

Playback device 120 includes a D/A converter 265 and audio amplifier 270 so that microprocessor 225 can cause information to the user (described above) and audio content segments 110 to become audio output for reproduction through loudspeakers 275 or other acoustic output devices such as headsets.

In the preferred embodiment, to reduce cost and enhance security, all electronics of playback device 120 are part of a custom, single chip implementation. Alternative embodiments utilize multiple IC's but, for security, preferably keeping at least cryptoprocessor 235, protected bus 285, and D/A converter 265 on a single chip.

FM Transmitter

Figure 3:
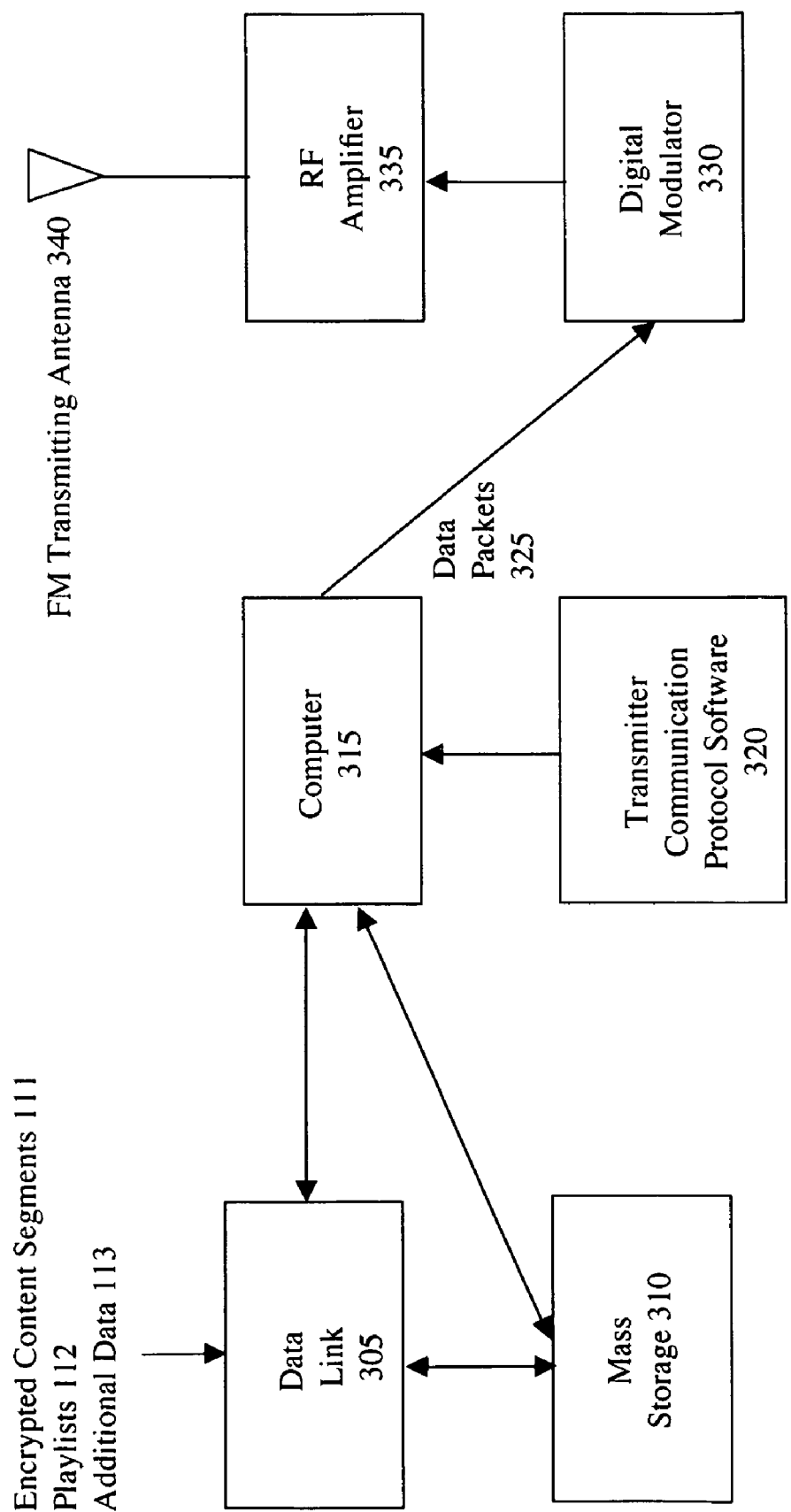
FIG. 3 is a block diagram of an exemplary embodiment of a radio transmitter.

FIG. 3 is a block diagram providing a more detailed view of FM transmitter 130 of FIG. 1. Encrypted content segments 111, playlists 112, and additional data 113 (e.g., encrypted content encrypting keys, user authorization messages, the current time, software upgrades for playback devices 120) are received from broadcaster 100 of FIG. 1 by data link 305 (e.g., a leased data line) and stored in mass storage 310 (e.g., a Redundant Array of Inexpensive Disks or RAID) under control of computer 315 (e.g., an Intel or Apple blade server). Computer 315, under control of transmitter communication protocol software 320, formats all or a portion of the received encrypted content segments 111, playlists 112, and additional data 113 into data packets 325 which are then transmitted over FM channel 150 of FIG. 1 via digital modulator 330, RF amplifier 335 and FM transmitting antenna 340. Digital modulator 330 uses any technique known in the art, such as phase shift keying, frequency shift keying, amplitude modulation, or preferably, a combination of amplitude and phase modulation coupled with coding for intersymbol interference.

Figures 4, 5:
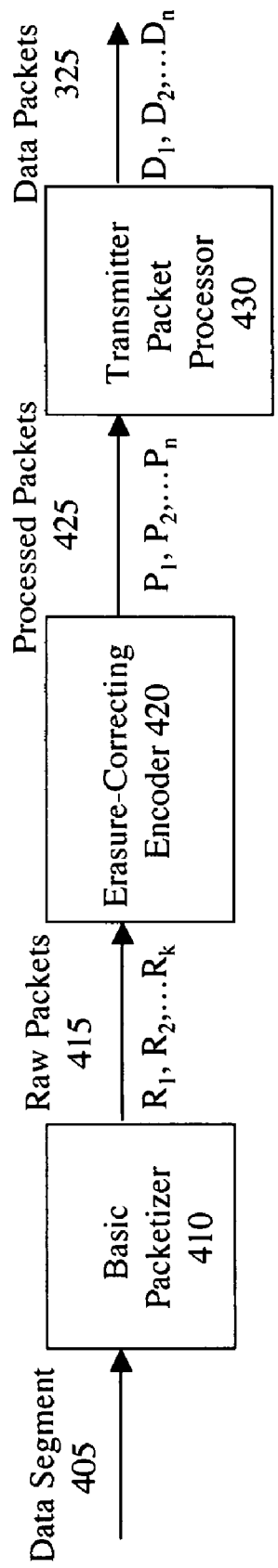
FIG. 4 is a block diagram of an exemplary embodiment of a transmitter communication protocol.
FIG. 5 depicts the structure of an exemplary embodiment of an erasure-correcting code.

Transmitter communication protocol software 320 can utilize any protocol known in the art, with FIG. 4 depicting the preferred embodiment. A data segment 405 (e.g., an encrypted content segment 111, playlist 112 or user authorization message) is operated on by basic packetizer 410 to output a sequence of raw packets 415, denoted $R_1, R_2, \ldots R_k$. For example, if a data segment 405 consists of a three minute song encoded at 128 kbps, it is 2,880,000 bytes (2.88 MB) long. The packet length utilized by basic packetizer 410 is optimized based on the characteristics of the particular FM channel 150 over which the packets will be sent, with a 10 kilobyte (10 kB) packet length being typical. Such a packet is 80 kbits long and takes slightly over half a second to send at the previously assumed data rate of 150 kbps (see "FM Channel Data Rate" section above, under SUMMARY OF INVENTION). This is short enough that a fade out (as in driving through a null in the signal) during transmission of a packet is not likely, yet long enough that packet overhead, discussed below, is not an undue burden. Under these assumptions, the 2.88 MB data segment 405 is broken into two hundred eighty-eight raw packets 415 denoted $R_1$, $R_2$, ... $R_{288}$, each 10 kB long, so that k=288.

Erasure-Correcting Code

Raw packets 415 are encoded by erasure-correcting encoder 420 to produce processed packets 425, denoted $P_1$, $P_2$, ... $P_n$. In the preferred embodiment, processed packets 425 are the same length as raw packets 415 and n>k. To a first approximation, FM channel 150 of FIG. 1 is an intermittent channel which is either error-free (or has few enough errors that adding a forward-error-correcting code, or FEC, can correct them) or totally noisy. The essentially error-free state occurs when playback device 120 is within range of FM transmitter 130, while the totally noisy state occurs when playback device 120 is out of range of FM transmitter 130. (The totally noisy state also occurs when playback device 120 is turned off, although the preferred embodiment has playback device 120 turned on all the time and uses low power electronics and an auxiliary, rechargeable battery so that this does not drain the main battery excessively in mobile applications). This approximation to FM channel 150 is an erasure channel (i.e., playback device 120 knows when errors can occur). A minor exception is the few packets that occur at the transitions between these two states. They are only partially erased but, in the preferred embodiment, are treated as total erasures.

Any erasure-correcting code known in the art can be used by erasure-correcting encoder 420, with the preferred embodiment using Reed-Solomon codes over $GF(2^{16})$. Some alternative embodiments are random codes, Tornado codes, and Luby Transform codes. See, for example, U.S. Pat. Nos. 6,614,366, 6,486,803, 6,411,223, 6,373,406, 6,320,520, and 6,307,487 and U.S. patent applications 2001/0019310, 2002/0087685, 2002/0107968, 2002/0129159, 2002/0190878, 2003/0058958, 2003/0226089, 2004/0021588, 2004/0075593, and 2004/0101274. Another alternative embodiment uses the Reed-Solomon code in burst-error-correcting mode rather than erasure-correcting mode, which embodiment makes better use of partially erased packets.

The use of Reed-Solomon codes is well known in the art, including correction of random errors, burst errors, and erasures, with audio CD's being a well-known example. Erasures on audio CD's occur in blocks where a manufacturing defect or a speck of dust obliterates a small area of the CD. This small area, however, contains a large number of bits. The defect can be identified either by the SNR at the analog level or by error detecting bits after demodulation, transforming the problem into one of erasure correction. In the case of transmission of data packets over FM channel 150, erasures will mostly be packets lost due to the playback device being out of range of the transmitter or to localized signal fading and again be identified either by SNR at the analog level (e.g., signal quality indicator 240 of FIG. 2) and/or by error correcting/detecting bits after demodulation. Reed-Solomon codes are in widespread use so that custom IC decoders (e.g., Philips Semiconductors part number SAA7207H_C1) are available and can be integrated into the preferred single chip implementation of playback device 120's electronics. See also De Marzi et al U.S. Pat. No. 6,594,794 "Reed-Solomon decoding of data read from DVD or CD supports" and Huang U.S. Pat. No. 6,061,760 "Controller circuit apparatus for CD-ROM drives."

The preferred embodiment uses Reed-Solomon codes over $GF(2^{16})$, so that codeword symbols are 16 bits (2 bytes) long, and the block length is $(2^{16})$=65,535. (For reasons described below, this code will usually be shortened by only sending some of the 65,535 possible symbols.)

FIG. 5 depicts the structure of the preferred Reed-Solomon encoding performed by erasure-correcting encoder 420 on a 2.88 MB data segment 405, broken into 288 packets with 10 kB in each packet (e.g., the three minute song considered above). Since the Reed-Solomon code operates on symbols consisting of 2 bytes each, each 10 kB packet is 5,000 symbols long and is shown as a row in FIG. 5. The first raw packet 415 is the same as the first processed packet 425 (i.e., $R_1=P_1$) and consists of the first 10 kB or 5,000 2-byte-symbols of the 2.88 MB data segment 405. The second raw packet 415 is the same as the second processed packet 425 (i.e., $R_2=P_2$) and consists of the next 10 kB of the 2.88 MB data segment 405. The same is true up to and including the $288^{th}$ packet, which consists of the last 10 kB of the 2.88 MB data segment 405. The $289^{th}$ through $65535^{th}$ processed packets 425 (i.e., $P_{289}$ through $P_{65535}$) are functions of the 2.88 MB data segment 405 and, in general, are not equal to any raw packets. Rather, they are formed by treating each column of FIG. 5 as a Reed-Solomon codeword over $GF(2^{16})$, with each column encoded by the same Reed-Solomon encoder.

As is known in the art, when a Reed-Solomon code with the above parameters is used on an erasure channel it is capable of recovering all 288 information symbols in a column when any 288 of the transmitted symbols in that same column have been received. Thus for example, the first column of FIG. 5 consists of the Reed-Solomon codeword $(s_{1,1}, s_{2,1}, s_{3,1}, \ldots S_{65535.1})$ with information symbols $(s_{1,1}, s_{2,1}, s_{3,1}, \ldots s_{288.1})$, and any 288 of the 65,535 encoded symbols $(s_{1,1}, s_{2,1}, s_{3,1}, s_{65535.1})$ determine the information symbols $(s_{1,1}, s_{2,1}, s_{3,1}, \ldots s_{288.1})$. The same is true for each column, so any 288 processed packets 425 determine the 288 raw packets 415 which constitute the 2.88 MB data segment 405. Reed-Solomon codes are optimal in this application since it is impossible to recover 2.88 MB of information with less than 2.88 MB of received data.

Luby et al (e.g., U.S. Pat. Nos. 6,614,366, 6,486,803, 6,411,223, 6,373,406, 6,320,520, and 6,307,487 and U.S. patent applications 2001/0019310, 2002/0087685, 2002/0107968, 2002/0129159, 2002/0190878, 2003/0058958, 2003/0226089, 2004/0021588, 2004/0075593, and 2004/0101274) have developed other erasure-correcting codes sometimes called Luby Transform (LT) codes or digital fountain codes. These codes often require less decoding effort than Reed-Solomon codes, but at the expense of being slightly suboptimal in that they typically require 1-10% more than 2.88 MB of received data to reconstruct the 2.88 MB data segment 405. The preferred embodiment of the present invention uses Reed-Solomon codes because:

As explained in the earlier section "Moore's Law, Storage, and Communications" bandwidth is a scarce resource and is likely to become even dearer relative to computational costs, making the bandwidth optimal Reed-Solomon codes a better choice than the computationally more efficient digital fountain codes.

Because the columns of FIG. 5 are all encoded with the same Reed-Solomon code and packets (rows) are either received error-free or erased, the decoding effort can be amortized over the 5,000 rows of FIG. 5, effectively dividing most of the computational burden by a factor of 5,000. This greatly reduces the advantage of more computationally efficient, but less bandwidth efficient codes.

Different strategies are used by transmitter communication protocol software 320 for different types of data segments 405 and, in particular, to determine the times, if any, that transmitter communication protocol software 320 transmits processed packets 425, $P_1$-$P_{65535}$. (For clarity of exposition, it will sometimes be said that transmitter communication protocol software 320 transmits packets whereas, to be precise, it causes them to be transmitted by digital modulator 330 and RF amplifier 335. Also for clarity of exposition, one or more processed packets 425 $\{P_i\}$ will sometimes be referred to merely as packets $\{P_i\}$.)

First consider the case where the 2.88 MB data segment 405 consists of a three-minute song. Transmitter communication protocol software 320 first transmits $P_1$-$P_{289}$, the first 289 rows depicted in FIG. 5. When transmitting all but the last such packet, $P_{289}$, this strategy is no different from the simple method of transmitting data segment 405 with no encoding (other than that provided by transmitter packet processor 430 of FIG. 4, discussed in the section "Packet Overhead" below) since, as shown in FIG. 5, $P_1$-$P_{288}$ constitute the unencoded 2.88 MB song (the 288 raw packets $R_1$-$R_{288}$). The last packet of this first transmission, $P_{289}$, is redundant and is only of value if one or more of packets $P_1$-$P_{288}$ are erased (i.e., if playback device 120 is out of range of FM transmitter 130 during part of this transmission, or one or more momentary fades occur).

If playback device 120 is within range of FM transmitter 130 at the time of these transmissions and at most one packet of $P_1$-$P_{289}$ is erased by a momentary fade, then at least 288 of these 289 transmitted processed packets 425 are received. A Reed-Solomon decoder in playback device 120 (stored as software in memory 232 of FIG. 2, or implemented in special purpose hardware on the single chip implementation of the electronic portion of playback device 120) can then recover the 2.88 MB data segment 405 (which in this case is equivalent to a content segment 110) and make it available to playback device 120 whenever a playlist 112 calls for it to be played.

The redundant $P_{289}$ was included in this first transmission since occasional fades occur in mobile FM reception. If $P_{289}$ had not been included, a much larger fraction of playback devices 120 would not have access to the 2.88 MB data segment 405 based on just this first transmission. Alternative embodiments transmit more than one or no redundant processed packets 425, depending on the characteristics of FM channel 130 and the time urgency of playback device 120 receiving this song.

If playback device 120 is within range of FM transmitter 130 at the time of these transmissions (transmissions of $P_1$-$P_{289}$) and more than one packet of $P_1$-$P_{289}$ is erased by momentary fades, then less than 288 of these 289 transmitted processed packets 425 are received, less than 2.88 MB of information is received, and it is clearly impossible for the Reed-Solomon decoder in playback device 120 to recover the 2.88 MB data segment 405. However, in the case of multiple fades while in range of FM transmitter 130, playback device 120 will typically need only a few additional packets from those not yet transmitted (i.e., $P_{290}$-$P_{65535}$).

If playback device 120 is out of range of FM transmitter 130 at the time of these transmissions (of $P_1$-$P_{289}$), then none of $P_1$-$P_{289}$ are received and playback device 120 knows nothing about the 2.88 MB data segment 405.

After transmitter communication protocol software 320's first attempt to communicate the song by transmitting $P_1$-$P_{289}$, it waits 1-2 days before making additional transmissions. The time delay is randomized as opposed to, for example, once every 24 hours since some users will always be out of range of FM transmitter 130 at a particular time of day (e.g., when they are in an underground parking garage during work hours). Transmitter communication protocol software 320's second attempt to communicate the song transmits packets $P_{290}$-$P_{578}$ of FIG. 5. The 289 packets are just as informative about the song as were $P_1$-$P_{289}$ and the Reed-Solomon decoder is able to reconstruct the song from any 288 of the total 578 total packets transmitted in the first and second attempts. Thus, for example, playback device 120 can reconstruct the song if it was out of range during the first attempted transmission, but loses at most one packet from the second attempted transmission; or there were multiple fades during both attempted transmissions, but at least 288 packets are received.

Additional attempts at transmitting the 2.88 MB song proceed in a similar manner to the first and second. At some point in this process (the third in the preferred embodiment) fewer than 289 packets are sent since most playback devices 120 will have received either enough or almost enough packets to reconstruct the song. In the preferred embodiment, at the end of this process, any missing packets at playback device 120 are transmitted over Internet 135 when playback device 120 is next within range of a WiFi 145 and communicates with broadcaster 100 indicating which data segments 405 it has received, and which data segments 405 it has partially received. (Broadcaster 100 is thus able to determine which transmitted data segments 405 playback device 120 has no knowledge of and which also need to be communicated over Internet 135.)

Alternative embodiments transmit different numbers of packets on each transmission attempt, depending on the time urgency of communicating the song (or other data segment 405), bandwidth availability, characteristics of FM channel 130 (which will vary with different types of service), etc. For example, if the song has a high time urgency (e.g., in broadcasting a live concert), more than 289 packets are sent on the first attempt to allow reconstruction with more than one fade. As another example, if a large fraction of playback devices 120 are within range of a WiFi 145 in FIG. 1 at least once per day, then transmission of songs may never be attempted over FM channel 150 and delivered only over Internet 135; or transmission may be attempted once with a larger number of redundant packets and, thereafter, broadcaster 100 waits for playback devices 120 to be in range of a WiFi 145, at which time they can tell broadcaster which packets, if any, are missing and broadcaster 100 can send any missing packets or equivalent information over Internet 135.

As another example of the preferred embodiment of transmitter communication protocol software 320's strategy for transmitting a data segment 405, consider a six minute financial report on current stock market conditions, encoded at 64 kbps. Such a financial report data segment 405 has the same 2.88 MB size as the three minute song considered previously and FIG. 5 accurately depicts its packet structure. For this data segment 405, the preferred embodiment of transmitter communication protocol software 320 transmits $P_1$-$P_{300}$ on its first attempt so that up to 12 of these packets can be lost and still allow immediate reconstruction of the data segment 405. While alternative embodiments have additional transmission attempts, the preferred embodiment makes only this one attempt due to the highly time-sensitive nature of this financial report data segment 405.

As yet another example, a data segment 405 that provides traffic reports during rush hour has $P_1$-$P_{300}$ transmitted on the first attempt, and $P_{301}$-$P_{600}$ transmitted five minutes later on the second attempt. The larger number of redundant packets and the more rapid retransmission are used because rush hour traffic reports are of high value to a large number of users.

In all of the above examples, transmitter communication protocol software 320 used only a small fraction of the 65,535 possible packets shown in FIG. 5. Hence erasure-correcting encoder 420 uses a shortened Reed-Solomon code as opposed to a complete Reed-Solomon code. Operating over $GF(2^{16})$ allows a larger number of packets than will be needed in all or almost all situations. Alternative embodiments can operate over smaller or larger finite fields than $GF(2^{16})$.

Transmitter Packet Processing

Transmitter packet processor 430 of FIG. 4 operates on processed packets 425 ($P_1$, $P_2$, $P_n$) to produce data packets 325, denoted $D_1$, $D_2$, ... $D_n$ and also depicted in FIG. 3 as the input to digital modulator 330. Data packets 325 are then transmitted at the times specified in the immediately preceding section to playback devices 120 of FIG. 1 by digital modulator 330, RF amplifier 335, and FM transmitting antenna 340 of FIG. 3 via FM channel 150 of FIG. 1.

Each data packet 325 is slightly longer than each processed packet 425 due to overhead introduced by transmitter packet processor 430. In the preferred embodiment the overhead is all contained in a packet header which consists of:
- an 11-bit Barker code synchronization field (e.g. 11100010010);
- a 5-bit version number field specifying the protocol version number;
- an 8-bit packet type field;
- a 16-bit packet length field;
- a 24-bit data segment ID field;
- a 16-bit data segment length field;
- a 16-bit packet ID field; and
- a 64-bit error correction and detection field.

Barker codes, also called Barker sequences, are well known in the art as having desirable properties for synchronization. Digital demodulator 215 of FIG. 2 includes an analog (or digital equivalent) matched filter for the Barker code used. In the absence of noise, the matched filter outputs a large signal only at the end of the Barker code which digital demodulator 215 uses in well known techniques to acquire synchronization with FM transmitter 130 of FIG. 1.

The 5-bit version number field for the protocol is used so that playback device 120 can tell if playback device 120 is using outdated protocol software, in which case playback device 120 requests an update via Internet 135, PC 140 and WiFi 145 of FIG. 1. If binary protocol number 11111 is reached, the next protocol number is taken cyclically to be number 00000. Protocols change infrequently enough that this cyclic nature of protocol numbering has virtually no chance of confusing playback device 120.

The 8-bit packet type field allows for up to 256 different types of packets, for example, user authorization messages, software updates, content library updates, playlist library updates, etc.

The 16-bit packet length field gives the length of the packet in bytes, allowing packet lengths up to 65,535 bytes. In alternative embodiments, packet lengths are specified in multiples of some fixed number of bytes, bits or other entities. If, for example, this fixed number is 2 and represents 2 bytes, then the 16-bit packet length field specifies half of the packet length in bytes, rounded up. Partial packets are filled with zeros or using other techniques known in the art.

For packets conveying encrypted content segments 111 the 24-bit data segment ID field specifies a content segment number for the content segment being conveyed. As described in the section "Key Distribution Data Rate" above, content segments 110 (and therefore encrypted content segments 111) are specified by a 24-bit content segment number which is divided into a content group number (the first 16 bits of the 24-bit number) and a content group segment number (the last 8 bits of the 24-bit number). All content segments within a group are encrypted using the same key, thereby reducing the number of keys that must be communicated.

For packets conveying information other than encrypted content segments 111, the 24-bit data segment ID field can be used for other purposes or filled with zeros or any other value. For example, when conveying a playlist 112, the 24-bit data segment ID field specifies the number of the playlist, padded with zeroes if need be (i.e., if playlist numbers are less than 24 bits long).

The Reed-Solomon decoder in playback device 120 which corrects erasures needs to know k, the number of raw packets associated with data segment 405 of FIG. 4 (e.g., k=288 in FIG. 5). The number of raw packets associated with data segment 405 is specified by the 16-bit data segment length field, allowing up to $2^{16}$=65,536 packets per data segment.

The 16-bit packet ID field specifies the packet number within a data segment 405. For example, FIG. 5 depicts the 65,535 packets that can be used to convey a 2.88 MB data segment, and this field will contain the index of the packet (e.g., 290 for $P_{290}$ shown in FIG. 5).

The 64-bit error correction and detection field is redundant information used to correct single errors and detect virtually all multiple errors. When playback device 120 is in range of FM transmitter 130, FM channel 150 typically has a bit error rate (BER) of 1E-6. Processed packets 425 are 80,160 bits long (80,000 bits of data plus 160 bits of overhead as specified above for the various header fields), so the probability that a packet is received error-free is $0.999999^{80160}$=92.3%; the probability of a single error is $80160*0.999999^{80159}*1E-6$=7.4%; and the probability of two or more errors is 0.3%. Hence 99.7% of received packets are error-free after application of a single error correcting decoder, and only about one packet in 300 has uncorrectable errors.

To a large extent, the undetected error rate P(e) can be upper-bounded by computing P(e) for a totally noisy channel. On a totally noisy channel, all $2^{80160}$ possible received points are equally likely, there are $2^{80096}$ codewords, and each codeword has a decoding region of volume 80161 (1 point for the codeword plus 80160 points that differ in one position from the codeword). Hence, on a totally noisy channel $$P(e)=2^{80096}*80161/2^{80160}=80161*2^{-64}=4.3E-15$$

and undetected errors are virtually non-existent.

Any error correcting and detecting code known in the art can be used, with the preferred embodiment being a shortened binary BCH code. Since unshortened binary BCH codes have lengths which are one less than a power of two and processed packets 425 are 80,160 bits long, the unshortened block length of the BCH code is one less than the next highest power of two, or $2^{17}-1$=131,071 bits. As is well known in the art, the BCH code is shortened by taking the first 131,071−80,145=50,926 bits to be zero and not sending them since they are known a priori. Methods for choosing the generator polynomial of this code and implementing the code in hardware are also well known in the art. See, for example, R. Gallager, *Information Theory and Reliable Communication*, Wiley, New York, 1968, pp. 224-225 for the encoding circuitry (FIG. 6.5.5 being preferred) and pp. 238-239 for choosing the generator polynomial.

Playback Device (Receiver) Packet Processing

Figure 6:
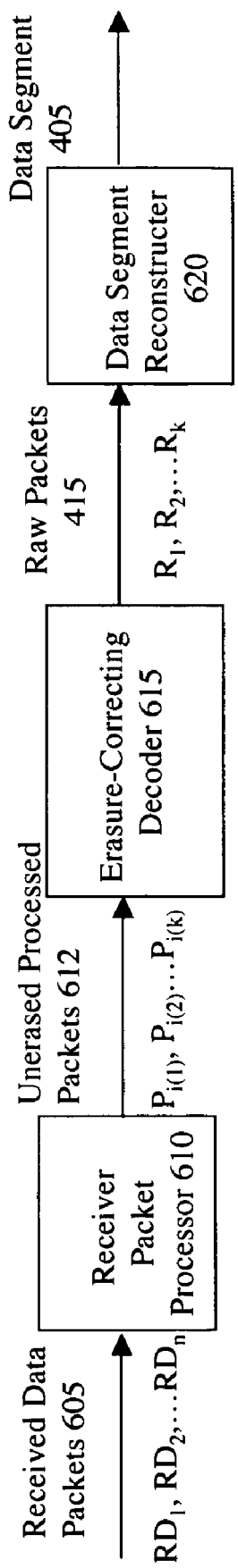
FIG. 6 is a block diagram of an exemplary embodiment of a receiver (playback device) communication protocol.

FIG. 6 depicts the operation of receiver communication protocol software 226 of FIG. 2 and largely mirrors FIG. 4 which depicts the transmitter communication protocol software 320. Received data packets 605, $RD_1$-$RD_n$, are noisy versions of (transmitted) data packets 325, D1-$D_n$, and are input to receiver packet processor 610 for processing. While the preferred embodiment makes use of signal quality indicator 240 of FIG. 2 to only input received data packets 605 that are of sufficient quality, for simplicity of exposition the embodiment depicted in FIG. 6 presents all received data packets 605. (For example, there is no need to perform the error detection operation described below on a received data packet 605 whose signal quality is so low that it is known a priori that it will not pass that test. But performing the error detection test on such low quality received data packets 605 does not change the end result produced by receiver communication protocol software 226 since they will be rejected by that test.)

Receiver packet processor 610 makes use of various fields in the 160-bit packet header described in the section "Transmitter Packet Processing" immediately above.

Receiver packet processor 610 first computes the Hamming distance (number of bit differences) between the received and transmitted versions of the 11-bit Barker code synchronization field 11100010010 and uses these differences in known techniques to correct any synchronization errors. For example, if the playback device should slip one bit late, instead of 11100010010 it will see 1100010010X where X is the first bit of the next field. Depending on the value of X, this will cause five or six errors in the received Barker code and a perceived bit error rate (BER) of approximately 50%. In contrast, when the playback device is synchronized with the transmitter, the perceived BER will be the BER of FM channel 150, typically 1E-6.

Microprocessor 225 can use any technique known in the art for acquiring synchronization. For example, when playback device 120 is first powered up, microprocessor 225 can wait for signal quality indicator 240 to indicate that playback device 120 is within range of an FM transmitter 130, at which point it looks for occurrences of the 11 bit Barker code 11100010010 in the received bit stream stored in buffer 220. Whenever this sequence occurs, microprocessor 225 then uses the other fields in the presumed packet header to process the presumed packet under direction of receiver packet processor software 610 as detailed below. If the error correction and detection decoder described below does not indicate an uncorrectable error, then the presumed packet is taken as a valid packet and synchronization is acquired. Since, as derived in the immediately preceding section, the error correction and detection decoder has at most a 4.3E-15 probability of not detecting an uncorrectable error, the probability of a false synchronization is also at most 4.3E-15 which, for all practical purposes, is zero.

Once initial synchronization is acquired in this manner, microprocessor 225 monitors the BER on the Barker code portion of successive packets and, if this BER is greater than normal for the observed value of signal quality indicator 240, microprocessor 225 tries moving synchronization plus or minus one bit, then plus or minus two bits, etc. looking for agreement between the computed BER and that expected based on signal quality indicator 240. (The relation between BER and SNR is well known in the art.) When a threshold, such as plus or minus 3 bits, is reached in this process, microprocessor 225 assumes synchronization has been totally lost and reverts to the initial synchronization strategy outlined in the preceding paragraph.

Receiver packet processor 610 next uses the 16-bit packet length field to determine the end of the packet and computes the syndrome of the received packet as the XOR of the computed 64-bit error correction and detection field with the received value, again using the circuitry depicted in Gallager, op cit, page 225, FIG. 6.5.5. If the 64-bit syndrome is all 0's then the received packet is error free or has undetectable errors, but since the undetected error rate is less than 4.3E-15, the packet can be assumed to be error-free.

If the syndrome has any 1's an error correction phase is attempted by microprocessor 225 (or, in alternative embodiments, by special purpose circuitry). The error correcting phase can use any method known in the art, with the preferred embodiment using the well known technique of a table lookup on non-zero syndromes to specify the single bit location to correct. Any such corrected packets then have their syndromes recomputed and accepted as valid only if the recomputed syndrome is all 0's. Any packets which fail to pass this test are discarded, considered erased, and not operated on further. (Alternative embodiments make use of these packets instead of discarding them, for example, by using the Reed-Solomon code in burst error correcting mode instead of erasure correcting mode.)

Receiver packet processor 610 next compares the 5-bit protocol number field with the operative protocol number that playback device 120 was last instructed to use. Except in rare circumstances, the two values will agree. If they disagree, playback device 120 knows that it has missed a protocol update and requests the same from broadcaster 100 when playback device 120 is next within range of a WiFi 145. Until the protocol is updated, playback device 120 also indicates an error condition on visual display 280 and uses previously stored content segments 110 and playlists 112. The user thus sees almost no loss of service even during such a severe service failure.

After the above operations, receiver packet processor 610 waits until it has k (e.g., k=288 in FIG. 5) unerased (error-free) packets 612, denoted $P_{i(1)}$, $P_{i(2)}$, ..., $P_{i(k)}$, and passes these unerased packets 612 to erasure-correcting decoder 615. If there were no erasures (uncorrectable errors) on FM channel 150, $P_{i(1)}$, $P_{i(2)}$, ..., $P_{i(k)}$ would be the same as processed packets 425 in FIG. 4. But because FM channel 150 is subject to erasures, the indices of these packets (i(1), i(2), ..., i(k) specified by their 16-bit packet ID fields are not necessarily consecutive integers. Erasure-correcting decoder 615 uses any technique known in the art for correcting erasures with a Reed-Solomon code, for example solving k simultaneous equations in k unknowns over $GF(2^{16})$ via a matrix inversion. Since each column in FIG. 5 (where k=288) represents a Reed-Solomon codeword, once the equations are solved for column 1, the same solution coefficients can be applied to the remaining 4,999 columns, so that portion of the computational effort per recovered symbol is reduced by a factor of 5,000.

After correcting erasures, the output of erasure-correcting decoder 615 is ($R_1$, $R_2$, ... $R_k$), the sequence of raw packets 415, also depicted in FIG. 4 prior to transmission. Raw packets 415 are then assembled into data segment 405 by data segment reconstructer 620 and stored on hard disk drive 230 of FIG. 2, along with data segment 405's type (determined from the 8-bit packet type field in the packet header), data segment ID number (determined from the 24-bit data segment ID field in the packet header), and length in bytes (obtained as the product of the 16-bit packet length and the 16-bit data segment length fields in the packet header, or in an alternative embodiment, by including this length as a data segment header). Data segment 405 may be in encrypted or unencrypted form, depending on its type and economic value. For example, commercials will typically be transmitted and stored in unencrypted form, while music will typically be encrypted.

Cryptoprocessor Detail

Figure 7:
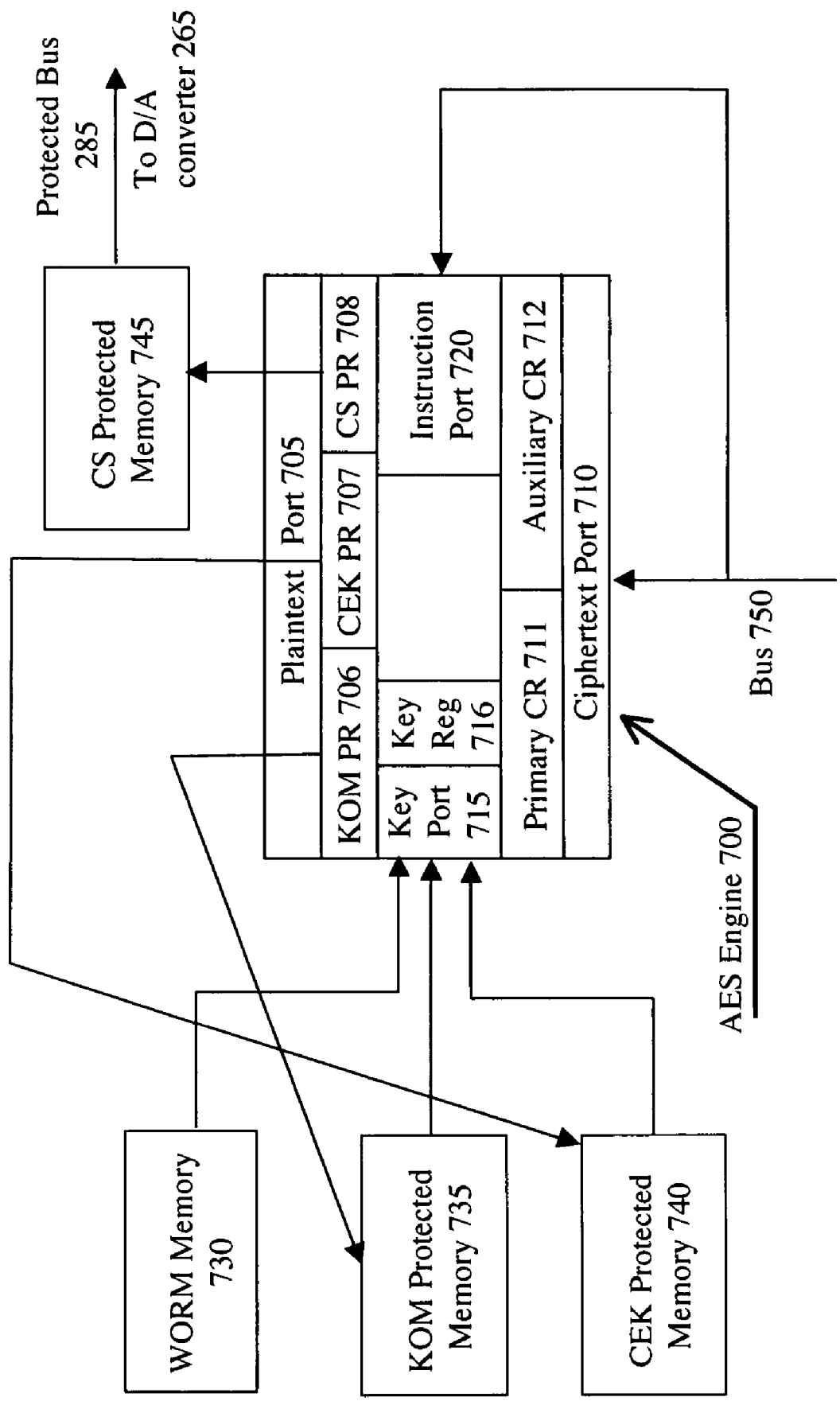
FIG. 7 is a block diagram of an exemplary embodiment of a cryptoprocessor.

FIG. 7 depicts cryptoprocessor 235 of FIG. 2 in greater detail. (Cryptoprocessor 235 is preferably part of a single chip implementation of the electronic portion of playback device 120.) AES engine 700 implements NIST's AES algorithm as specified in FIPS PUB 197. As previously defined in the section "Key Distribution Data Rate," $C=E_K(P)$ denotes the ciphertext C produced by AES encrypting the 128-bit plaintext block P under action of key K; and $P=D_K(C)$ denotes the plaintext P produced by AES decrypting the 128-bit ciphertext block C under action of key K. As implied by this notation $P=D_K(E_K(P))$) since decryption under key K is the inverse operation to encryption under key K. As described previously, playback device 120 receives the following encrypted data:

$E_{DK}$(KOM) where DK is playback device 120's Device Key written into WORM (Write Once Read Many times) memory 730 at radio factory 115 of FIG. 1 and KOM is the Key Of the Month for the tier of service to which playback device 120 is entitled (alternative embodiments can entitle a playback device 120 to multiple tiers of service). $E_{DK}$(KOM) is part of the previously described user authorization message in the section "User Authorization Message Data Rate."

$E_{KOM}$(CEK) where CEK is a Content Encrypting Key. $E_{KOM}$(CEK) is sent as part of a playlist as previously described in the section "Key Distribution Data Rate."

$E_{CEK}$(CS) where CS is a Content Segment (e.g., a song).

Playback device 120 recovers an encrypted Content Segment by:

first decrypting the encrypted Key Of the Month using its Device Key and storing the result in KOM protected memory 735;

then decrypting the encrypted Content Encrypting Key using the now decrypted Key Of the Month and storing the result in CEK protected memory 740; and finally decrypting the encrypted Content Segment using the now decrypted Content Encrypting Key and storing the result in CS protected memory 745 for output on protected bus 285 also depicted FIG. 2.

In the above three operations, playback device 120 performs only decryption operations. (Broadcaster 100 performs the corresponding encryption operations.) Therefore, while alternative embodiments also use AES in encryption mode, the preferred embodiment depicted in FIG. 7 only uses AES in decryption mode.

AES engine 700 has four ports:
a plaintext port 705;
a ciphertext port 710;
a key port 715; and
an instruction port 720.

Since playback device 120's AES engine 700 operates only in decryption mode, ciphertext port 710 is an input port (i.e., no data can flow out of it) and plaintext port 705 is an output port (i.e., no data can flow into it). Key port 710 is an input port since no other element of playback device 120 has a legitimate reason for trying to read a key out of AES engine 700. Rather, once a key is input to key port 710, it is stored in a key register 716, internal to AES engine 700 and which can only be read by AES engine 700 when instructed to decrypt a 128-bit ciphertext block by an instruction input to instruction port 720. Instruction port 720 is also an input port.

Preferably, as depicted in FIG. 7, AES engine 700's plaintext port has three physically distinct data paths connected to three physically distinct plaintext registers (KOM PR 706, CEK PR 707, and CS PR 708, where PR is an abbreviation for plaintext register), which plaintext registers are used to temporarily store the result of decryptions by AES engine 700. As indicated by the names of their associated plaintext registers, these three plaintext registers and data paths are used to store and communicate three different types of computed plaintexts with different economic values:

Keys Of the Month (KOMs),
Content Encrypting Keys (CEKs), and
Content Segments (CSs) or other data.

The reason for having three physically distinct plaintext registers and data paths is to segregate these different computed plaintexts to minimize the probability that an opponent can learn any of them. Further, the single chip implementation of playback device 120's electronics is preferably designed with higher security (e.g., masking of data paths by metal layers) on the more valuable plaintext registers and data paths, with KOMs being more valuable than CEKs, and CEKs being more valuable than CSs.

A playback device 120's Device Key (DK) is the most sensitive data that it stores since, if a pirate were to learn DK, he could compute KOMs for every month and tier of service to which that playback device 120 was authorized to have access. These computed KOMs could then be shared with specially produced "pirate playback devices" which bypass any other security mechanisms (e.g., checking that the digital signature with a user authorization message is valid). While a separate plaintext register is not needed for DK since it is burned into WORM memory 730 at radio factory 115 and therefore never computed, WORM memory 730 must be protected. In particular, the data path from WORM memory 730 to key port 715 is given a high level of protection (e.g., a grounded metal overlay to foil attempts to tap into this data path with a microprobe).

AES engine 700 is a special purpose microprocessor which performs only cryptographic operations. Hence the name "cryptoprocessor" for element 235 of FIG. 2. (Cryptoprocessor 235 includes all of the elements of FIG. 7, not just AES engine 700, just as a normal microprocessor typically includes internal memory and registers.) The instruction set for AES engine 700 is extremely small and specific, allowing for a much higher level of security than with a normal microprocessor. Instructions executed by AES engine 700 are specified by microprocessor 225 of FIG. 2 and microprocessor 225 carries out corresponding operations on public (as opposed to secret) information.

The first instruction in AES engine 700's instruction set computes a 192-bit Key Of the Month for the tier of service that broadcaster 100 has authorized playback device 120 to receive.

This instruction takes the form
DECRYPT_KOM(LOCATION, KOM#)

which causes microprocessor 225 to:
retrieve the 192-bit Encrypted Key Of the Month EKOM, 4-bit tier of service TIER, and 4-bit month relative to the current date and time MONTH from the location on HDD 230 specified by the bit string LOCATION,
use the current date and time to translate the relative 4-bit MONTH field into an absolute 16-bit month field (allowing 65,536 months or over 5,000 years before cycling), store TIER and the computed 16-bit month field in a table of KOM information stored on HDD 230 along with the location KOM# in KOM protected memory 735 where the decrypted KOM will be stored (see immediately below and note that KOM itself is never stored on HDD 230), and communicate EKOM to AES engine 700's ciphertext port 710 via bus 750 (to enhance security bus 750 can convey information from less secure parts of playback device 120 to AES engine 700's ciphertext port, but to no other part of AES engine 700, and bus 750 cannot be used to retrieve information from any part of AES engine 700);

and causes AES engine 700 to store the first 128 bits of EKOM in primary ciphertext register (Primary CR) 711 and the second 64 bits of EKOM in auxiliary ciphertext register (Auxiliary CR) 712, communicate the 256-bit Device Key DK from WORM memory 730 to AES engine 700's key port 715 and store DK in key register 716, execute a Counter Mode AES decryption to produce $D_{DK}$(EKOM) which stores the resulting 192-bit decrypted Key Of the Month KOM in KOM PR 706, and communicate KOM from KOM plaintext register 706 via plaintext port 705 to KOM protected memory 735 where it is stored in location KOM#, erasing any previous contents of that location.

KOM protected memory 735 can hold more than one Key Of the Month so that KOM's for one or more future months can be predelivered and ready for use immediately when the month changes. In some embodiments, playback device 120 is authorized for multiple tiers of service (e.g., if a higher tier also has access to a lower tier's content), also requiring that KOM protected memory 735 hold more than one KOM.

WORM memory 730 is a write-once semiconductor memory so that, after its Device Key DK is burned into it at radio factory 115, its contents cannot be changed (e.g., so it could illegally share user authorization messages with another user, with only one of them paying for service). WORM memory technology is well known in the art of semiconductor fabrication and is used, for example to burn unalterable serial numbers into microprocessors, and to increase memory chip yields by burning in information on defective portions of memory which can then be avoided. One such WORM approach is to use fuses which are blown (written to) by a higher than normal voltage. It is "write once" since, once a fuse is blown, it cannot be returned to its original state.

The second instruction in AES engine 700's instruction set produces a Content Encrypting Key CEK needed to decrypt content segments CS on playlists for the tier of service that broadcaster 100 has authorized playback device 120 to receive in a given month, and then stores that Content Encrypting Key in CEK protected memory 740. This instruction takes the form

DECRYPT_CEK(LOCATION, KOM#, CEK#)

which causes microprocessor 225 to:

retrieve the 128-bit Encrypted Content Encrypting Key ECEK and Content Encrypting Key Number CEK_NO from the location on HDD 230 specified by the bit string LOCATION;

store CEK_NO in a table of CEK information stored on HDD 230 along with the location CEK# in CEK protected memory 740 where the decrypted CEK will be stored (see immediately below and note that CEK itself is never stored on HDD 230), and communicate ECEK to AES engine 700's ciphertext port 710;

and causes AES engine 700 to store ECEK in primary ciphertext register 711, communicate the 192-bit Key Of the Month KOM stored in location KOM# in KOM protected memory 735 to AES engine 700's key port 715, and store KOM in key register 716;

execute an ECB Mode AES decryption $D_{KOM}$(ECEK) which stores the resulting 128-bit decrypted Content Encrypting Key CEK in CEK plaintext register 707;

communicate CEK from CEK plaintext register 707 via plaintext port 705 to CEK protected memory 740 where it is stored in location CEK#.

The third instruction in AES engine 700's instruction set produces a decrypted Content Segment Block CSB which is part of a content segment (CS) 110 on a playlist 112 for the tier of service that broadcaster 100 has authorized playback device 120 to receive in a given month, and then stores that CSB in CS protected memory 745 for output on protected bus 285 which also is depicted in FIG. 2. This instruction takes the form

DECRYPT_CSB(LOCATION1, LOCATION2, CEK#)

which causes microprocessor 225 to:

retrieve the 128-bit Encrypted Content Segment Block ECSB from the location on HDD 230 specified by the bit string LOCATION1, if LOCATION2≠0, retrieve a 128-bit Initialization Vector (as defined in Cipher Block Chaining or CBC mode) IV from the location on HDD 230 specified by the bit string LOCATION2 (LOCATION2=0 indicates that this ECSB is not the first so that an IV is not needed for its decryption; rather the preceding ECSB which will already be stored in AES engine 700 from the previous instruction is used), communicate ECSB to AES engine 700's ciphertext port 710 if LOCATION2:0, communicate IV to AES engine 700's ciphertext port 710, if LOCATION2=0, communicate IV=0 to AES engine 700's ciphertext port 710 (IV=0 is not allowed as an Initialization Vector, so this tells AES engine 700 that an IV is not being used), and causes AES engine 700 to store ECSB in primary ciphertext register 711, if IV≠0, store IV in auxiliary ciphertext register 712, if IV=0, to not disturb the current contents of auxiliary ciphertext register 712, communicate a 128-bit Content Encrypting Key CEK from location CEK# in CEK protected memory 740 to AES engine 700's key port 715 store CEK in key register 716, execute an AES decryption $D_{CEK}$(ECSB) which stores the resulting CBC decrypted Content Segment Block CBC_CSB in CS plaintext register 708, XOR the contents of CS plaintext register 708 (CBC_CSB) with the contents of auxiliary ciphertext register 712 to produce the original Content Segment Block CSB and store the result in CS plaintext register 708 (since CBC mode encrypts the current plaintext block XORed with the previous ciphertext block, which previous ciphertext block is now stored in auxiliary ciphertext register 712), communicate CSB from CS plaintext register 708 via plaintext port 705 to CS protected memory 745 where it is then output on protected bus 285 which (as shown in FIG. 2) will convey it to D/A converter 265, and transfer ECSB from primary ciphertext register 711 to auxiliary ciphertext register 712 (since in CBC mode, auxiliary ciphertext register 712 stores the previous ciphertext block).

The fourth (and in the preferred embodiment, the last) instruction in AES engine 700's instruction set causes AES Engine 700 to erase a CEK from CEK protected memory 740. This instruction takes the form

ERASE_CEK(CEK#)

which causes microprocessor 225 to erase the entry corresponding to CEK# in the table of CEK information stored on HDD 230 and causes AES Engine 700 to erase the contents of CEK# in CEK protected memory 740. This instruction is used, for example, to erase a CEK

- that is not needed for the rest of the current month by playlists associated with the tier of service to which playback device 120 is authorized, or
- that is associated with a song that the user has purchased for a limited period of time or use, which time or use period has now expired. Erasing CEKs that are not need in the immediate future enhances security. An alternative, less secure embodiment keeps CEKs until protected CEK memory 740 is full, at which point unneeded CEKs are erased, for example on a FIFO basis. (The preferred embodiment does not erase expired KOMs since they are less of a security threat because nothing is encrypted in them after they expire. However, an alternative embodiment has a fifth instruction which erases a KOM.)

Preferably, CEK protected memory 740 is capable of storing at least as many CEKs as a user might have songs in a large purchased music collection (e.g., equivalent to 1000 CDs with 20 songs on each, or 20,000 CEKs for a total size of 320 kB).

Authenticating Playlists and Content Segments

As described above, the preferred embodiment uses a single chip implementation for the electronic portions of playback device 120 and is highly secure. If either additional security is desired or a multiple chip implementation is used, then an alternative embodiment of the present invention can be used which authenticates playlists 112 and content segments 110 to ensure that the program played by playback device 120 is authorized by broadcaster 100. The use of authenticated playlists 112 guards against a number of threats including an opponent modifying a playlist for a commercial-supported user tier so that it no longer contains commercials. Similarly the use of authenticated content segments 110 guards against a number of threats including an opponent changing a commercial content segment to an entertainment content segment.

Any authentication technique known in the art can be used to protect both playlists 112 and content segments 110, including for example:

- Authentication based on digital signatures can use NIST's aforementioned FIPSPUB 186-2 "Digital Signature Standard (DSS)."
- Authentication based on a conventional (symmetric) cryptosystem such as NIST's AES or DES can use NIST's "Recommendation for Block Cipher Modes of Operation: The CMAC Mode for Authentication" described in NIST's Special Publication 800-38B by Morris Dworkin.

The alternative embodiment described in this section uses NIST's CMAC mode for authentication, but with AES's encryption operation replaced with a decryption operation. Since AES encryption and decryption are mathematically similar operations, this change should not affect the security of the CMAC produced and has the advantage that AES engine 700 need only operate in decryption mode. (Alternatively, the CMAC can be computed as usual, with AES acting in encryption mode.)

Figure 10:
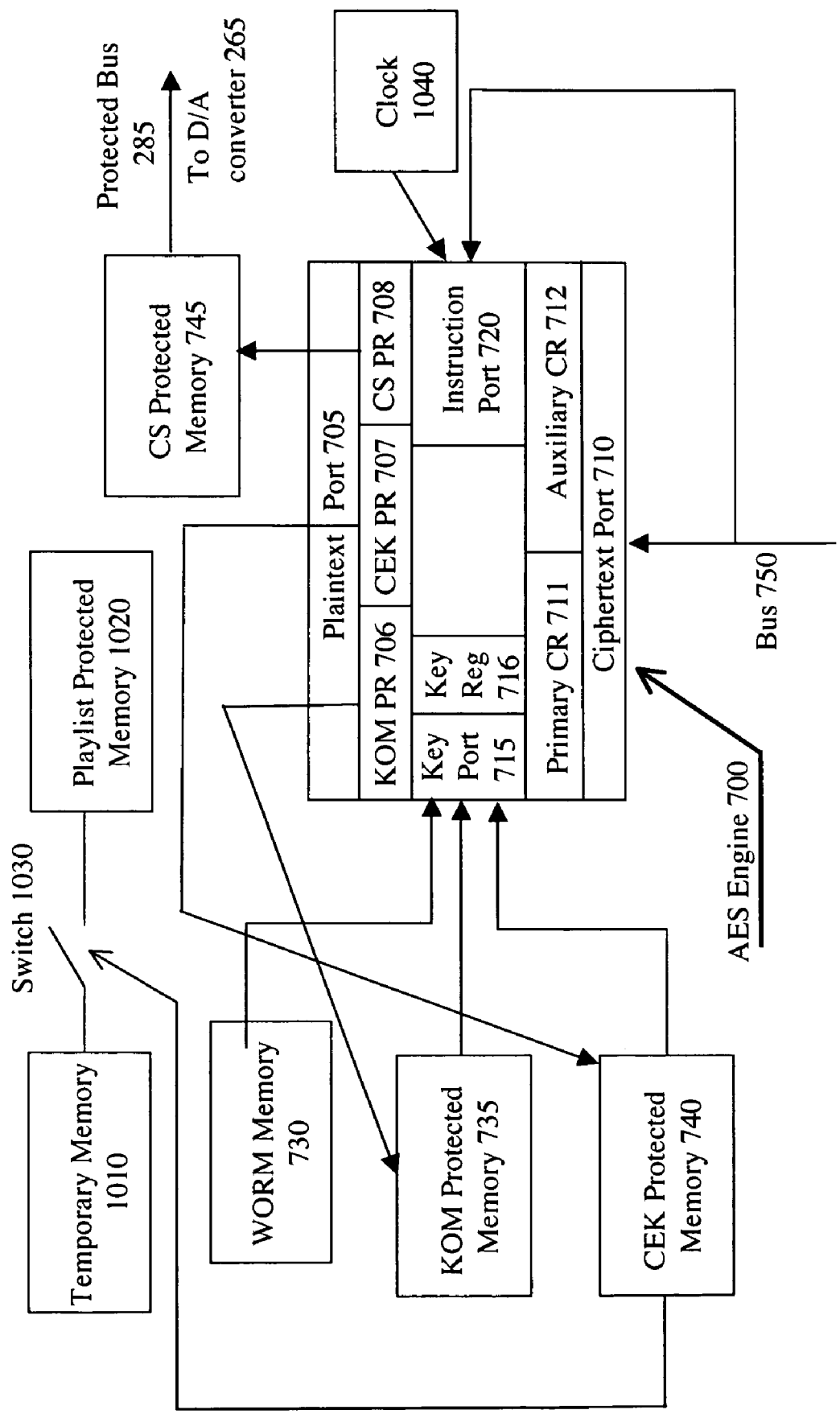
FIG. 10 is a block diagram of a second exemplary embodiment of a cryptoprocessor.

Authentication of playlists 112 and content segments 110 is preferably carried out by a cryptoprocessor 235 similar to that depicted in FIG. 7, but which includes additional protected memories as depicted in FIG. 10. A playlist 112, which now includes an authentication field created by broadcaster 100 using the current Key of the Month (KOM) as the key, is loaded into temporary memory 1010. AES engine 700 then performs the CMAC check, also using the Key of the Month (KOM) as the key.

If the CMAC check indicates that playlist 112 is authentic, playlist 112 is moved from temporary memory 1010 to playlist protected memory 1020. The data path from temporary memory 1010 to playlist protected memory 1020 is only usable when switch 1030 is closed. Switch 1030 is activated by a command from CEK protected memory 740 which compares the computed CMAC with the received CMAC. The computed CMAC is stored in CEK protected memory 740 because that is where decryptions involving KOM are stored and the computed CMAC uses KOM decryptions. (Alternatively, a separate CMAC protected memory can be used.) Switch 1030 is effected in solid state circuitry.

In this embodiment, only a playlist 112 stored in playlist protected memory 1020 can be an active playlist. Further, a content segment 110 specified by playlist 112 stored in playlist protected memory 1020 must pass a CMAC test similar to that described above before AES engine 700 will decrypt the corresponding encrypted content segment 111. The CMAC check also authenticates a header field in content segment 110, including the previously described DoNotSkip bit and a new time duration field. When cryptoprocessor 235 detects a content segment 110 whose DoNotSkip bit is set to 1, cryptoprocessor 235 will not allow decryption of the next encrypted content segment 111 until the specified time duration has elapsed. Clock 1040 connected to instruction port 720 is used for this purpose.

In this embodiment, FIG. 2 is preferably modified by deleting the data path between microprocessor 225 and D/A converter 265. Then all data flowing to and from D/A converter is conveyed by protected bus 285, which is connected solely to highly secure cryptoprocessor 235. Any messages that microprocessor previously conveyed to the user via D/A converter 265, audio amplifier 270 and loudspeaker 275 are now routed as content segments (with appropriate CMAC) to augmented cryptoprocessor 235 which only passes them to D/A converter if they pass the CMAC check.

Example Media Program

Figure 11:
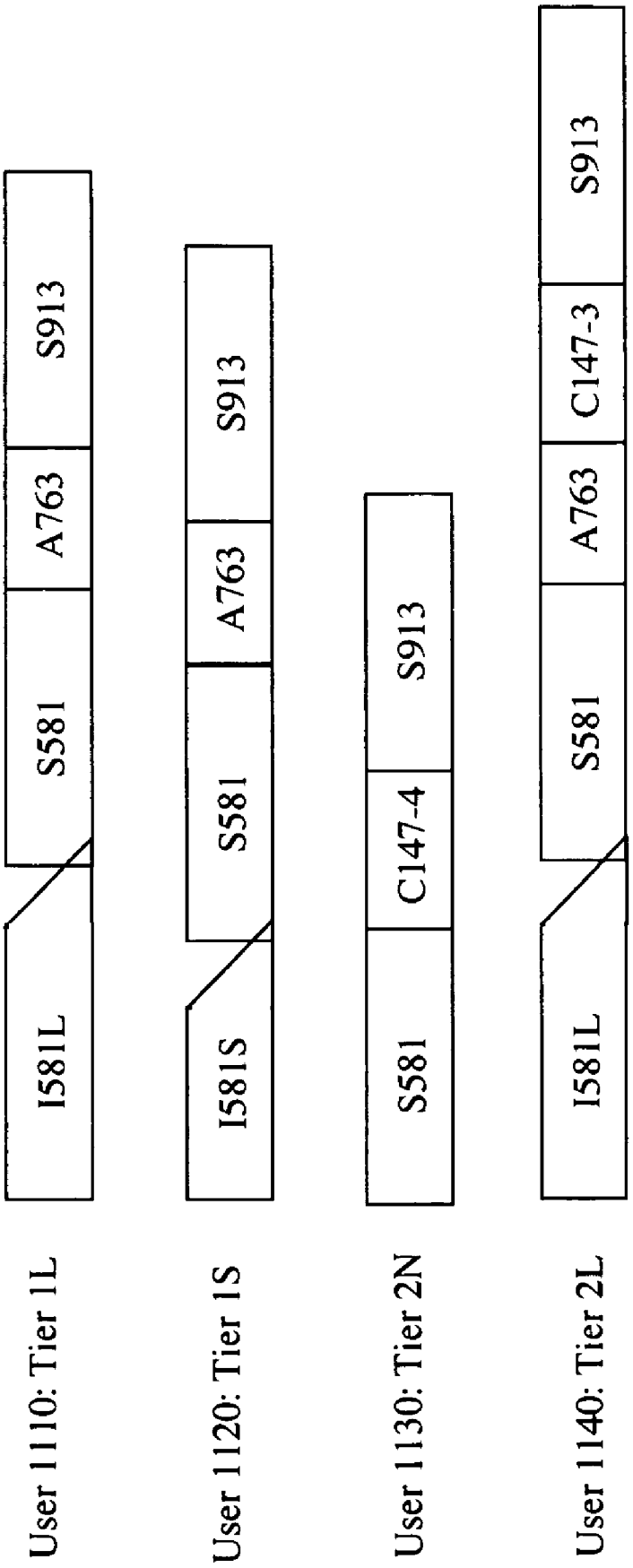
FIG. 11 is an illustration of a media program as experienced by different tiers of users with different preferences.

FIG. 11 depicts a small example of a media program as played by several playback devices 120 according to one embodiment of the present invention. In the embodiment depicted in FIG. 11, a single playlist 112 is used for all tiers of users, with microprocessor 225 modifying the sequence of content segments specified by playlist 112 as appropriate for each tier of user.

In this small example, there are two tiers of users. Tier 1 users receive the media program commercial free, while tier 2 users are commercial-supported. Each tier is subdivided into three subtiers, dependent on the length of DJ introduction that the user has selected. Tiers 1L and 2L denote users who have requested long introductions; tiers 1S and 2S denote users who have requested short introductions; and tiers 1N and 2N denote users who have requested no introductions (music only mode).

While as described earlier, content segments 110 are specified by content segment numbers which allow larger numbers, for the sake of clarity, FIG. 11 uses three digit content segment numbers plus a specifier for the type of content segment number (I for Introduction, S for Song, C for Commercial, and A Station Announcement). Further, content segments 110 which are introductions have one of three suffixes, L for long, S for short, and Z for zero. Content segments 110 which correspond to commercials have a single digit suffix, allowing for ten versions of a commercial in this small example.

FIG. 11 depicts four users, all tuning to the same program channel at the same point in time. FIG. 11 also assumes that playlist 112 for this program channel is a new one so that each user starts listening at the beginning of playlist 112. The assumed playlist 112 is I581, S581, A763, C147, S913 meaning that the program consists of the introduction to song 581, song 581, station announcement 763, commercial 147, and finally song 913 without any introduction.

User 1110 is a tier 1 user who has requested long DJ introductions, so the sequence of content segments selected by microprocessor 225 responsive to playlist 112 consists of

I581L, S581, A763, C147, S913

User 1110 thus hears the long version of introduction I581, song S581, station announcement A763 and finally song S913 as the end of the program. (Actual programs will usually be much longer.) User 1110 is in tier 1 which does not get commercials on this program channel so microprocessor does not include commercial C147 in the program. Equivalently, microprocessor 225 assigns a content segment length of zero to C147 since user 1110 is a tier 1 user. FIG. 11 depicts a fade out on introduction I581 and an overlap (during the last part of the fade out) with song S581.

User 1120 is also in tier 1, but has requested short DJ introductions and thus hears

I581S, S581, A763, S913 with the only difference being that she hears the short version of introduction I581.

User 1130 is in commercial supported tier 2, has requested no DJ introductions, and hears

S581, C147-4, S913

Introduction I581 is deleted from user 1130's version of the program since he has requested no DJ introductions. (Equivalently introduction I581N can be included, but assigned zero length.) Station announcement A763 was deleted for this same reason. (This assumes that A763 is not legally required. A LegallyRequired bit in content segment headers can be used for this purpose, similar to the DoNotSkip bit described earlier.) In FIG. 11, commercial C147-4 is the most recent (highest suffix numbered) content segment corresponding to commercial C147 and is available in user 1130's content segment library, so C147-4 is the version of C147 heard by user 1130. Finally, song S913 completes playlist 112 for user 1130.

User 1140 is in commercial-supported tier 2, has requested long DJ introductions, has missed receiving C147-4 (the most recent version of commercial C147), but has C147-3 in his content segment library and thus hears

I581L, S581, A763, C147-3, S913

FIG. 11 illustrates how different users can custom tailor a program to their needs. Users can also change their preferences. For example, as depicted in FIG. 11, user 1130 requested no DJ introductions. If user 1130 take a long road trip alone and wishes the "companionship" that a DJ provides, he can change his preference to short or long DJ introductions. As described earlier, different languages can be requested depending on the user's preference. And, if user 1110 gets tired of the long version of introduction I581L depicted in FIG. 11, she can depress skip button 845 during that content segment and skip to the beginning of song S581.

While FIG. 11 uses an embodiment in which a single playlist 112 is modified by microprocessor 225 to account for its user tier and DJ preferences, separate playlists 112 can also be used for different tiers and preferences. In that embodiment, for example, user 1130's playlist 112 would be

S581, C147, S913 with I581 and A763 not included since user 1130 has requested no DJ talk.

Alternative Embodiments

Numerous alternative embodiments are possible using techniques known in the art, for example (but not by way of limitation):

While the preferred embodiment uses a large enough hard disk drive 230 so that the entire libraries of encrypted content segments 111 and playlists 112 that is available at the time of manufacture can be stored on each playback device 120, an alternative embodiment allows radio factory to generate different libraries for different playback devices 120. For example, if hard disk drive 230 is too small to store the entire libraries of encrypted content segments 111 and playlists 112, playback devices 120 can be divided into "classical units" and "rock units" with the former containing more classical music and the latter containing more rock music. In this embodiment, broadcaster 100 is considered to generate a content library and a playlist library for each class of unit even if the act of generating the libraries for the different classes is not done independently (e.g., if broadcaster 100 generates one large library and then selects subsets as the libraries for each class of unit).

The FM and Internet/PC/WiFi channels of the preferred embodiment can be replaced or augmented by (either individually or in combination) any other communication channels (broadly construed), including but not limited to:

the existing FM and AM radio bands (88-108 Mhz in 200 kHz channels, and 535-1705 kHz in 10 kHz channels), using an inaudible signal (e.g. a subcarrier), picking the new content from their normal broadcasts, or converting some such stations entirely to an update mode of operation;

the Internet, either wired or wireless;

cable or satellite TV, utilizing either a special portion of their spectrum or picking the new content from their normal broadcasts;

satellite radio (e.g., Sirius or XM Satellite Radio), utilizing either a special portion of their spectrum or data rate, or picking the new content from their normal broadcasts;

rental of all or part a satellite transponder (particularly useful for covering rural areas where the network of FM stations does not reach);

cell phone spectrum;

invisible and inaudible portions of TV signals (e.g., horizontal blanking intervals), or picking the new content from their normal broadcasts;

new spectrum allocation devoted specifically to this purpose;

mailed or otherwise physically shipped storage media, such as ROMs, EPROM's, CD's, DVD's, or newer storage media (e.g., BlueRay disks) as they are developed;

updates obtained by mobile playback devices at service stations, which service stations receive the updates via any communication channel (broadly construed);

telephone lines; and fiber optic cables.

Many subscription broadcast systems use removable smart cards or similar devices for security so that the security system can be more easily changed if compromised, and that technology can clearly be applied to the present invention.

Physical security can be substituted for or augment the cryptographic security of the preferred embodiment. For example, a highly tamper resistant module housing the disk drive could allow the valuable content library to be stored in unencrypted form.

While the preferred embodiment uses a microprocessor and associated software as a receiver controller (e.g., to determine which commands to send to the cryptoprocessor, which data is stored on the hard disk drive and in what format), this function can also be implemented in custom hardware, with multiple microprocessors, or with any other control means known in the art.

Memory other than a disk drive can be used to store the content library. In particular, certain benefits of the present invention can be obtained with a smaller flash memory substituted for the large disk drive. For example, a conventional FM station (either analog or the newer digital HD radio format) can utilize a low bandwidth subcarrier or digital substream to convey the content segment numbers of content segments as they are broadcast. If space is available in the flash memory and an error free version of the currently broadcast content segment is not already in the flash memory, then the receiver controller stores as much of the currently broadcast content segment as needed to create an error free version (or as much as is useful toward meeting that goal with later broadcasts). If space is not available in the flash memory, an algorithm is used to determine which (if any) stored content segments are to be deleted to make room for the currently broadcast content segment. Such algorithms for determining how to take maximal advantage of a cache are known in the art and, in this instance would utilize data on the user's listening habits, values assigned by the broadcaster, and other information in making its determination. The playback device then has two modes of operation, denoted live broadcast and playlist modes. In playlist mode, a playlist is activated via the user interface, thereby allowing additional choices over and above those available in live broadcast mode. In playlist mode, the playback device plays as many of the content segments as are available in the flash memory and that are specified by the activated playlist. Only playlists which meet a threshold on the fraction or number of content segments available in flash memory are displayed for user selection. In live broadcast mode, when a content segment which is available error free in flash memory is being broadcast, the playback device plays the stored, error free version in preference to the live broadcast. This embodiment can be augmented by preloading the flash memory at the factory with content segments.

A program guide can be transmitted to and stored by the playback device so it knows when to listen for missing material, thereby saving battery power, or which FM channel(s) to tune to in order to receive the most valuable data if the playback device is not capable of listening to all FM channel(s) at once.

User preferences (e.g., which channels the user tunes to, which songs he skips over or repeats, etc.) can be used internally in the playback device or communicated to the broadcaster to modify playlists for that playback device and/or to determine which content segments are transmitted to that playback device over the Internet or another directed communication channel.

Purchased content that is stored on the playback device can either be stored unencrypted or encrypted in a key, preferably unique to that playback device, used to encrypt purchased content.

Parental controls/lockouts can be used to restrict access to objectionable material.

Playlists can specify alternative content segments to play if the first choice has not yet been successfully received. This has an advantage over merely skipping missing content segments in that, for example, quiet music can be played at night.

Either the FM channel or the Internet/PC/WiFi channel can be eliminated and a single channel used for all communications. Alternatively, more than two channels can be used (e.g., an FM channel, the Internet/PC/WiFi channel, and a cellular telephone channel).

The present invention can be used with more than one broadcaster and, similar to the above described use of the reverse channel to divide royalties among copyright holders, the reverse channel can be used to divide subscription and advertising fees among the broadcasters. For example, the FCC has mandated that Sirius and XM make interoperable radios, capable of receiving either broadcaster. (Current radios are broadcaster specific.) Once such interoperable radios are available, a joint subscription could be offered to users. In that case, the present invention can be used to monitor each user's listening, communicate the amount of use for each broadcaster (herein "media provider information", whether based on time, value or similar criteria), and a formula used to divide a user's subscription fee between the broadcasters.

Just as the present invention allows higher quality and greater diversity in audio entertainment, it solves the dilemma of TV broadcasters (both RF and cable) which would like to offer high definition television (HDTV), but are held back by their desire to offer a wider selection of channels instead of higher quality on existing channels. For example, a 4 MHz bandwidth television station that currently offers a single standard definition television broadcast can offer multiple channels of high definition content. Or, a cable provider can increase the number and quality of its offerings far beyond what is presently possible. Alternatively, an FM station can offer video or other high bandwidth content that would normally not fit into its spectral allocation; or rental of a small part of a satellite transponder can replace Sirius' or XM's constellation of 2-3 dedicated satellites at a great reduction in cost.

While one goal of the present invention is to relieve the user from the burden of loading music and/or generating playlists of his own choosing, the large storage capacity and other electronics allow that option which preferably is preserved, but as an option not a requirement. In one such embodiment, music stored on a user's iPod or MP3 player can be transferred to the playback device via the WiFi channel and is treated the same as purchased music (including any DRM); and/or music purchased on the playback device can be transferred via the WiFi channel to the user's iPod or MP3 player (including any DRM). In yet another embodiment, the playback device is portable and can be moved from home to car to personal accessory (e.g., worn on a belt), obviating the need to transfer music between the playback device and the user's iPod or MP3 player, since the playback device serves both purposes. Alternatively, the hard disk drive or other memory storing content can be removable and moved between different locations, for example a car and a personal music player.

While, in the preferred embodiment, playlists are generated by broadcaster 100, alternative embodiments allow playlists to be influenced by user behavior. For example, if a playlist specifies a sequence of songs along with their introductions, and the user has constantly skipped a particular song (i.e., hit skip button 845 before it was finished playing), the playback device can be programmed to recognize this behavior and to skip that song and introduction (if any) in a playlist. Alternatively, the playback device can be programmed to skip that song with a probability dependent on the number of times (or fraction of times) the user has skipped that song. Similarly, the user interface 260 can have an added feature which allows the user to rate songs (e.g., on a scale of 0 to 10) and the playback device can be programmed to create playlists based on an initial playlist provided by the broadcaster and the information in the song rating table, with highly rated songs being played more frequently than lower rated songs.

Another alternative embodiment allows the user access to some or all of the content library in return for a periodic (e.g., monthly) payment. In this embodiment, either the content can be stored unencrypted, depending on physical security to protect it, or preferably keys are sent to the user whenever she wishes to access a song (or the first time she wishes to access a song, after which the key is stored and immediately available for use) for which the key is not yet in CEK protected memory 740. Since content encrypting keys are so much smaller than songs (128 bits versus 22,800,000 bits for a three minute song), real-time distribution of keys is much easier than real-time distribution of content. Similarly, an on-line music store can "download" purchased music much more rapidly than with current systems such as Apple's iTunes Music Store™ since all that must be downloaded is the key to the purchased music, not the entire content of the purchased music.

The present invention is inherently both a media broadcast system and a media distribution system, but can be used solely in one or the other of those two modes if a broadcaster or distributor so prefers. Similarly, a broadcaster can delegate any operations attributed to it to an authorized agent (e.g., generation of playlists). Therefore any references herein to a media broadcaster or to a media distributor are specifically intended to include a media broadcaster, a media distributor, their authorized agents, and/or any entities which perform similar roles. Similarly, any references to a media broadcast system or to a media distribution system are specifically intended to include both media broadcast systems and media distribution systems.

While the preferred embodiment treats user demographics separately from user tiers of service, an alternative embodiment utilizes only tiers to effect the same result. For example, a system with two tiers of service (1 and 2) and two user demographic groupings (A and B) can be implemented with four tiers of service (1A, 1B, 2A and 2B) and no specific references to demographic groupings. Similarly, a system with only one tier of service and two user demographic groupings can be implemented with two tiers of service (A and B). Thus, while tiers of service are sometimes hierarchical (e.g., commercial free vs. commercial supported), a hierarchical limitation on tiers is specifically not intended to apply herein.

While the preferred embodiment uses a hard disk drive to store content segments, playlists, and other data, alternative embodiments can use any form of memory or data storage known in the art including, but not limited to flash memory, semiconductor memory, RAM, tape, holographic memory, and optical disks.

Another alternative embodiment augments the user interface of playback device 120 with a remote control, which remote control duplicates some or all of the functions physically contained within playback device 120 (e.g., pause, play, skip, rewind, channel select, etc.). Herein, such a remote control is considered part of playback device 120's user interface.

Definitions

Herein, the term playback device includes receivers which play back a live transmission (equivalently an essentially real-time transmission), even though such receivers are not usually referred to as playback devices in colloquial usage. While the preferred embodiment utilizes a playback device which plays back stored content segments with a time delay since the time they were stored and/or received, as has been noted above, some aspects of the present invention are applicable to playback devices which work in essentially real-time, with no appreciable delay between reception and playback. Hence, herein, a playback device is defined in terms of the functionality assigned to it, and is not to be limited by colloquial usage.

Herein, the term media provider means one or more providers of media. While used in the singular for ease of exposition, as opposed to the more awkward media provider(s), this term is intended to encompass both the case of a single entity and of a number of entities working in concert. Any entity or group of entities, other than the user of the playback device, which works to fulfill the functions assigned herein to the media provider is to be considered the media provider so specified. Often, broadcaster 100 of FIG. 1 will fulfill such media provider functions, but the nature of media broadcasting and distribution is such that those functions can be fulfilled by many entities or combinations of entities, including for example:

broadcaster 100 an entity other than broadcaster 100 (e.g., content provider 105, radio factory 115, distributor 125, or a media distributor)

a combination of entities subcontractors or employees of one or more entities.

For example, a media provider can be a single company such as Clear Channel Inc. which owns a large radio network and associated production facilities; or it can be Clear Channel working in concert with other entities to generate content libraries and playlists, to create and/or define a set of program channels, etc. The only entity specifically not allowed to be part of a media provider is the user of the playback device.

Herein, the term intermittent channel is used to mean a channel conveying digital symbols, but which sometimes does not produce at its output the same sequence of digital symbols that were applied to its input. Examples of intermittent channels include additive white Gaussian noise channels when combined with a digital modulator and demodulator, binary symmetric channels, erasure channels, burst noise channels, fading channels, and channels with intersymbol interference. In the preferred embodiment, examples of intermittent channels are:

FM transmitter 130, FM channel 150, FM receiving antenna 205, RF tuner 210, and digital demodulator 215;

Internet 135 and PC 140;

WiFi 145, and WiFi transceiver 255; and

Internet 135, PC 140, WiFi 145, and WiFi transceiver 255.

As can be seen from the last three examples above, the cascade of two intermittent channels is also an intermittent digital communication means. Similarly an intermittent channel cascaded with a reliable channel forms an intermittent channel.

Herein, the term cryptoprocessor is used to mean circuitry for processing cryptographic functions such as enciphering, deciphering, and authenticating. While the preferred embodiment uses the highly secure cryptoprocessor depicted in FIG. 7, with protected memories, a protected bus, and other features designed to enhance security, alternative embodiments may use less secure cryptoprocessors. A microprocessor and appropriate software (e.g., stored in ROM) can also be used as a cryptoprocessor, but preferably in that case the microprocessor performing the cryptoprocessor functions is separate from microprocessor 225 to minimize security threats.

Herein, the term error control is used to denote any form of error control recognized in the art, including for example any single or combined operation involving error correction, error detection, burst error-correction, burst error-detection, and erasure error-correction.

Although the description above contains many specificities, these should not be construed as limiting the scope of the invention, but as merely providing illustrations of some of the presently preferred embodiments of this invention. It is intended that the scope of the invention be defined by the following claims and their equivalents.

I claim

1. A method of playing media on a playback device, the method comprising:
    generating a plurality of media content segments;
    encrypting at least a portion of said media content segments to produce encrypted media content segments;
    generating a library comprising said encrypted media content segments;
    prior to delivery of said playback device to a user, storing said library on said playback device;
    generating an active playlist comprising a representation of a set of said encrypted media content segments;
    said playback device decrypting at least a portion of said set of said encrypted media content segments to produce decrypted media content segments; and
    said playback device creating an output signal comprising a representation of a sequence of said media content segments responsive to said active playlist;
    wherein:
    said active playlist is generated at least in part by a media provider; and said sequence includes at least a portion of said decrypted media content segments.

2. The method of claim 1 wherein:
    said media content segments include audio content segments;
    some of said audio content segments represent entertainment;
    some others of said audio content segments represent introductions to at least some of the audio content segments which represent entertainment;
    said sequence includes a plurality of audio content segments which represent introductions;
    said sequence includes a plurality of audio content segments which represent entertainment; and
    at least some of said audio content segments which represent introductions are associated with at least some of said audio content segments which represent entertainment.

3. The method of claim 1 wherein:
    said media content segments include audio content segments; and said output signal is characteristic of a radio broadcast.

4. The method of claim 1 further comprising:
    after delivery of said playback device to said user, updating said library stored on said playback device;
    a media provider generating a collection of playlists;
    storing said collection of playlists on said playback device; and
    updating one of the playlists stored on said playback device to produce an updated playlist;
    and wherein said active playlist is said updated playlist.

5. The method of claim 4 wherein:
    said playback device includes a program channel selector;
    said user selects an active program channel utilizing said program channel selector;
    said active playlist is a member of said collection of playlists; and said active playlist is associated with said active program channel.

6. The method of claim 1 further comprising:
    after delivery of said playback device to said user, updating said library stored on said playback device utilizing update information;
    wherein:
    said update information is communicated to said playback device over an intermittent communication channel;
    at least a portion of said update information is encoded to produce encoded update information; and
    said encoded update information is decoded at said playback device at least partly using a decoding technique selected from the group consisting of erasure- correction and burst-error-correction.

7. The method of claim 6 wherein said encoded update information is transmitted at two or more points in time with one or more time separations between the two or more points in time.

8. The method of claim 7 wherein at least one of said time separations is at least partially randomized.

9. A media playback device comprising:
    a memory;
    a controller;
    a user interface; and
    a cryptoprocessor,
    wherein:
    update information is communicated to said playback device over one or more communication channels;
    said update information comprises first information and second information;
    prior to delivery of said playback device to a user, a library of media content segments is stored in said memory;
    after delivery of said playback device to said user, said library stored in said memory is updated utilizing said first information to produce an updated library; a collection of playlists is stored in said memory;
    said collection of playlists stored in said memory is updated utilizing said second information to produce an updated collection of playlists;
    at least a portion of the media content segments in said updated library are encrypted;
    at least a portion of the playlists in said updated collection of playlists are associated with one or more of a plurality of program channels;
    said user utilizes said user interface to select an active program channel from said plurality of program channels;

said playback device creates an output signal representative of a media program;

said media program is associated with an active playlist chosen by said controller from said updated collection of playlists;

said active playlist is associated with said active program channel;

said active playlist is associated with at least one of the encrypted media content segments contained in said updated library;

said cryptoprocessor decrypts at least one of the encrypted media content segments associated with said active playlist to produce at least one decrypted media content segment; and said media program includes a representation of said at least one decrypted media content segment.

10. The media playback device of claim 9 wherein:

at least a portion of said update information is encoded to produce encoded update information; and said encoded update information is decoded at said playback device at least partly using a decoding technique selected from the group consisting of erasure- correction and burst-error-correction.

11. The media playback device of claim 10 wherein said encoded update information is transmitted at two or more points in time with one or more time separations between the two or more points in time.

12. The media playback device of claim 11 wherein at least one of said time separations is at least partially randomized.

13. The media playback device of claim 9 wherein:

at least a portion of the playlists in said updated collection of playlists are associated with one or more of a plurality of user tiers;

said user is associated with an active user tier selected from said plurality of user tiers; and said active playlist is associated with said active user tier.

14. The media playback device of claim 9 further comprising an error control decoder wherein:

said error control decoder performs quality checks on portions of said update information; and said controller modifies said media program responsive to said quality checks.

15. The media playback device of claim 14 wherein:

said quality checks comprise validating that media content segments are complete and error-free to a high degree of certainty;

said high degree of certainty is at least 99.9%; and all media content segments represented in said media program meet said quality check.

16. The media playback device of claim 9 wherein said active playlist includes information selected from the set consisting of fade in information, fade out information and overlap information.

17. The media playback device of claim 9 wherein:

at least a portion of said memory is removable from said playback device; the removable portion of said memory contains at least a portion of said updated library; and at least a portion of said updated library contained in the removable portion of said memory is usable with a second playback device.

18. The media playback device of claim 9 wherein:

at least some of the media content segments in said updated library represent audio content segments;

some of said audio content segments represent entertainment;

some others of said audio content segments represent introductions to at least some of the audio content segments which represent entertainment; and said playback device playing said media program produces an audio program characteristic of a radio broadcast.

19. The media playback device of claim 9 wherein said active playlist depends in part on additional user input.

20. The media playback device of claim 19 wherein:

at least some of the media content segments in said updated library represent audio content segments;

some of said audio content segments represent entertainment;

some others of said audio content segments represent introductions to at least some of the audio content segments which represent entertainment; and said additional user input comprises a specification of a preferred characteristic of at least some of the audio content segments which represent introductions.

21. The media playback device of claim 20 wherein said additional user input comprises a specification of a preferred length for at least some of the audio content segments which represent introductions.

22. The media playback device of claim 20 wherein said additional user input comprises a specification of a preferred language for at least some of the audio content segments which represent introductions.

23. The media playback device of claim 9 wherein:

said collection of playlists is generated at least in part by a media provider;

said user provides one or more indications of preferences for media content segments included in said updated library utilizing said user interface;

said playback device maintains user preference information representative of said user's preferences for a plurality of media content segments included in said updated library; and said updated collection of playlists stored in said memory is modified utilizing said user preference information to produce a modified collection of playlists.

24. The media playback device of claim 23 wherein said user preference information comprises information selected from the group consisting of user channel use information, user skip information, user repeat information, user commercial information, user purchase information, and media provider information.

25. The media playback device of claim 9 wherein at least a portion of said update information is communicated to said playback device over a wireless communication channel.

26. The media playback device of claim 9 wherein:

at least a portion of said update information is communicated to said playback device over a first communication channel;

at least a portion of said update information is communicated to said playback device over a second communication channel; and at least one of said first communication channel and said second communication channel comprises a wireless communication channel.

27. The media playback device of claim 9 wherein:

said cryptoprocessor includes at least one protected memory; and at least a portion of said protected memory is read-protected from parts of said playback device external to said cryptoprocessor.

28. The media playback device of claim 9 wherein:

said cryptoprocessor includes at least one protected memory; and at least a portion of said protected memory is write-protected from parts of said playback device external to said cryptoprocessor.

29. The media playback device of claim 9 further comprising a protected bus wherein:
said protected bus can carry data in only one direction; and data is output on said protected bus by said cryptoprocessor.

30. The media playback device of claim 9 wherein said cryptoprocessor utilizes a key hierarchy with at least three keys.

31. The media playback device of claim 9 wherein said playback device is connected to a bidirectional wireless communication channel.

32. The media playback device of claim 31 wherein:
said user provides input to said playback device on a remote user input device; and
said remote user input device communicates with said playback device at least in part utilizing said bidirectional wireless communication channel.

33. The media playback device of claim 9 wherein at least a portion of said update information is communicated to said playback device over a communication channel utilizing a portion of the 88-108 MHz band.

34. The media playback device of claim 9 wherein said one or more communication channels comprises:
a communication channel utilizing a portion of the 88-108 MHz band; and a bidirectional wireless communication channel.

35. The media playback device of claim 9 wherein said one or more communication channels comprises a store and forward communication network.

36. The media playback device of claim 9 wherein said one or more communication channels comprises a peer-to-peer network comprising nodes.

37. The media playback device of claim 36 wherein at least one of the nodes in said peer-to-peer network is located on a moving vehicle.

38. The media playback device of claim 9 wherein:
said playback device is connected to a reverse communication channel which communicates feedback information from said playback device; and
said feedback information is utilized to increase the efficiency of transmission of information selected from the group consisting of said update information and user authorization information.

39. The media playback device of claim 9 wherein:
said playback device is connected to a reverse communication channel which communicates feedback information from said playback device; and
said feedback information includes information selected from the group consisting of user channel use information, user skip information, user repeat information, user commercial information, user purchase information, and media provider information.

40. The media playback device of claim 9 wherein said media program includes:
entertainment segments;
introductions to at least a portion of said entertainment segments; and commercial segments.

41. The media playback device of claim 9 wherein:
content segment control information is stored in said memory; said controller inhibits one or more functions of said user interface responsive to said content segment control information.

42. The media playback device of claim 41 wherein at least one of the inhibited functions is selected from the group consisting of a fast forward function and a skip function.

43. The media playback device of claim 41 wherein:
at least one of the inhibited functions can be overridden by said user if an override condition is satisfied;
said playback device is connected to a reverse communication channel which communicates feedback information from said playback device; and
said feedback information includes information on user overrides of said inhibited functions.

44. A method of playing media on a playback device, the method comprising:
generating a plurality of media content segments;
encrypting at least a portion of said media content segments to produce encrypted media content segments;
generating a library comprising said encrypted media content segments; storing said library on said playback device;
generating an active playlist comprising a representation of a set of said encrypted media content segments;
said playback device authenticating said active playlist;
said playback device decrypting at least a portion of said set of said encrypted media content segments to produce decrypted media content segments; and
said playback device creating an output signal comprising a representation of a sequence of said media content segments responsive to said active playlist;
wherein:
said active playlist is generated at least in part by a media provider; and said sequence includes at least a portion of said decrypted media content segments.

45. The method of claim 44 wherein at least a portion of said library is stored on said playback device prior to delivery of said playback device to a user.

46. The method of claim 44 wherein:
a user selects a first program channel on said playback device from a plurality of program channels;
said user selects a second program channel on said playback device from said plurality of program channels;
the selection of said second program channel occurs during the playback of a first media content segment representing a commercial;
said user selects a third program channel on said playback device from said plurality of program channels;
said third program channel is the same as said first program channel; and
said playback device starts playback of said third program channel at the start of said first media content segment.

47. The method of claim 46 wherein said first media content segment represents a commercial.

* * * * *